FIG. 2

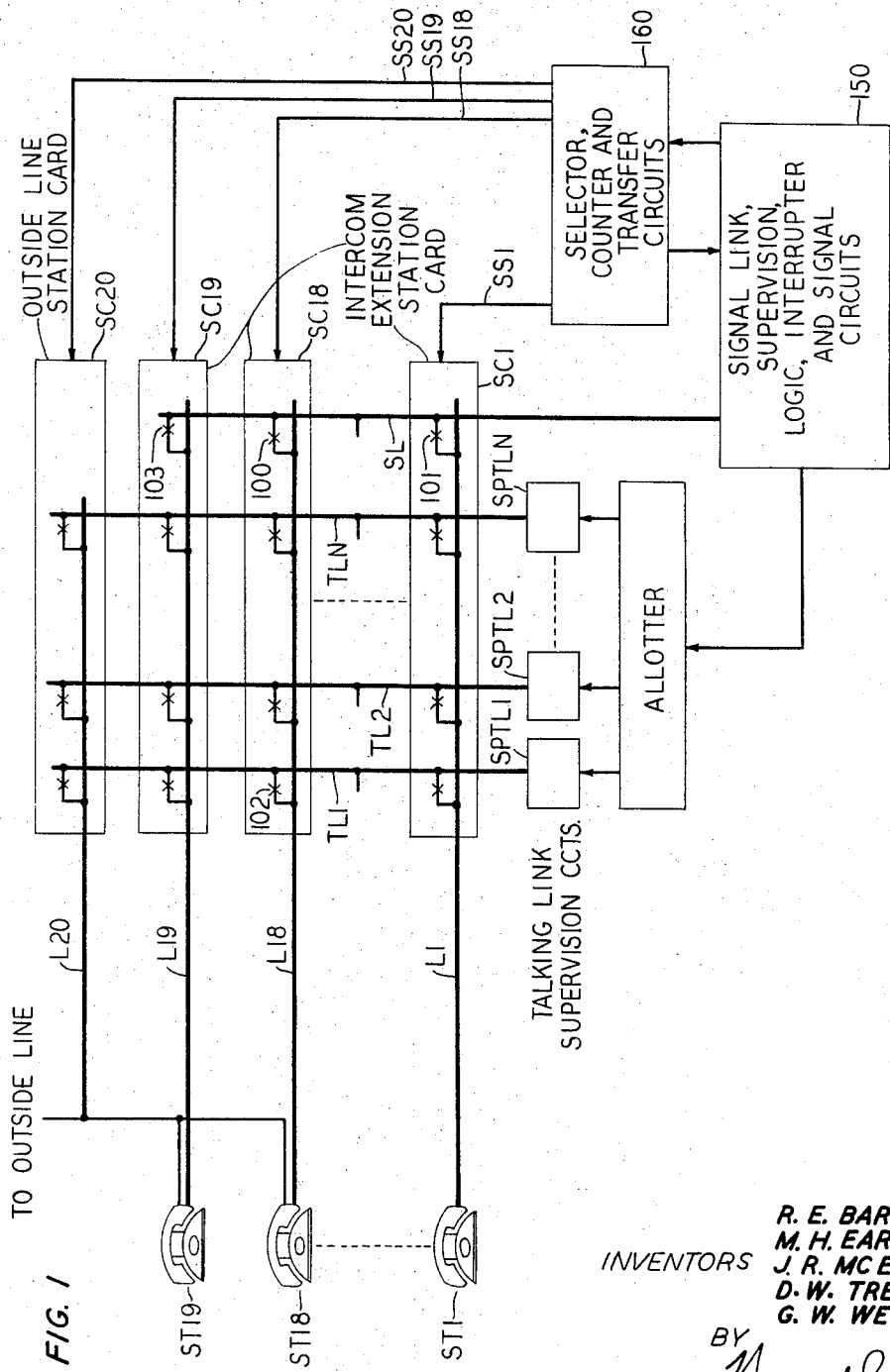

| FIG. 19 (OUTSIDE LINE) STATION CARD 32 | FIG. 17 STATION CARD 25 | FIG. 3 STATION CARD 20 | FIG. 5 STATION CARD 4 | FIG. 7 TALKING LINK CONTROL CCTS. & ALLOTTER | | | |
|---|---|---|---|---|---|---|---|

FIG. 20 STATION CARD 32 / FIG. 18 STATION CARD 25 / FIG. 4 STATION CARD 20 / FIG. 6 STATION CARD 4 / FIG. 8 SUPERVISION CIRCUIT / FIG. 9 LOGIC CIRCUIT I / FIG. 10 LOGIC CIRCUIT II / FIG. 11 SIGNAL CIRCUIT

FIG. 13 TRANSFER CIRCUIT / FIG. 15 SELECTOR CIRCUIT

FIG. 14 COUNTER CIRCUIT

FIG. 12 INTERRUPTER CIRCUIT

FIG. 16 STATION EQUIPMENT 25

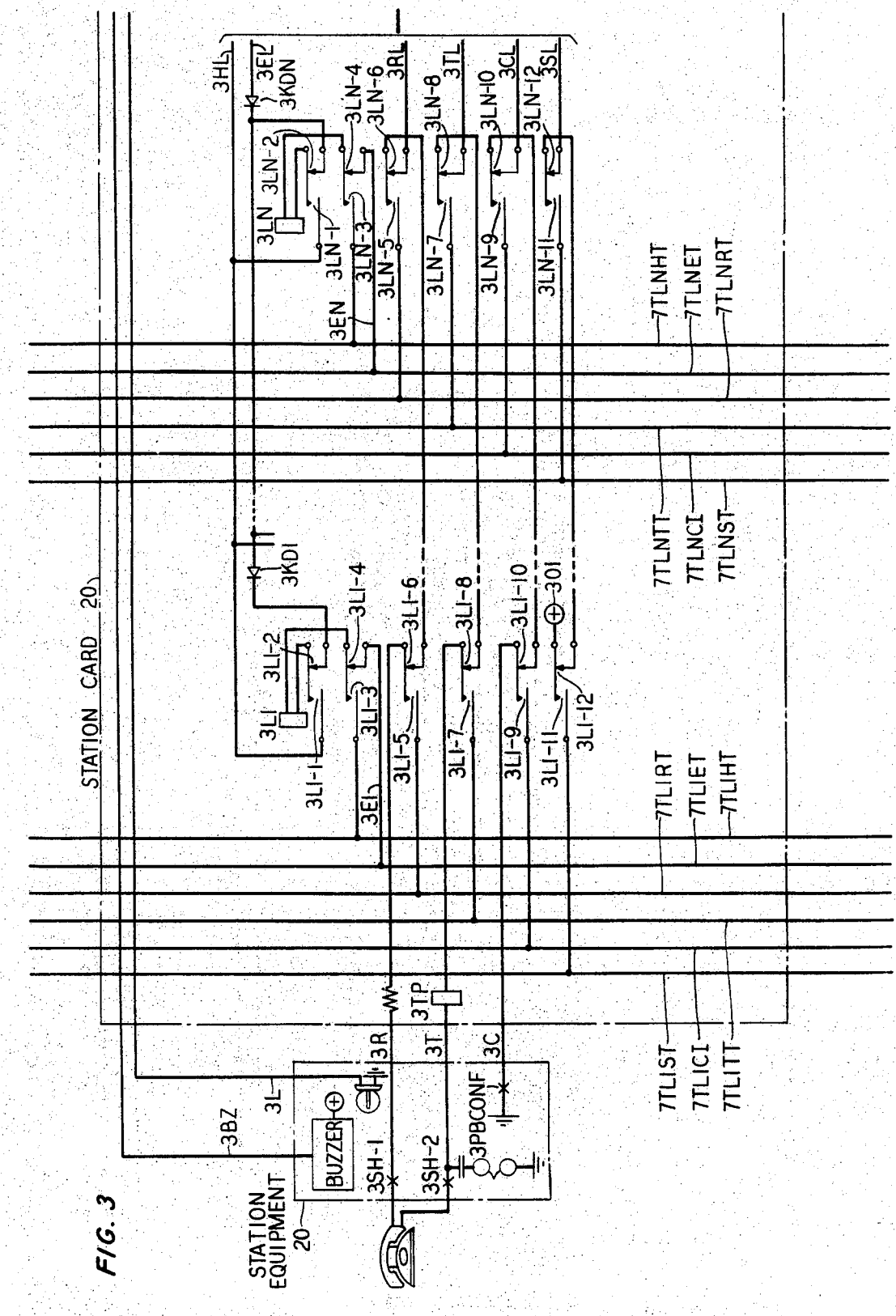

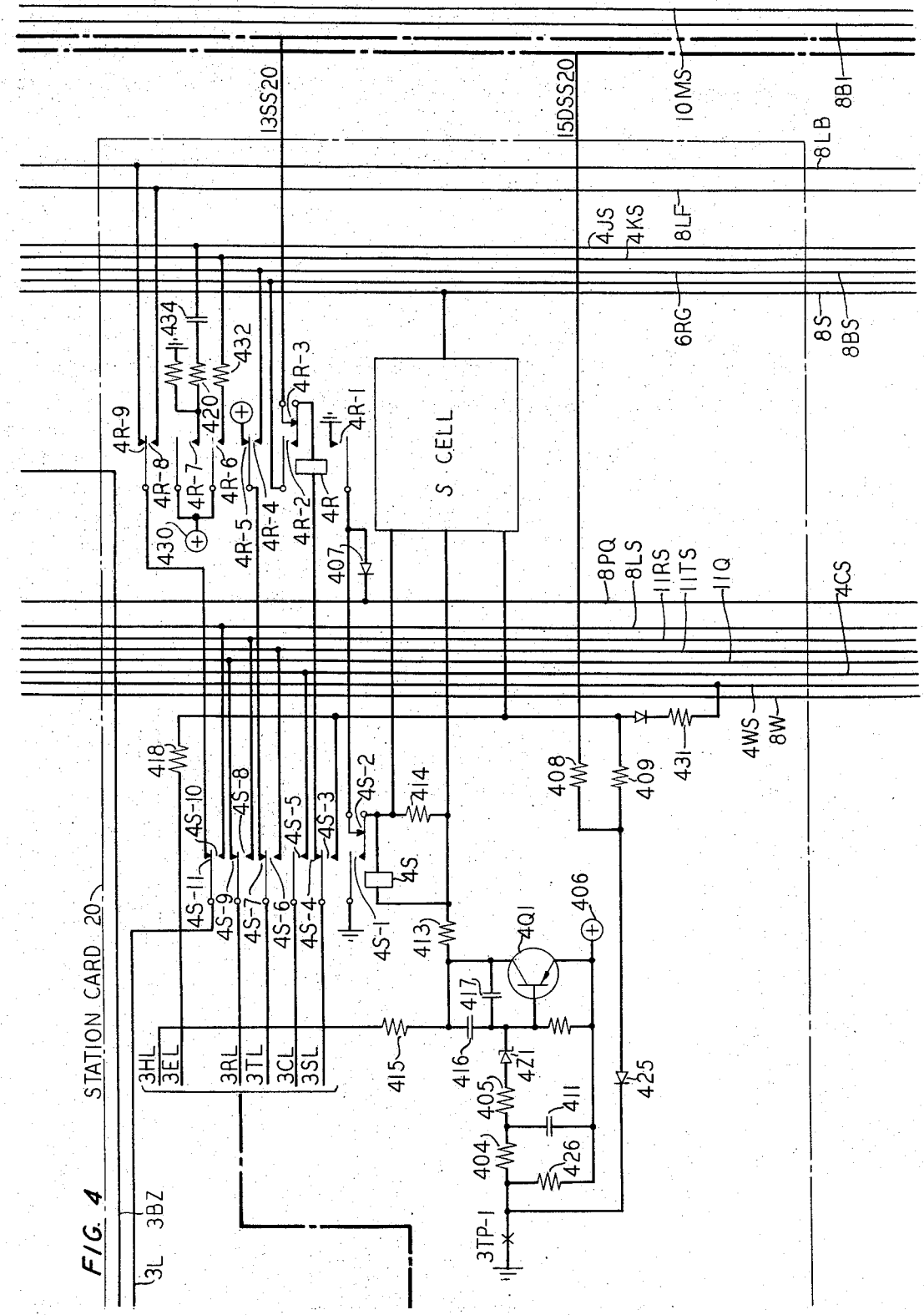

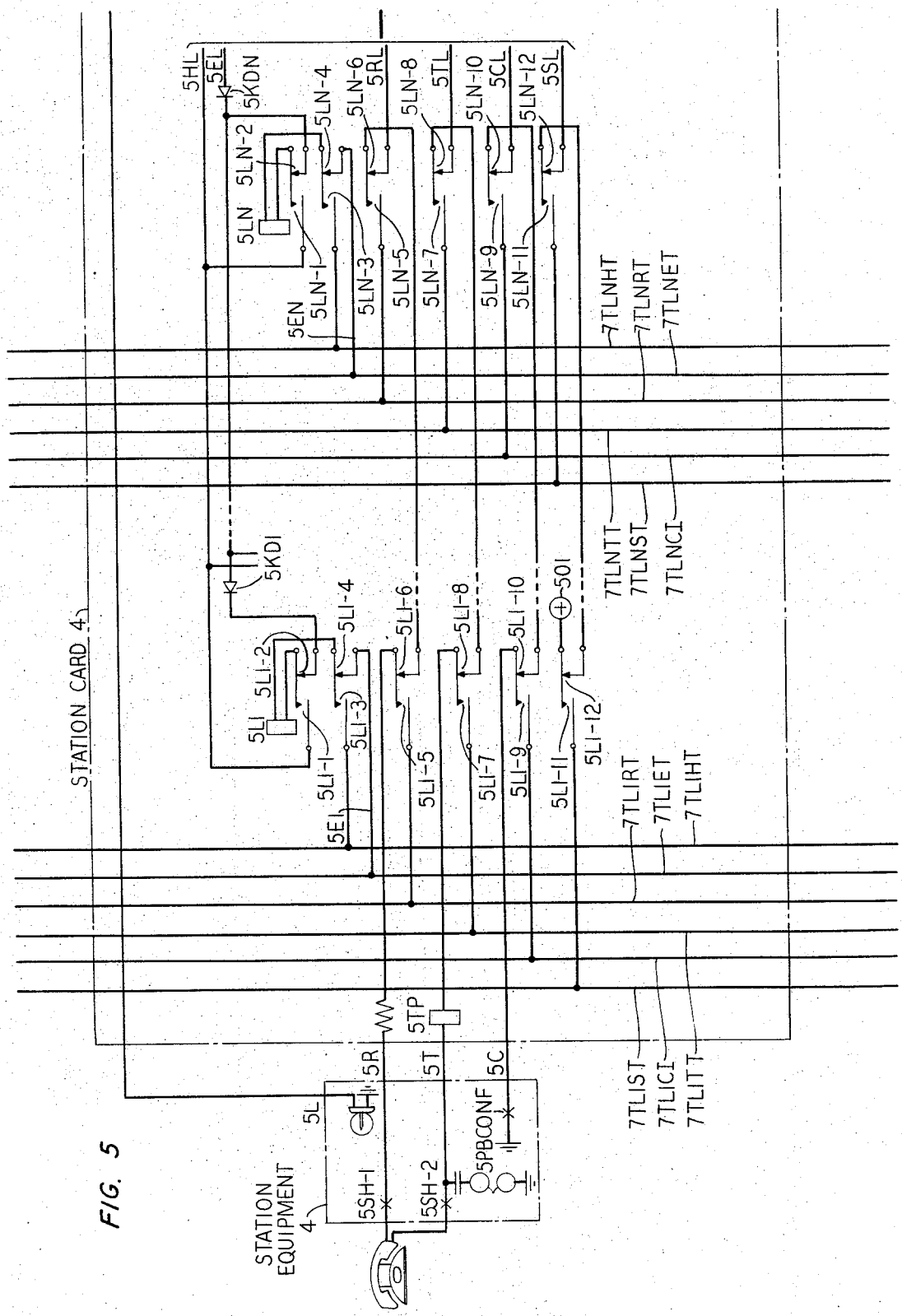

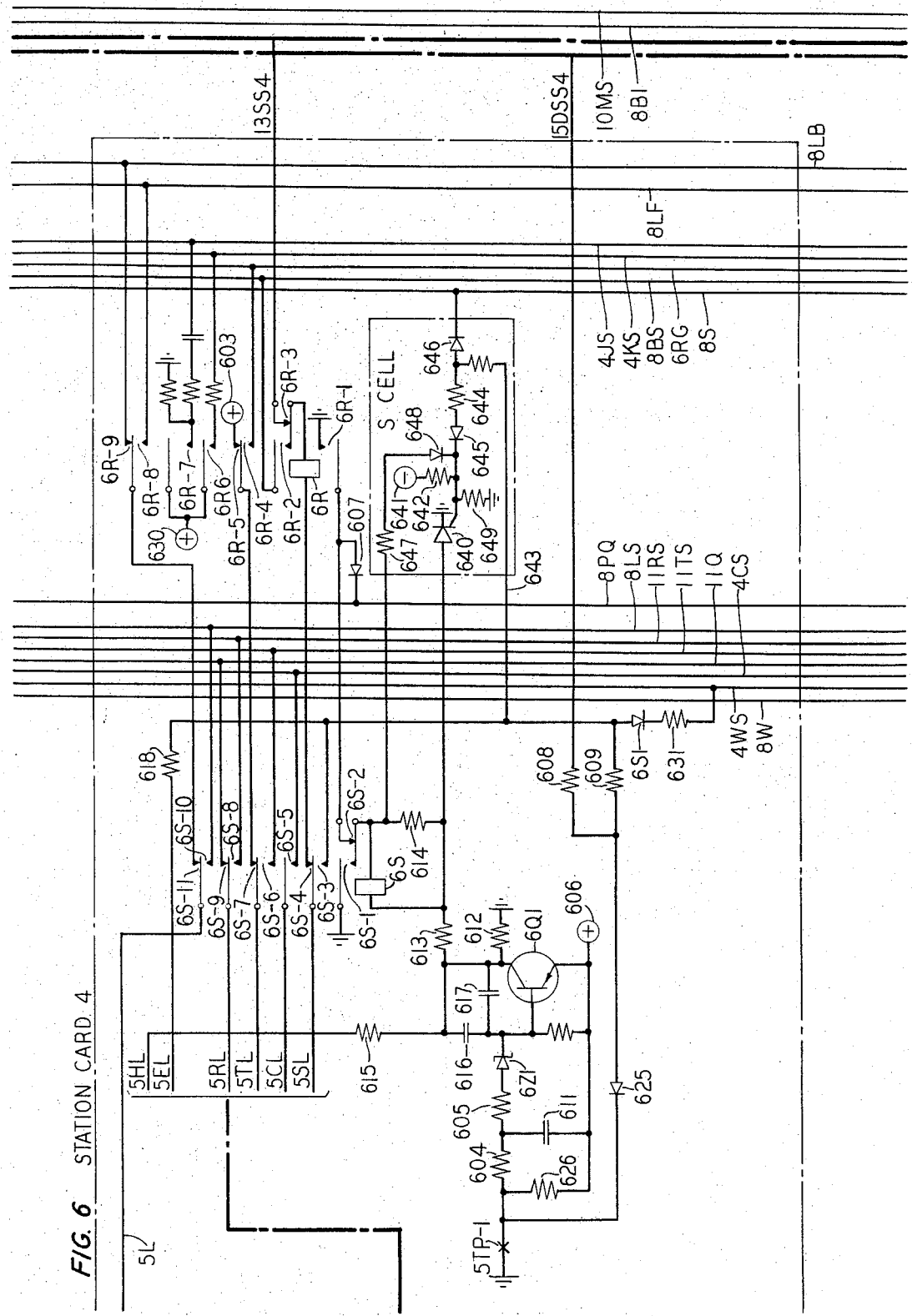

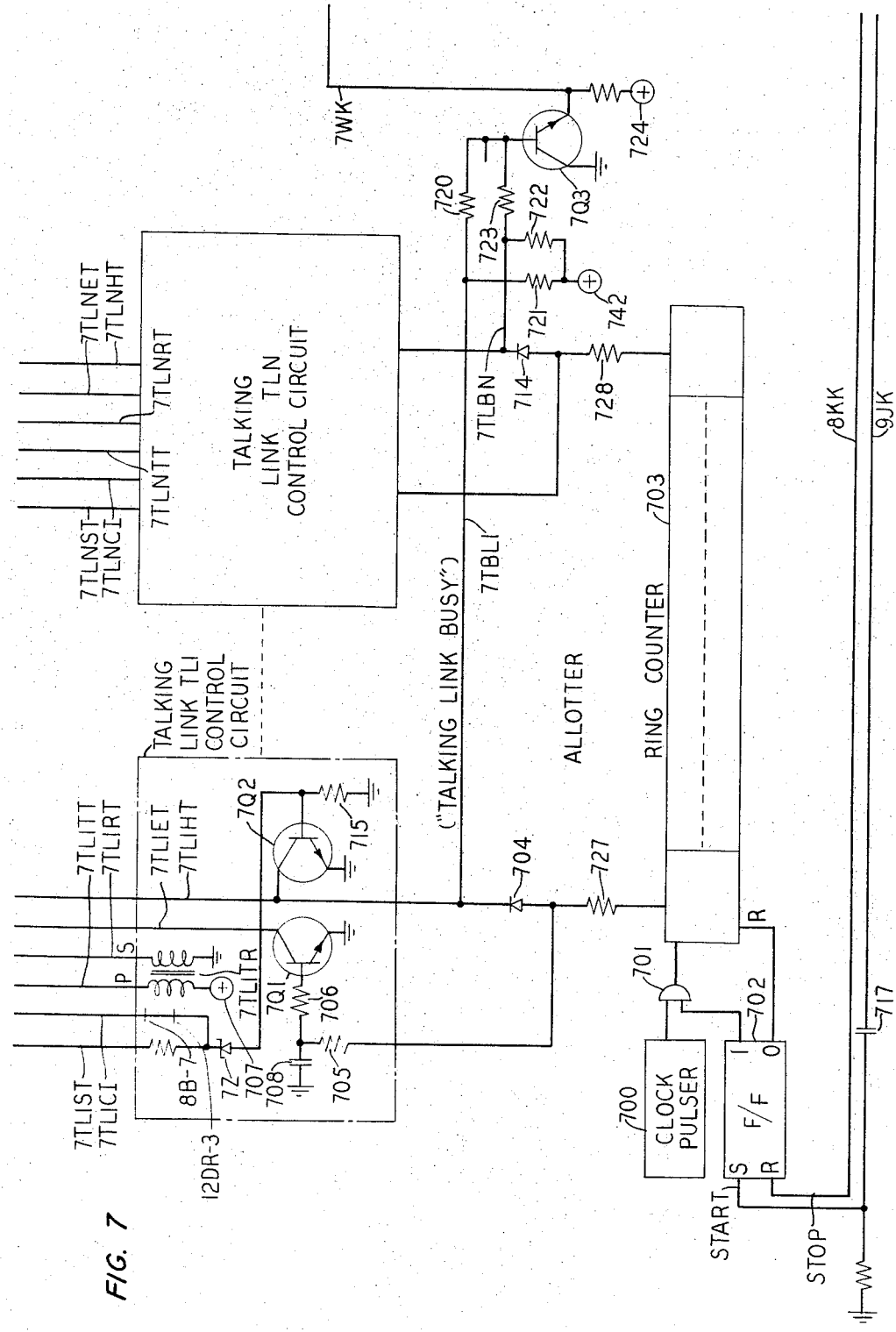

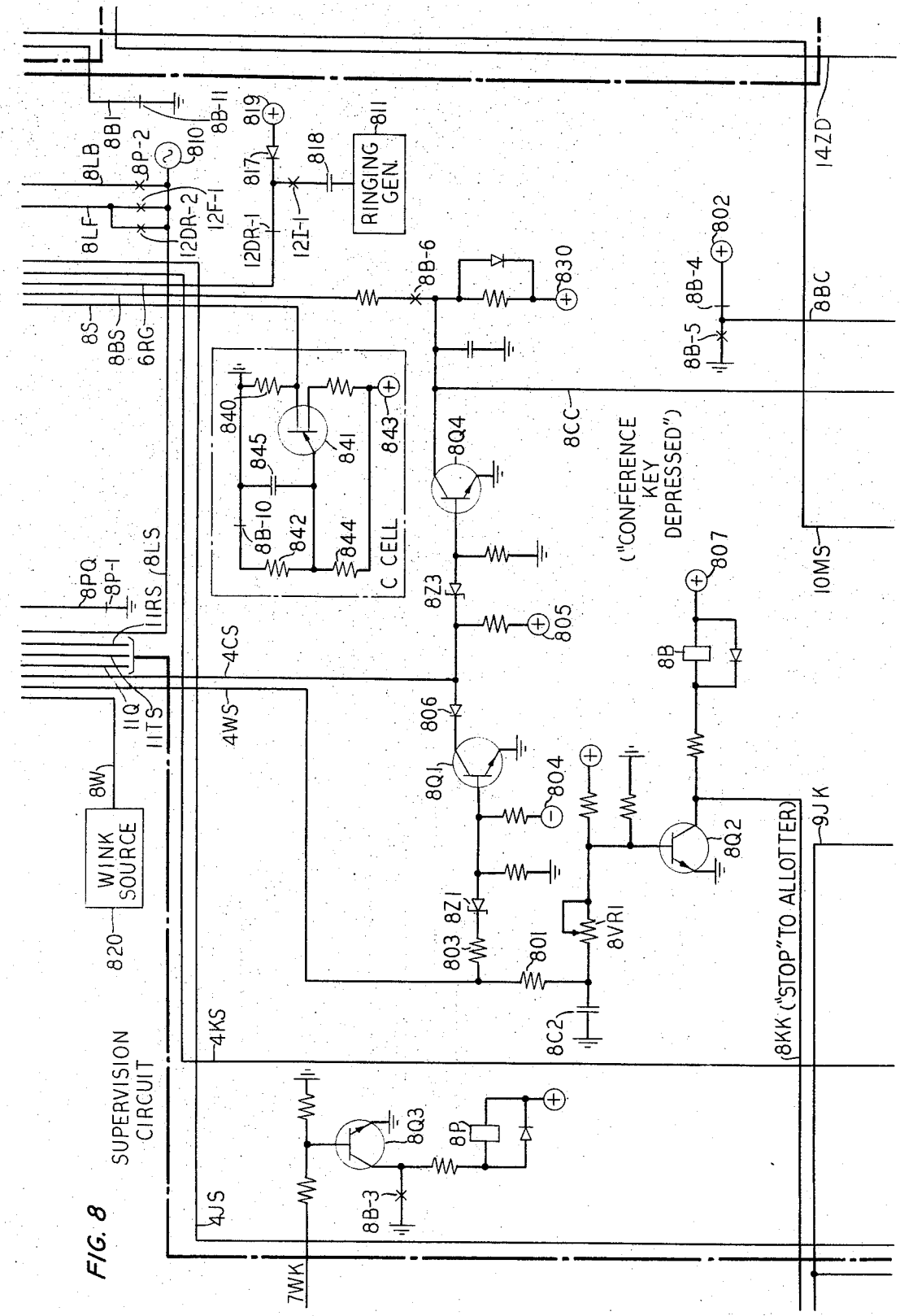

United States Patent Office

3,342,944
Patented Sept. 19, 1967

3,342,944
MULTICHANNEL INTERCOM SYSTEM WITH
COMMON SIGNALING CHANNEL
Robert E. Barbato, Middletown, Marvin H. Eargle, Long
Branch, James R. McEowen, Madison Township, Middlesex County, Dale W. Trent, Neptune, and George
W. Wells, Lincroft, N.J., assignors to Bell Telephone
Laboratories, Incorporated, New York, N.Y., a corporation of New York
Filed Apr. 29, 1964, Ser. No. 363,449
20 Claims. (Cl. 179—18)

ABSTRACT OF THE DISCLOSURE

We disclose a multilink intercom system in which calling and called stations are first interconnected by the system's single signal link and thereafter transferred to one of a plurality of talking links. Conferences may be established by any party on an established talking link connection dialing stations without the original talking connection being broken, and means are provided for returning a busy tone to the caller whereby the conference call can be cancelled if one of the called stations is busy without disturbing any of the priorly dialed stations with ringing.

---

This invention relates to communications and more particularly to intercom systems.

Many businesses require a self-contained system permitting private communications among the individuals at a single location, e.g., in the same building. One of the most important requirements of an intercom system is that it be flexible. As day-to-day business needs change, not only does the total number of stations on the intercom vary, but in addition, the particular services provided the individual stations may require modification. For example, while a station with a given extension number may at first be unable to signal other stations directly, it may be decided that this service is required for the station at a later time.

In addition to flexibility an intercom system should provide a maximum number of features with a minimum degree of complexity. These features may includes circuitry for establishing conference calls, for directly signaling or selecting other stations, for bringing outside lines into an intercom call, and for providing other services.

It is an object of this invention to provide a minimally complex intercom system which is both highly flexible and capable of providing a variety of particular features to individual stations on a selective basis.

In many intercom systems, as in the many telephone systems, a switching network is provided to selectively connect two or more stations to the same link for the purpose of providing a communications path. Many such links are usually provided in order that the system be able to handle more than one call at a time. There is usually a considerable amount of logic circuitry individually associated with each link for establishing a call on the link. It is a particular object of this invention to minimize the logic circuitry associated with each link, and to utilize the same common circuitry in the establishment of every call.

Many systems which are capable of providing conference service ring the individual called parties successively as their respective station numbers are dialed. If the first few parties called are available, they are brought into the conference. But the conference may be required only if some of the last called parties are available. If one of these is busy and the conference is canceled, the earlier called parties have been needlessly disturbed. Accordingly, it is another object of this invention to provide a more efficient conference sequence than has been available in the past.

In accordance with the principles of the invention the intercom system is provided with a plurality of talking links, and a fewer number of signal links. In the illustrative embodiment of the invention one signal link is provided. The common logic circuitry is associated with the signal link, and a minimum amount of supervision circuitry is associated with each of the talking links. When any station goes off-hook it is connected to the signal link. The call, two-party or conference, is first established over the signal link, with all of the stations being connected in parallel. After the call is established, an allotter selects an idle talking link and transfers all of the stations on the signal link to the talking link. In this manner the same logic circuitry is used on each call, and the supervision circuits associated with the talking links may be of minimal complexity.

It is a feature of this invention to provide a plurality of talking links and a lesser plurality of signal links, with all calls being established over the signal link and thereafter being transferred to an available talking link.

When any station is to be added to the intercom system of the invention a station card is plugged into the frame equipment housing the intercom circuitry. The line conductors are extended from the station to the station card, and from these station cards to the intercom circuitry. A different station card is available for each combination of services to be provided a particular station. If at any time different services are to be provided for a particular station it is only necessary to remove the original station card and to substitute a different one in its stead. In this manner a highly flexible system is achieved.

It is another feature of this invention to provide a plug-in station card for each intercom extension, the particular services provided each station depending upon the particular station card selected and not requiring any individual modifications in the common circuitry.

When a conference call is being established in our invention, ringing of each called party is delayed until after all other station numbers have been dialed. However, the conference originator is provided with busy tone immediately after each number is dialed if the called station is busy. In this manner the originator is able to determine the availability of the parties desired in the conference before any of them are rung. If an indispensable party is busy the conference call may be abandoned by the originator without the other called parties having been rung needlessly.

It is another feature of this invention to delay ringing of all called parties in a conference call until all of the called stations numbers have been dialed, and to return busy tone to the conference originator immediately after each number is dialed if the respective called station is busy.

Often, the two parties on a regular call, or even more parties on a conference call, may desire to bring in other parties, i.e., to expand the conference. Once the initial call is established it is transferred to a talking link, and since all connections are established initially over the signal link, the original conference is first transferred back to the signal link, at which time additional station numbers may be dialed for the purpose of bringing other parties into the conference. After the conference is expanded all of the conferees are transferred back to a talking link.

It is another feature of this invention to enable the parties connected over a talking link to transfer back to the signal link for the purpose of expanding the conference, and for enabling them to continue their conversation while the additional parties are being connected to the signal link.

It should be noted that the conferees in the expanded conference are not necessarily transferred back to the same talking link over which the original parties were connected. A different talking link may be selected. Because all connections are initially established over the signal link, the original conferees are first transferred to the signal link. Thus, when the expanded conference is set up all stations are connected to the signal link. These stations then may be transferred to any talking link, and it is not necessary to provide circuitry for registering the talking link previously utilized.

The stations on the signal link are not transferred to a talking link until all of the called stations have answered the ringing. The stations on the signal link are automatically transferred to a talking link only after all of the called parties have answered. If it becomes apparent that one or more of the called parties are unavailable ringing may be retired, and the stations connected to the signal link transferred to a talking link, by the operation by one of the conferees of the key normally used to initiate a conference call.

It is another feature of this invention to enable any party on the signal link to manually retire ringing and transfer all stations on the signal link to a talking link by the operation of his conference key.

It is another feature of this invention to insure the privacy of a first station seizing the signal link by preventing the connection of any stations to the signal link other than those dialed by the calling party.

It is another feature of this invention to limit the number of stations on any conference to an adjustable maximum in order that adequate transmission capabilities be maintained.

It is another feature of this invention to prevent seizure of the signal link by a new station in the event all of the talking links are busy and no new calls may be established, without however preventing stations already connected to a talking link from being transferred to the signal link for the purpose of bringing in additional stations.

It is another feature of this invention to enable a party to hold his station connection to the intercom system while transferring to another, nonintercom, line.

It is another feature of this invention to provide for the connection of outside lines to the talking links of the intercom system.

It is another feature of this invention to enable a station to establish regular or conference calls to preselected stations without requiring the dialing of any digits.

It is another feature of this invention to provide lamp signals for each station, e.g., to indicate that the system is busy and that no new calls may be placed, or to indicate a ringing or hold condition.

It is another feature of this invention to extend a system busy tone to any party ignoring the system busy lamp signal and going off-hook.

Further objects, features and advantages of our invention will become apparent upon consideration of the following description in conjunction with the drawing in which:

FIG. 1 is a simplified block diagram of an illustrative embodiment of our invention;

FIG. 2 shows the arrangement of FIGS. 3–20; and

FIGS. 3–20 are a more detailed schematic representation of an illustrative embodiment of the invention.

Figure 9:
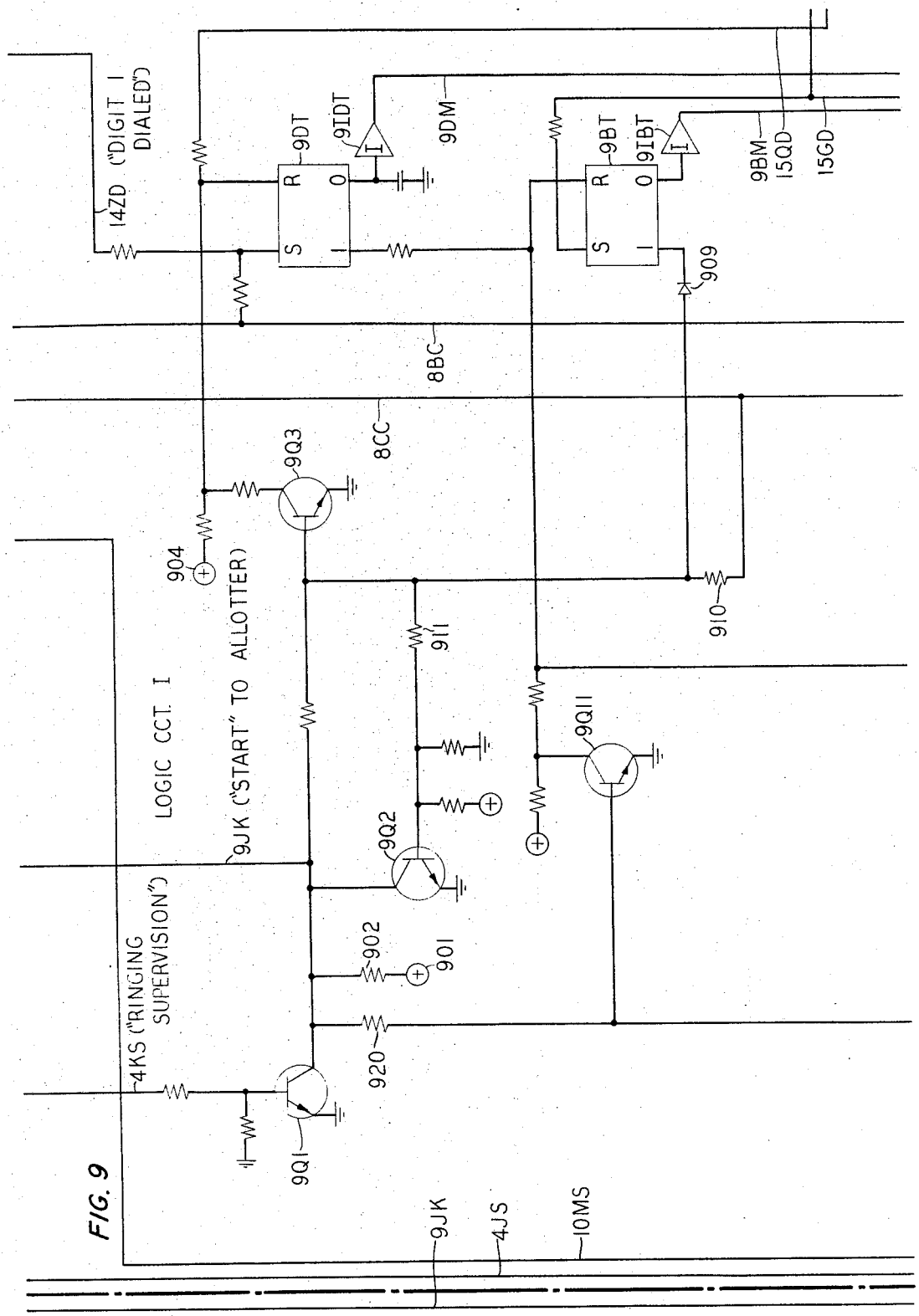

The description of our invention will be presented as follows:

Column

I. General Description ........................................... 4
II. Detailed Description:
  A. Description of Functional Units:
    (1) General ............................................ 6
    (2) Station Circuit .................................... 7
    (3) Interrupter Circuit ............................... 10
    (4) Signal Circuit .................................... 11
    (5) Supervision Circuit ............................... 12
    (6) Talking Link Control Circuits and Allotter ........ 16
    (7) Logic Circuits .................................... 18
    (8) Selector, Counter and Transfer Circuits ........... 25
  B. Illustrative Call Sequences:
    (1) Establishment of Two-Party Call ................... 30
    (2) Establishment of Conference Call .................. 35
      (a) Single-Party Conference Origination ........... 36
      (b) Multiple-Party Conference Origination ......... 37
  C. Optional Services:
    (1) Direct Station Selection and Signaling ............ 38
    (2) Hold Feature ...................................... 40
    (3) Outside Line Add-on ............................... 42

I. GENERAL DESCRIPTION

FIG. 1 discloses an illustrative embodiment of our invention in block diagram form. There are a maximum of twenty station connections, 19 of which are used for connecting intercom extensions to the intercom system, and one of which is used for connecting an outside line to the intercom system. The 19 stations ST1–ST19 are identified by the code numbers 1–19. Although in the detailed description of the illustratve embodiment (which appears hereinafter) the station code numbers are not consecutive, the stations and lines in FIG. 1 have been labeled successively for the purpose of clarity. The outside line may be extended directly to various ones of the stations, e.g., ST18 and ST19. An incoming call may be answered at either of these stations. If the calling party wishes to speak to the party at station 1, for example, the party having answered the call controls a connection of line L20 through the intercom system to line L1. The party having answered the call is then also connected to the outside line through the intercom system, rather than being connected directly as he is when he answers the incoming call.

Each station and outside line is provided with a station card. Station card SC20, used to connect an outside line to the intercom system, is considerably different from the other nineteen. Station cards SC1–SC19 are basically the same, differing from each other to the extent necessary to provide the different services for the particular stations ST1–ST19. The station cards are interchangeable, and in this manner the services provided each extension may be varied.

The N talking links TL1–TLN are selectively connectable to each of the twenty lines. The signal link SL is selectively connectable to only the 19 lines terminating at intercom extensions. The signal link is required for establishing a regular two-party call, or a conference. The calling party on the outside line cannot control the intercom operation, and must request the party at an intercom station who has answered the incoming call to control the connection of the outside line to a talking link. The outside line thus has no need of the signal link, and for this reason a connection of line L20 to the signal link SL is not provided.

When a party goes off-hook to originate a call the station is connected to the signal link. For example, if the party at station 18 goes off-hook contacts 100 close, and line L18 is connected to signal link SL. The calling party dials the station number or numbers of the line or lines to which the connection is desired. Equipment 150 and 160 function together to supervise the establishment of the call and to signal the various parties. As each called station is dialed a pulse is applied to one of conductors SS1–SS20. A pulse on one of conductors SS1–SS19 controls the connection of a called line to the signal link. For example, if one of the called stations is station 1 a pulse on conductor SS1 causes contacts 101 to close. If station number 20 is dialed the pulse on conductor SS20 prepares station card SC20 for subsequently connecting line L20 to a talking link.

After all of the desired parties are connected over the signal link a signal is sent to the allotter. The allotter scans the talking links and selects the first available one. All of the parties on the signal link are transferred to this talking link, and the signal link is freed for use by another station requesting service. Subsequent supervision of the call is accomplished in one of the talking link supervision circuits SPTL1–SPTLN. The talking link is freed only after all of the parties originally connected to it go on-hook. At this time the talking link becomes free for a subsequent selection by the allotter. The talking link supervision circuits are therefore relatively simple in that they need only supervise calls once they are already established over the respective talking links, and supply talking battery.

When the originating party desires to establish a conference call, he first operates a conference key at his station. A signal is transmitted to equipment 150 which is thus notified of the conference requirement. The called station numbers are then dialed successively. After each number is dialed equipment 160 applies a pulse to the respective one of conductors SS1–SS20. If the called station is available, i.e., not busy, equipment 150 takes no further action. However, if the called station is busy, busy tone is applied to the signal link, and is heard by the conference originator. The originator may go on-hook and abandon the call, or may continue to establish it—without the unavailable party. If the originator chooses to continue establishing the call the busy tone will be retired at the end of the succeeding station dialed. After all of the called station numbers have been dialed, ringback tone is extended to the calling station, and a ringing signal is supplied to the lines of all called stations. The ringing is delayed in order that no called parties be disturbed in the event the conference call is abandoned because an indispensable called party is busy. If a called station is unattended the ringing signal and ringback tone may be retired by depressing the conference button.

If two or more parties are already connected to one another over a talking link and desire to expand the call, i.e., to bring in other parties, one of the parties operates his conference key. The conference signal is now sent to the talking link, rather than the signal link as it was when the original conference was established. If the signal link is free, the talking link supervision circuit releases the talking link, and all of the stations connected to it are transferred to the signal link. The additional station codes are then dialed by any one of the parties on the signal link, and the ensuing sequence is the same as that when a conference is initially being established. The only difference is that two or more parties are initially connected to the signal link and may continue to talk while the other stations are being rung. After all called parties have answered and are connected to the signal link the allotter selects a talking link, not necessarily the talking link to which the original conferees were connected, and all stations on the signal link are transferred to the talking link.

A station whose station card provides the hold feature may hold the intercom connection while transferring to an outside line. For example, suppose station 18 is connected to station 1 over talking link TL1, and the party at station 18 desires to hold the connection while he answers an incoming call on the outside line. The hold button at station 18 is operated and station 18 is disconnected from line L18. However, contacts 102 remain closed. The party at station 18 then operates the pushbutton on his key set for connecting his station to the outside line. Subsequently, when the intercom pushbutton is again operated station 18 is once again connected to line L18. The intercom connection has been held, and it is not necessary to re-establish the call.

An optional feature is also available for enabling a party to establish a connection to a preselected party or preselected parties without dialing any digits. A special pushbutton is operated by the calling party at his key set, and a signal is sent along the respective line to the connected station card. For example, the party at station 18 may be permitted to control a direct connection to stations 1 and 19 in which case individual connections are made from line L18 to conductors SS1 and SS19. The signal sent to station card SC18 results in the application of a pulse to conductors SS1 and SS19 which is the same as that normally applied to these conductors by equipment 160. Contacts 101 and 103 are thus directly controlled to close. Ringing and ringback are provided in the same manner as for other stations, and after the called parties have answered the three stations are transferred from the signal link to an available talking link.

This general description of the system operation is only a brief summary of the principles of the invention. A complete understanding of the operation of an illustrative embodiment of the invention may be had upon consideration of the following detailed description.

II. DETAILED DESCRIPTION

Figure 17:
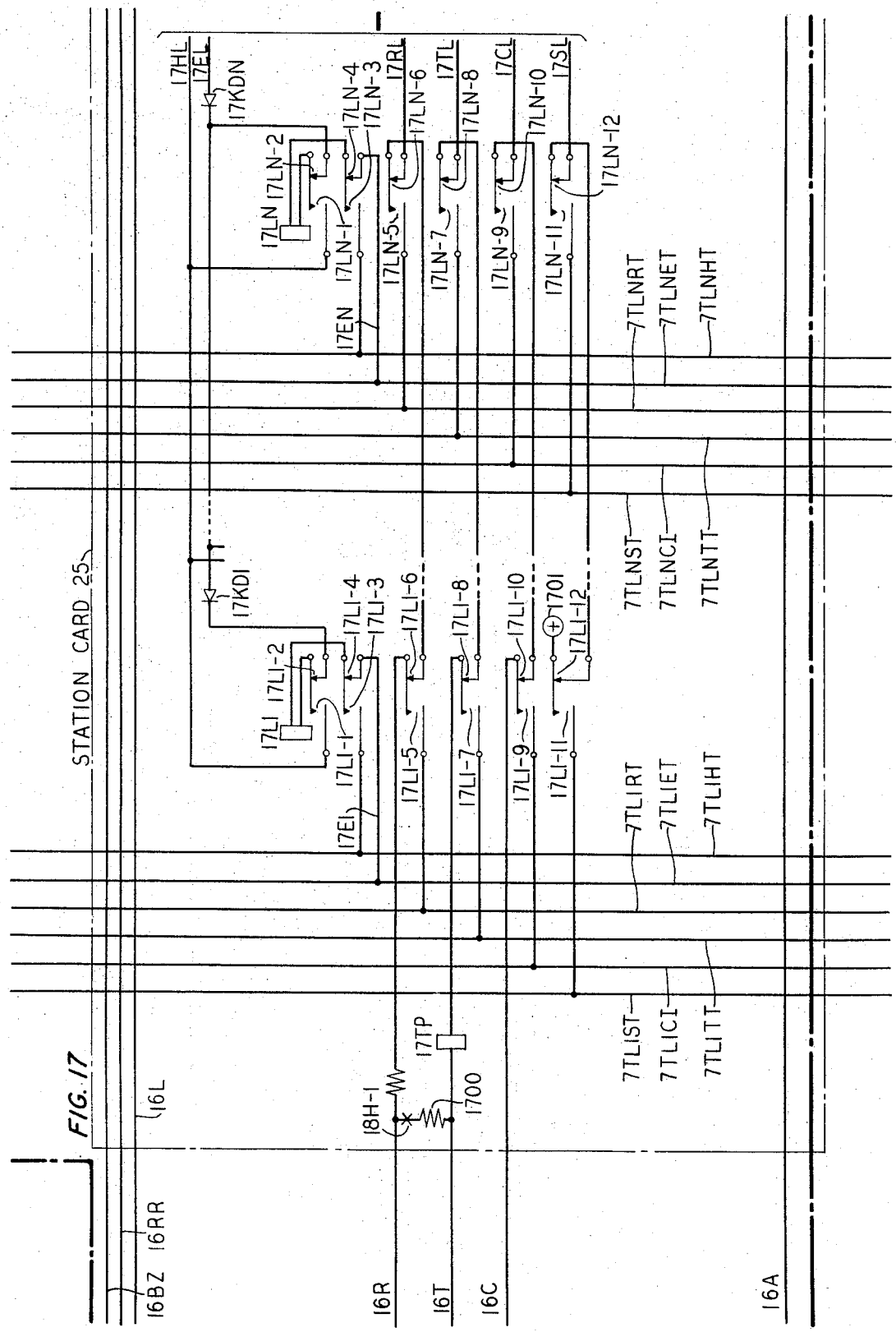
Figure 18:
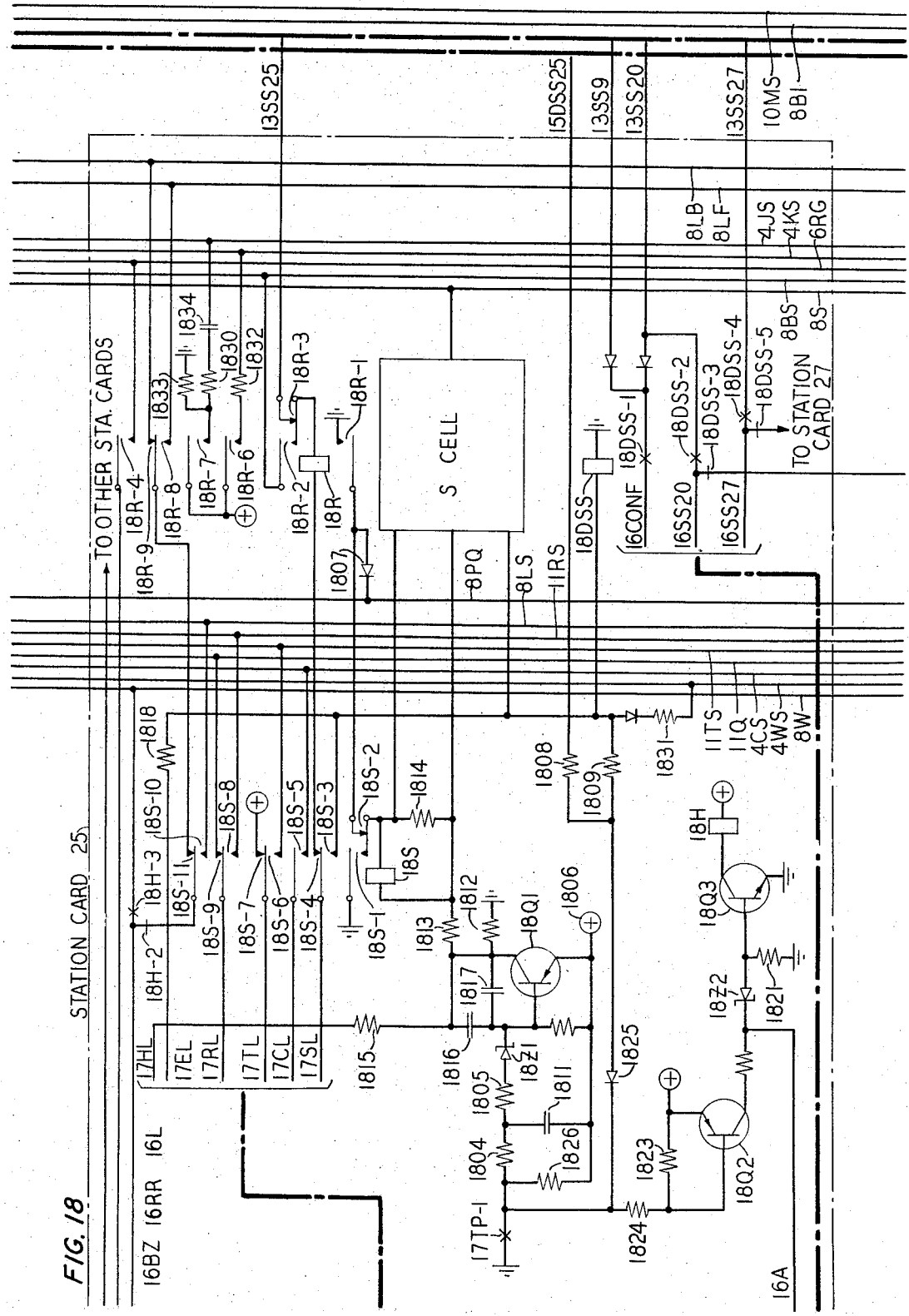

(A) Description of functional units (1) *General.*—FIGS. 3–20 are a schematic representation of an illustrative embodiment of the invention. The stations which may be connected to the intercom system may be provided with a variety of features. Not all of the stations need be equipped to receive the same services, the particular features provided each station being determined by customer requirements. A different station card is provided for each combination of services. Three of these cards are shown in the drawing. The simplest types of station cards are those represented in FIGS. 5 and 6, and in FIGS. 3 and 4. A more complex station card, providing all of the available services is represented in FIGS. 17 and 18. Each of the station cards is a plug-in unit. As more stations are added to the system more respective cards are inserted into the frame equipment (not shown). The station card of FIGS. 19 and 20 enables an outside line to be connected to the intercom system.

Certain conductors from the common equipment, FIGS. 7–15, such as conductor 7TL1HT, are connected to all of the station cards. Each of the station cards is therefore provided with terminals which connect to these conductors when the card is inserted in the frame. Certain others of the conductors, such as conductor 13SS4, are each connected to only a respective station card. These individually connected conductors are extended along the frame equipment. When a station card is added, a connection is made from those terminals requiring individual connections to the respective conductors. For example, the twenty conductors 13SS4–13SS37 (not consecutively numbered) are extended along the frame. If a particular station is given the extension number 4, when the respective station card is inserted in the frame a strap connection is made between the station card and conductor 13SS4. When any other station dials the digit 4 the particular station connected to conductor 13SS4 is rung. The twenty conductors 15DSS4–15DSS37 are similarly individually connected to the station cards.

FIGS. 7–15 comprise the common equipment of the system. Although the circuits disclosed in these separate figures are multifunctional, for descriptive purposes each of the circuits has been labeled in accordance with its primary function. A relay may be shown on one figure with its contacts on another figure. However, as most of the circuitry on each figure is related to a specific function each of the figures in the drawing has been suitably designated.

Whenever a station originates a call it is connected to the single signal link of the system. The calling party dials while connected to the signal link. When the called party answers, both parties are connected to the signal link. At this time both parties are transferred to an idle talking link, the signal link thus becoming free for another call. Supervision of each call after transfer from the signal link to a talking link is provided by a talking link control circuit connected to the respective talking link. The talking link control circuits are shown in FIG. 7, each connected to one of the talking links of the system. Only two such links and two respective control circuits are shown in the drawing. FIG. 7 also includes an allotter circuit for selecting an idle talking link before a call is transferred from the signal link.

FIG. 8 shows the supervision circuit for the signal link. The supervision circuit detects the presence of stations on the signal link, provides "system busy" information, "dumps" (retires) ringing on unanswered stations when a calling station's conference key is operated, sends "stop" signals to the allotter, and performs certain other functions.

Figure 10:
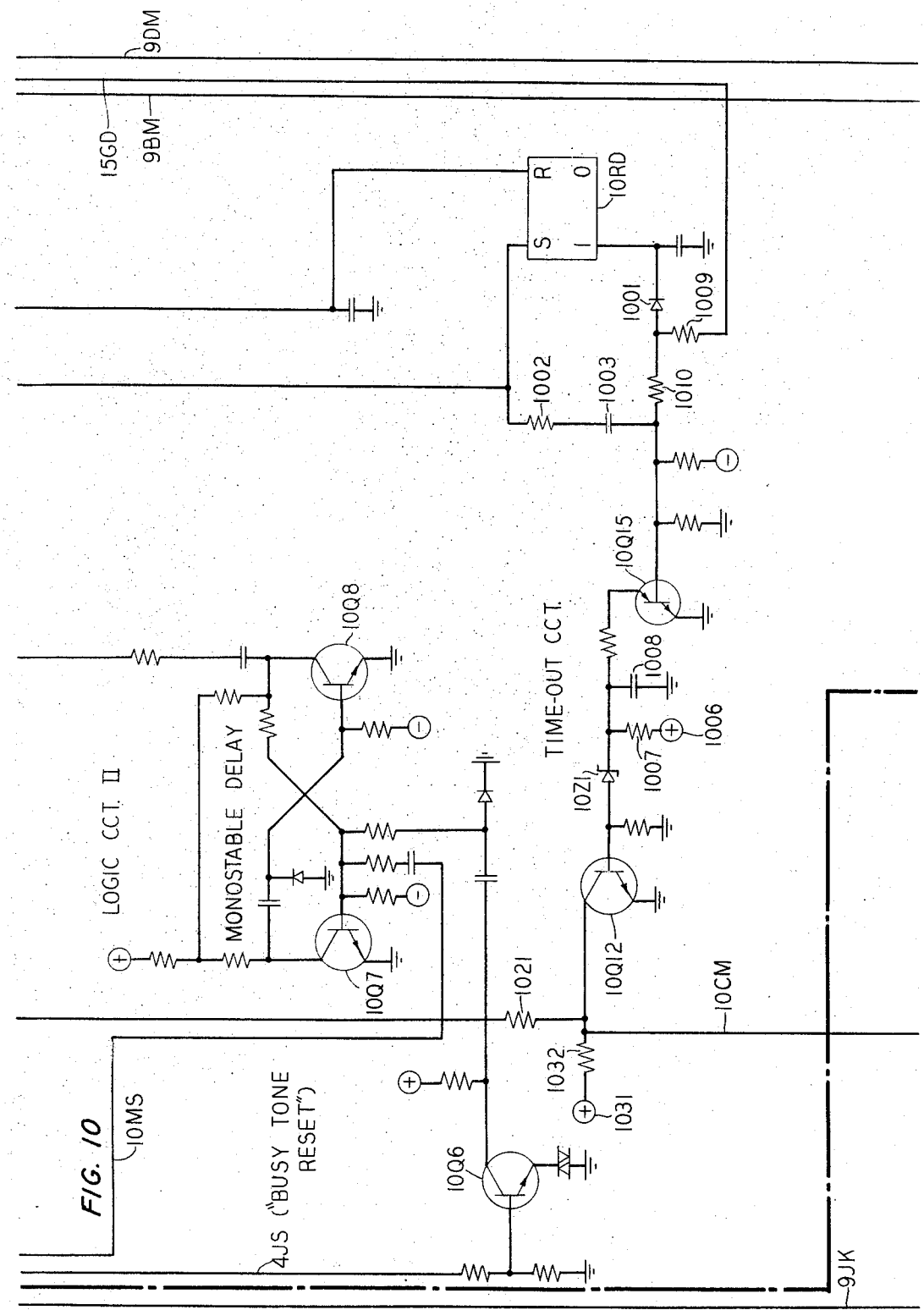
Figure 11:
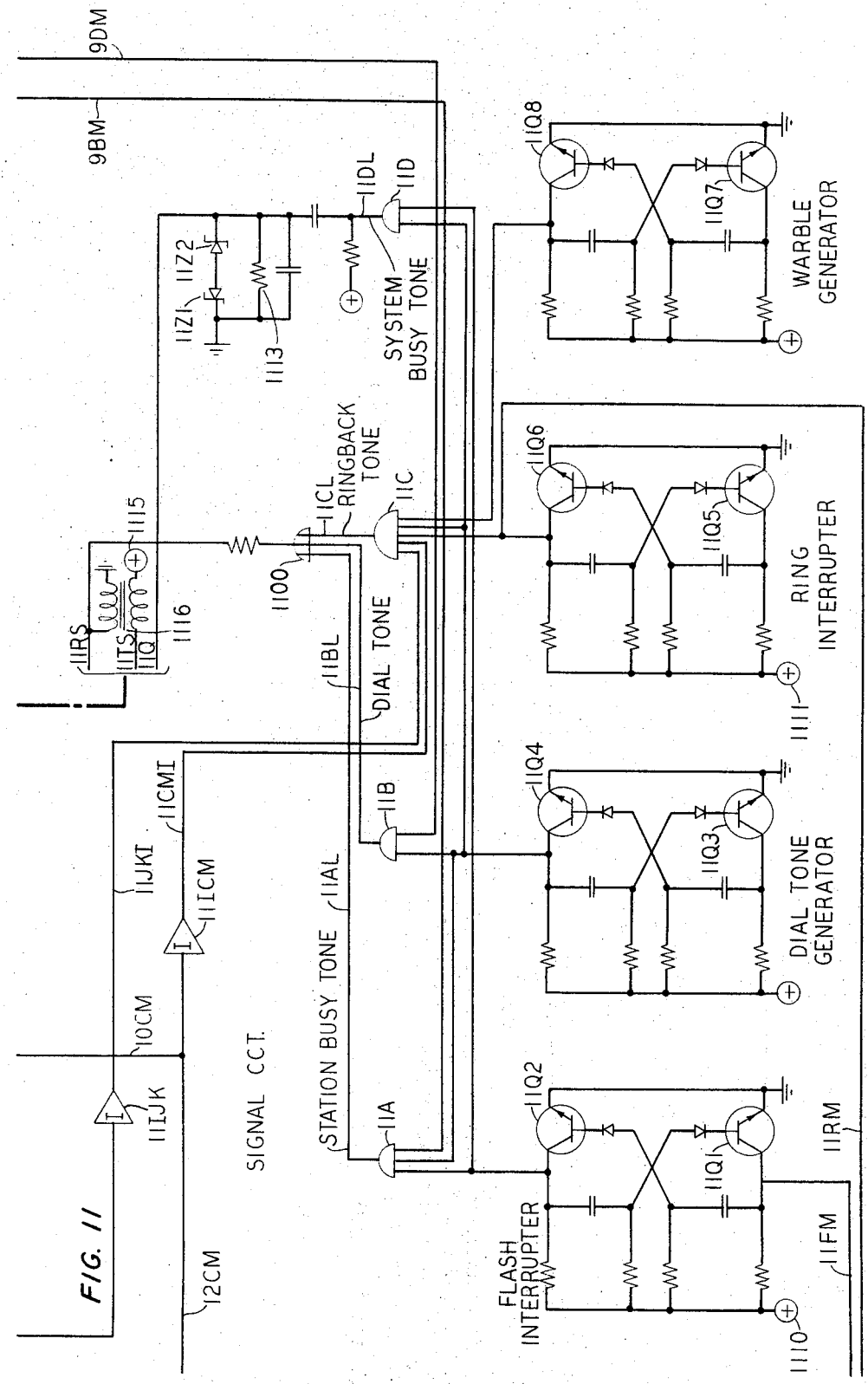

FIGS. 9 and 10 disclose the logic circuits which function primarily to keep track of the status of dial tone, ringback tone, and busy tone, to remember whether a conference call is in progress, and to send "start" signals to the talking link allotter. FIG. 11 shows the signal circuit which produces the four tones required in the system, i.e., station busy tone, system busy tone, dial tone, and ringback tone.

Figure 13:
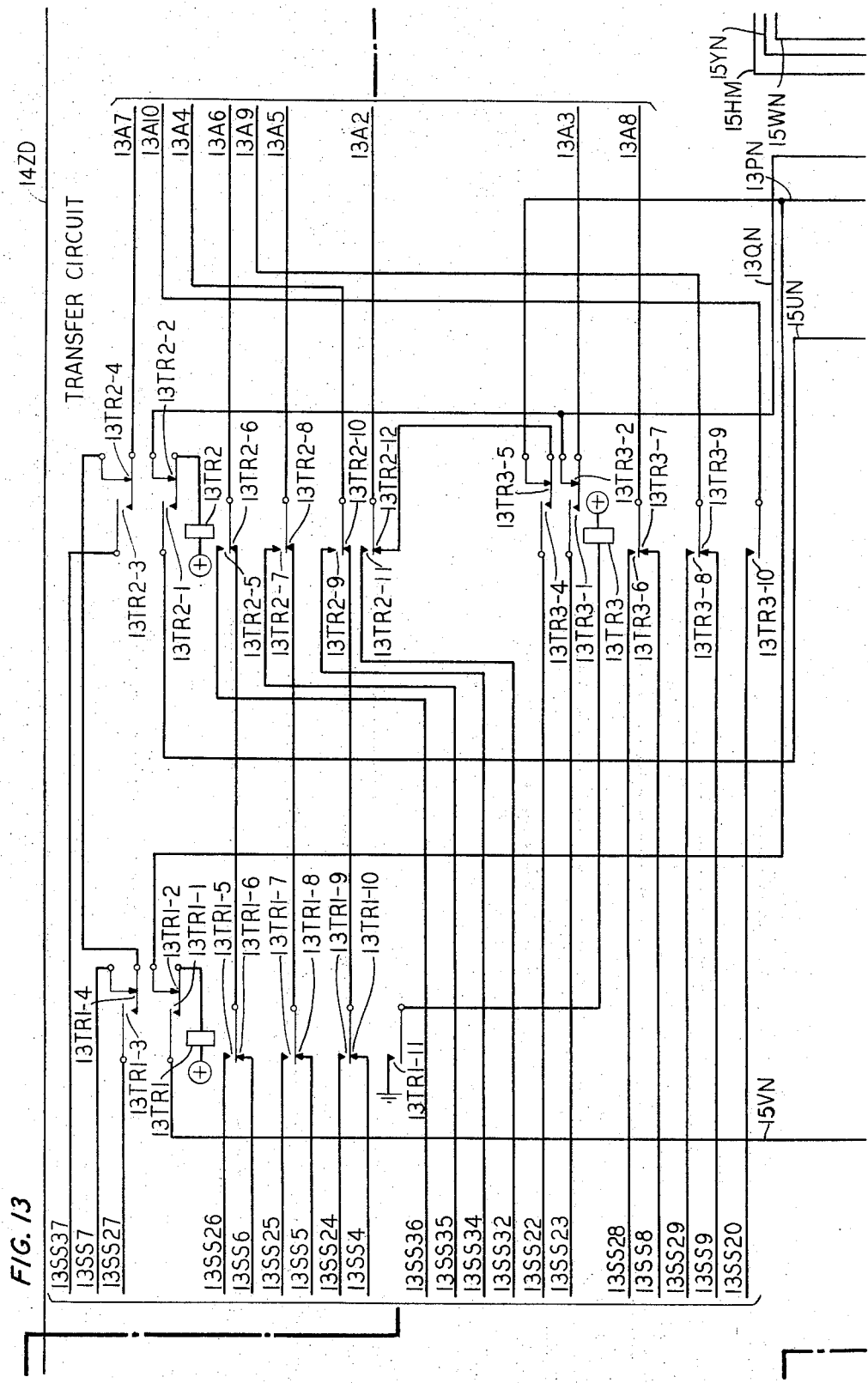
Figure 14:
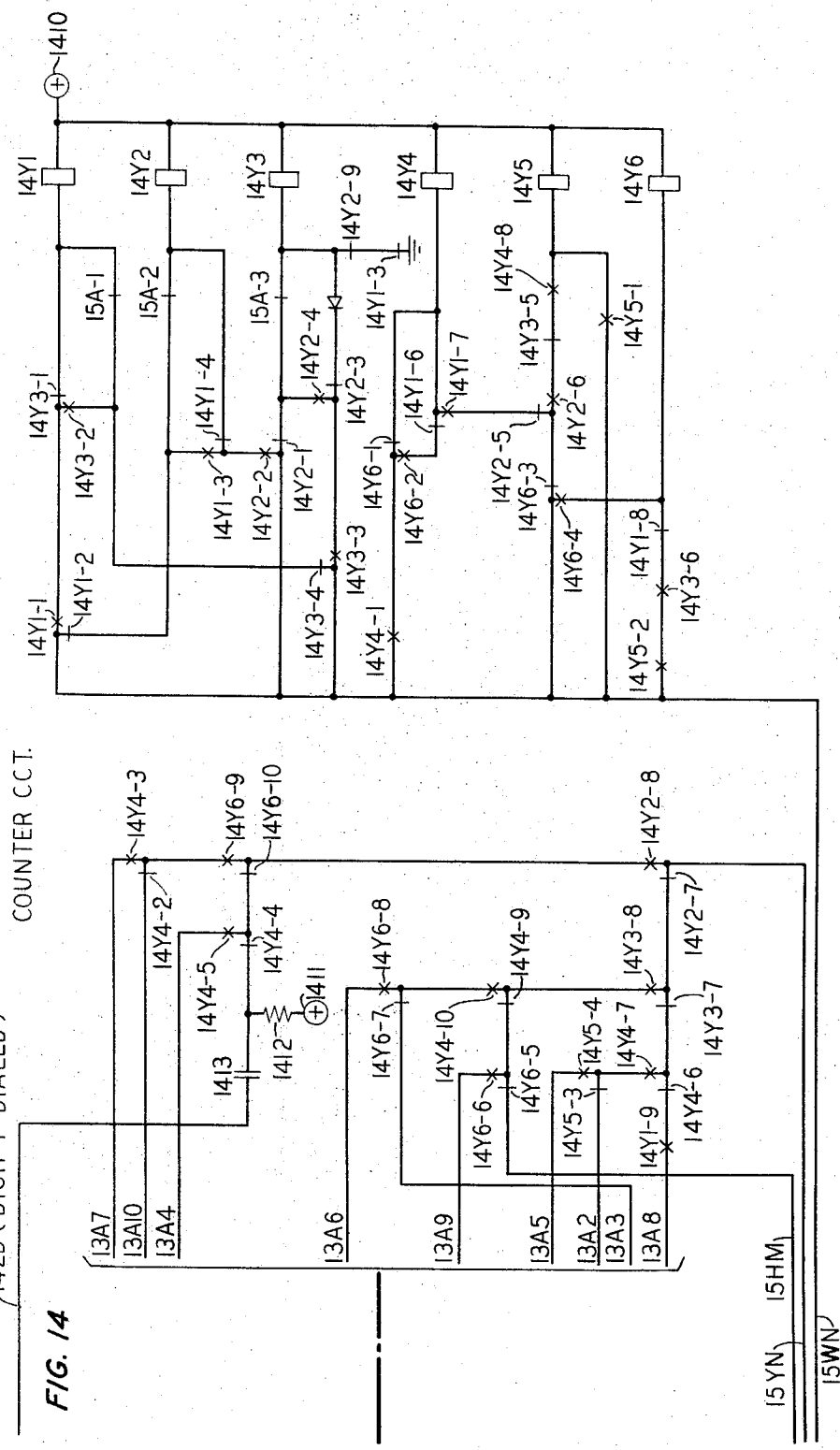
Figure 15:
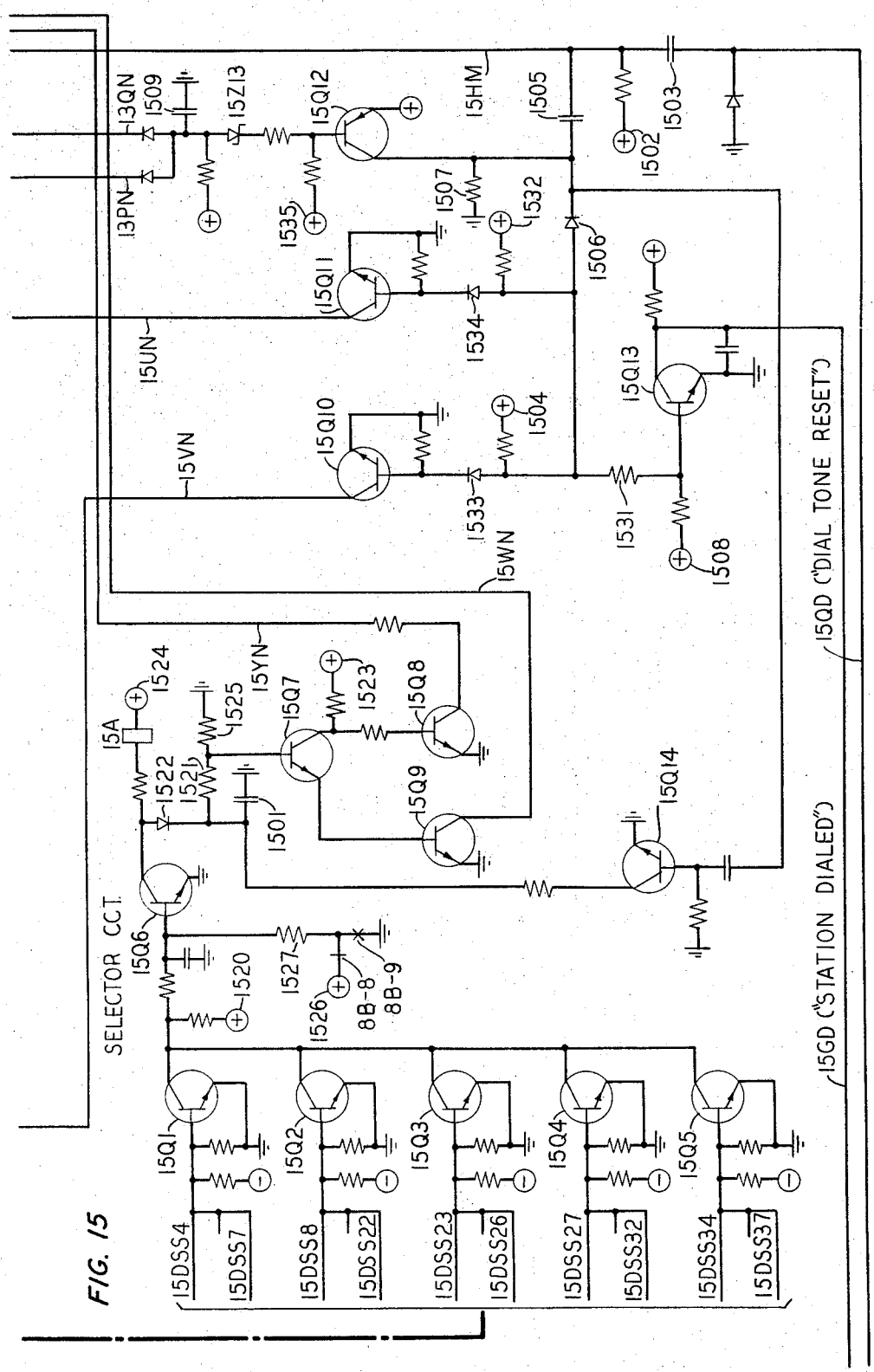

The transfer circuit of FIG. 13, the counter circuit of FIG. 14, and the selector circuit of FIG. 15 together control the selection of a particular one of the extensions, or the outside line, in response to the dialing by a calling party of the respective station number.

The system operation may be best understood by first considering some of the individual circuits, and by then tracing certain illustrative calls through the system.

(2) *Station circuit.*—The station card of FIGS. 5 and 6 provides a minimum number of features, but a summary of its operation will provide a sufficient background for the description of FIGS. 7–15.

There are four conductors extended from the station card of FIGS. 5 and 6 to station 4. Signals on conductor 5L control lamp signals at the station. Conductors 5T and 5R are the tip and ring conductors, and conductor 5C, the conference control conductor, is connected at the station through a nonlocking key 5PBCONF to ground. Conductor 5L is connected directly to the signal link circuitry in FIG. 6. Conductors 5T, 5R and 5C are connected through all of the talking links on FIG. 5 to the signal link circuitry of FIG. 6. The station card includes N different L relays, 5L1–5LN. Each of these relays controls the connection of the station tip, ring and conference control conductors to a respective talking link. The station card is also provided with a TP relay, 5TP, and an S relay, 6S, for controlling the connection of conductors 5T, 5R, 5L and 5C to the signal link. An R relay, 6R, is also provided to control ringing.

When the party at station 4 goes off-hook, tip conductor 5T is connected through relay winding 5TP and all of contacts 5L1–8 through 5LN–8, and contacts 6S–7 and 6R–5 to positive potential source 603. Ring conductor 5R is connected through all of contacts 5L1–6 through 5LN–6, contacts 6S–9, conductor 11Q and resistor 1113 to ground. Relay 5TP operates and at its make contact 5TP–1 (FIG. 6) grounds the base of transistor 6Q1 turning it on. Current flows from source 606 through the transistor, resistor 613, the winding of relay 6S, contacts 6S–2, diode 607, conductor 8PQ, and contacts 8P–1 to ground. Transistor 6Q1 conducts and relay 6S operates only if the signal link is not busy when the party at station 4 first goes off-hook; contacts 8P–1 (FIG. 8) are open whenever the signal link is in use. When relay 6S operates contacts 6S–7 open and contacts 6S–6 close. The tip conductor is thus transferred to conductor 11TS. Contacts 6S–9 open and contacts 6S–8 close. The ring conductor is thus transferred from conductor 11Q to conductor 11RS. Dial tone is provided through OR gate 1100 (FIG. 11) to conductor 11RS to notify the calling party to begin dialing. The operation of relay 6S and the closing of contacts 6S–3 also controls the connection of conductor 5SL through diode 6S1, and resistor 631 to conductor 4WS, and through resistor 618 to conductor 5EL. As the station is not yet connected to any talking link all of relays 5L1–5LN are unoperated, and all of contacts 5L1–12 through 5LN–12 are closed. The potential of source 501 is thus extended to conductor 5SL, and from this conductor to both conductor 5EL and conductor 4WS. The potential on conductor 5EL will later control the operation of one of relays 5L1–5LN to connect the station to an idle talking link. The potential on conductor 4WS notifies the supervision circuit on FIG. 8 that the signal link has been seized.

The calling party then dials a called party's number if a two-party call is to be established. Relay 5TP in tip conductor 5T follows the dial pulses. As contacts 5TP–1 operate pulses are transmitted to the selector circuit of FIG. 15 over conductor 15DSS4. The pulses on this conductor notify the selector circuit of FIG. 15 of the called party's identity. Although contacts 5TP–1 open and close during the dialing, transistor 6Q1 remains on due to the slow release circuit including capacitors 611 and 617. After the called party's number is dialed, dial tone is removed from conductor 11RS, and instead busy tone is applied if the called party is busy, or ringback tone is applied if the called party is rung. If the called party is available and answers, a talking link is then selected by the allotter of FIG. 7.

The positive potential already on conductor 5EL controls the operation of that one of relays 5L1–5LN associated with the chosen talking link. When the L relay operates, station 4 is transferred from the signal link to the talking link. For example, if talking link N is selected, when relay 5LN operates the ring conductor is connected through contacts 6 on all others of the L relays and contacts 5 on relay 5LN to conductor 7TLNRT. The tip conductor is connected through contacts 8 on all of the other L relays, and through contacts 7 on relay 5LN to conductor 7TLNTT. The tip and ring conductors of the other parties are also transferred from the signal link to conductors 7TLNTT and 7TLNRT. In a similar manner conductor 5C is transferred from conductor 5CL to conductor 7TLNCI.

Although the operated L relay is originally operated from the potential on conductor 5EL this potential is removed once the L relay operates. The potential is derived from source 501, and when contacts 12 on the operated L relay open, the positive potential is no longer extended to conductor 5EL. However, the positive potential of source 606, extended through transistor 6Q1 and resistor 615 to conductor 5HL, maintains the L relay operated over its "–1" contacts. Station 4 remains connected to the selected talking link until the calling party goes on-hook. At this time relay 5TP releases, contacts 5TP–1 open, and transistor 6Q1 turns off. A positive potential no longer appears on conductor 5HL and the operated L relay releases.

If instead of originating a regular call the party at station 4 originates a conference call, the nonlocking key 5PBCONF at the station is momentarily operated for applying a ground to conductor 5C before any number is dialed. In the immediately ensuing description the initiation of the call will be described with station 4 as the calling station. Thereafter, the completion of the call will be described as if the call had been originated by some other station and is being completed to station 4 as the called station. The ground is extended through all of contacts 5L1–10 through 5LN–10, and contacts 6S–5 to conductor 4CS. This signal notifies the supervision circuit that a conference call is to be established. Dial tone is returned in the ordinary manner, and the conference originator then dials the numbers of all parties desired. After each number is dialed, busy tone is applied to conductor 11RS if the called station is busy. Ringing is delayed however until after all of the called station numbers have been dialed, at which time the called stations are rung, and ringback tone is applied to conductor 11RS to notify the conference originator of the ringing. After all of the called parties have answered, a talking link is selected and all stations are transferred to it as are the two stations in a regular call.

If another party calls the party at station 4, conductor 13SS4 is momentarily grounded. The transfer circuit of FIG. 13 grounds the particular 13SS conductor associated when the station whose number has been dialed. If station 4 is available all of contacts 5L1–12 through 5LN–12 are closed, and the potential of source 501 is extended through these contacts, contacts 6S–4, the winding of relay 6R, and contacts 6R–3 to conductor 13SS4. If station 4 is already connected to a talking link, both relay 6S and one of L relays are operated and contacts 6S–4 and one set of contacts 12 on the L relays are open. The R relay of the called station does not operate if the called station is busy.

Assuming that the called station (now assumed to be station 4) is available, its R relay 6R operates, contacts 6R–3 open, and contacts 6R–2 close. The ground potential for holding relay 6R is thus provided through contacts 6R–2, conductor 8BS, contacts 8B–6 which are closed when the signal link is in use, and normally conducting transistor 8Q4. Contacts 6R–6 close and a positive "ringing supervision" potential is extended through these contacts to conductor 4KS. Normally nonconducting transistor 9Q1 turns on to notify the logic circuit that the called station is available because its R relay has operated. As the same time contacts 6R–7 close and a positive pulse is applied to conductor 4JS. When a ground potential is first applied to conductor 13SS4 for operating relay 6R the system assumes that station 4 is busy, and that the calling party should be provided with busy tone. If relay 6R operates however the "busy tone reset" pulse applied to conductor 4JS notifies the logic circuit that the station dialed is available because its R relay has operated. Busy tone is thus not provided for the calling party, and instead he receives ringback tone.

The operation of relay 6R also prepares the ringing current path for station 4. The tip conductor is connected through all of contacts 5L1–8 through 5LN–8, contacts 6S–7, and contacts 6R–4 to conductor 6RG. Ringing generator 811 controls the ringing at the called station when both of contacts 12I–1 and 12DR–1 are closed.

When station 4 goes off-hook to answer the ringing, the potential of source 819, extended through the tip conductor to the station, serves the same function as does source 603 in an originating call. Line current flows and relays 5TP and 6S operate. Station 4 is held connected to the signal link until all of the parties on this link are transferred to a talking link. It is necessary for the logic circuit to determine when the called party, or the called parties in a conference call, have answered. When station 4 answers, relay 6S operates and contacts 6S–4 open. Relay 6R thus releases, and when contacts 6R–6 open positive potential source 630 is no longer connected to conductor 4KS. When all of the called stations have answered there is no longer a "ringing supervision" potential on conductor 4KS, and transistor 9Q1 turns off. A "start" signal is transmitted to the allotter of FIG. 7, and all parties on the signal link are transferred to the first available talking link.

The S cell on FIG. 6 will be described below with reference to the C cell on FIG. 8.

Figure 12:
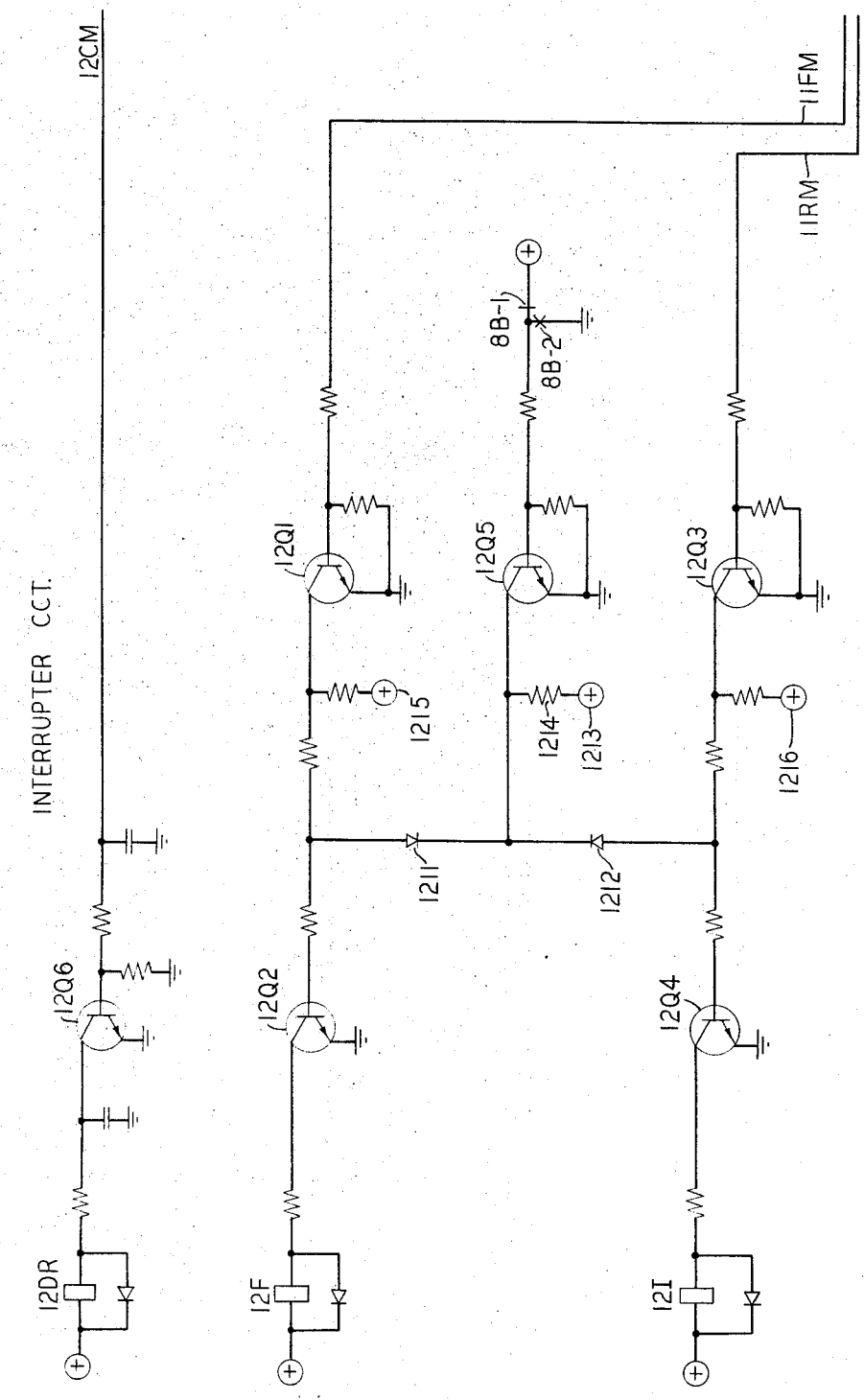

(3) *Interrupter circuit.*—The interrupter circuit of FIG. 12 contains three relays, 12DR, 12F, and 12I. The latter two relays operate at the flash and ring interruption rates respectively, and are used instead of the rotary mechanical interrupters often found in present day systems. The delay ringing relay 12DR serves to delay ringing in conference calls. The called stations are not rung until after all of them have been identified by the conference originator.

Relay 12F operates when transistor 12Q2 conducts, and relay 12I operates when transistor 12Q4 conducts. Whenever the signal link is not in use the operations of these relays are not required. When the signal link is idle relay 8B in the supervision circuit is unoperated. Contacts 8B–1 on FIG. 12 are closed and transistor 12Q5 conducts. Ground potential is extended through this transistor to the cathodes of both diodes 1211 and 1212. This ground potential is extended through these diodes to the base terminals of respective transistors 12Q2 and 12Q4. As a result, these transistors remain nonconducting and relays 12F and 12I remain unoperated. When the signal link is in use relay 8B is operated, contacts 8B–1 on FIG. 12 are open, and contacts 8B–2 are closed. Ground potential is extended to the base of transistor 12Q5 which thus turns off. The positive potential of source 1213 is now applied through resistor 1214 to the cathode terminals of diodes 1211 and 1212. These diodes are thus reverse biased, and transistors 12Q2 and 12Q4 are no longer prevented from conducting.

Conductor 11FM is continuously and alternately grounded and connected to a positive potential. Transistor 12Q1 thus alternately conducts. When the transistor conducts ground potential is extended through the transistor to the base of transistor 12Q2 to maintain the latter transistor off. When transistor 12Q3 is off however the positive potential of source 1215 serves to forward bias the base-emitter junction of transistor 12Q2 to turn this transistor on, provided the signal link is in use and relay 8B is operated. At this time relay 12F is operated. Similarly, ground and positive potentials are continuously and alternately applied to conductor 11RM to control the conduction of transistor 12Q3. When transistor 12Q3 conducts the ground potential extended through this transistor to the base of transistor 12Q4 maintains the latter transistor non-conducting and relay 12I unoperated. When transistor 12Q3 is off however the positive potential of source 1216 serves to forward bias the base-emitter junction of transistor 12Q4 to turn this latter transistor on and to operate relay 12I, provided relay 8B is operated.

Relay 12F controls the flashing of the station lamps of called stations whose R relays have been energized. Lamp supply 810 is connected through contacts 12F–1 to conductor 8LF. This conductor is connected through the station cards to the respective conductors, such as 5L, associated with stations whose lamps are to be flashed. Whenever relay 12F is operated and contacts 12F–1 are closed, the lamps of the stations to be flashed are powered by lamp supply 810.

Relay 12I controls the ringing and silent intervals of the ringing applied to any station. When station 4 is to be rung, an alternating ringing signal is applied to conductor 5T. This conductor is connected through contacts 4 on the operated R relay to common conductor 6RG. Conductor 6RG is connected in FIG. 8 through contacts 12DR–1 and 12I–1 to ringing generator 811. Whenever relay 12I is operated, during a ringing interval, ringing is applied to the called party or parties. During the silent intervals, when relay 12I is unoperated and contacts 12I-1 are open, the ringing is not supplied to the called parties. The output from the ringing generator 811 is steady, and the ringing and silent intervals are controlled by contacts 12I-1. The signal on the T conductor controls the ringing at a station, and the signal on the L conductor controls the flashing of a lamp at the same station.

Transistor 12Q6 is normally nonconducting and relay 12DR is normally unoperated. When a conference call is being established, ringing is delayed until all of the called parties' numbers are dialed by the calling party. From the time that the conference call is initiated until after all of the numbers have been dialed a positive potential is applied to normally grounded conductor 12CM. This positive potential turns on transistor 12Q6 which in turn operates relay 12DR. Contacts 12DR-1 on FIG. 8 thus remain open during the dialing of all numbers in a conference call. Ringing generator 811 can thus not supply ringing current to conductor 6RG. Only after all of the dialing has been completed by the conference originator is the positive potential removed from conductor 12CM. At this time the normal ground potential on this conductor turns off transistor 12Q6, and causes relay 12DR to release. Contacts 12DR-1 close and the called parties are rung.

In addition, contacts 12DR-2 on relay 12DR are closed during the operation of relay 12DR, and short circuit contacts 12F-1. Contacts 12F-1 control the flashing of the lamps at the called stations. Until ringing is provided, contacts 12DR-2 insure that even the stations to be rung are provided a continuous lamp signal; the continuous lamp signal being the "system busy" indication.

(4) *Signal circuit.*—The signal circuit of FIG. 11 generates the four tones required in the system, and in addition provides the alternating ground and positive potentials on conductors 11FM and 11RM for controlling the operations of relays 12F and 12I. Transistors 11Q1 and 11Q2 comprise the flash interrupter astable multivibrator. These transistors alternately turn off and on. When transistor 11Q1 conducts ground potential is applied to conductor 11FM. When transistor 11Q2 conducts and transistor 11Q1 is off, the positive potential of source 1110 is extended to conductor 11FM. Transistors 11Q5 and 11Q6 comprise the ring interrupter astable multivibrator. These transistors also alternately conduct. When transistor 11Q6 conducts, ground potential is applied to conductor 11RM. When the transistor is off the positive potential of source 1111 is extended to conductor 11RM.

In addition to the flash interrupter and ring interrupter astable multivibrators two other similar circuits are provided on FIG. 11. The dial tone generator astable multivibrator comprises transistors 11Q3 and 11Q4. The warble generator astable multivibrator comprises transistors 11Q7 and 11Q8. The outputs of the four multivibrators are combined in AND gates 11A–11D to provide the four tones required in this system.

The dial tone generator oscillates at a frequency of approximately 600 cycles per second. The 600 cycle tone is applied to one input of AND gate 11B. The other input of AND gate 11B is connected to conductor 9DM. When this conductor is positive in potential 600 cycle per second pulses appear on the dial tone conductor 11BL. The two inputs to AND gate 11D are 600 cycle pulses from the dial tone generator and pulses from the flash interrupter. Each transistor in the flash interrupter alternately conducts for one half second, the frequency of the multivibrator being one cycle per second. Thus the system busy tone on conductors 11DL and 11Q consists of a silent interval of one half second alternating with one half second of dial tone. The system busy tone is provided to any station which goes off-hook when the signal link is busy. The station's S relay is prevented from operating and the ring conductor remains connected to conductor 11Q. Until the signal link is freed a new call may not be placed.

Station busy tone is used to notify the calling party that a called party is busy. This tone is the same as the system busy tone but at a higher volume. Two of the three inputs of AND gate 11A are connected to the flash interrupter and dial tone generator. If conductor 9BM, connected to the third input of AND gate 11A, is positive in potential dial tone appears on station busy tone conductor 11AL in alternate half seconds. Ringback tone is provided to a calling party while the called party or parties are being rung. The ringback tone is derived from combining the outputs of the ring interrupter, warble generator and dial tone generator. Transistor 11Q6 in the ring interrupter is off for one second followed by a three second period of conduction. Consequently, a positive pulse is applied to the input terminal of AND gate 11C connected to this transistor for one second out of every four. The warble generator oscillates at a frequency of 33 cycles per second, with both transistors conducting for the same length of time in each cycle. The pulse waveform at the collector of transistor 11Q8 is applied to a second of the five input terminals of AND gate 11C. The dial tone generator is connected to a third one of the three input terminals of AND gate 11C. The other two input terminals of AND gate 11C are connected to conductors 11JKI and 11CMI. Ringback tone appears on conductor 11CL only when positive potentials are applied to both of these conductors.

All three of conductors 11AL, 11BL and 11CL are connected to respective inputs of OR gate 1100. Only one of the three AND gates 11A, 11B and 11C is operated at any one time. The tone from the operated gate is transmitted through OR gate 1100 to conductor 11RS. The tone is extended through the respective station card to the station requiring it. The system busy tone at the output of AND gate 11D is applied to conductor 11Q. This conductor is connected through the respective station card to any station which goes off-hook at a time when the signal link is already in use.

(5) *Supervision circuit.*—The supervision circuit of FIG. 8 serves a variety of functions. When any station is connected to the signal link a positive voltage is applied to the common conductor 4WS through the respective station card. If one or more stations are connected to the signal link, the positive voltage on conductor 4WS, applied through resistor 801 and potentiometer 8VR1 to the base of transistor 8Q2, turns the transistor on. When transistor 8Q2 conducts relay 8B operates. The operation of relay 8B indicates that the signal link is busy. When relay 8B operates contacts 8B–6 close. Transistor 8Q4 is normally conducting, and at this time ground potential is extended through the transistor and contacts 8B–6 to conductor 8BS. This ground provides a hold-up path for the station ringing relays, such as 6R, in the station circuits. At the same time contacts 8B–4 open and contacts 8B–5 close. Conductor 8BC is no longer connected to positive source 802, but is instead connected through contacts 8B–5 to ground. The ground potential on conductor 8BC allows flip-flops 9DT and 10RD to be reset and set respectively when required. In addition, when relay 8B operates contacts 8B–3 close and relay 8P operates. Operation of relay 8P causes contacts 8P–2 to close. Lamp supply 810 is connected through these contacts to conductor 8LB. This conductor is extended to all of the on-hook station L conductors, such as 5L. The steady lamp on each station indicates that the system is busy, and that no station should originate a call. The operation of relay 8P also causes contacts 8P–1 to open. Conductor 8PQ is normally connected to ground through these contacts, and connects the winding of each of the station S relays, such as 6S, to ground for enabling these relays to operate when the respective stations go off-hook. Ordinarily an S relay operates whenever the respective station goes off-hook, the S relay connecting the station to the signal link. With contacts 8P–1 open however no station going off-hook may be connected to the signal link, and privacy for stations already on the signal link is insured. The only stations which may be connected to the signal link are those which are rung. These stations have their respective ringing relays, such as 6R, operated, and the operation of these relays provides another operating ground potential over contacts 1 for the respective S relays.

Conductor 7WK is normally at ground potential. However, when all of the talking links are busy this conductor is positive in potential. At this time transistor 8Q3 conducts, and relay 8P is operated through this transistor rather than through contacts 8B–3. When all of the talking links are busy no new calls may be placed. The opening of contacts 8P–1 prevents any new stations from being connected to the signal link. The closing of contacts 8P–2 supplies the lamp signal to all of the on-hook stations indicating that service cannot be provided at the present time. (Although no new stations may originate calls, those stations already connected to others on the various talking links may initiate conference calls as no additional talking links are required to convert a two-party to a three-party call, or a conference call involving three parties to a four-party conference. The establishment of a conference call will be described below.)

The supervision circuit of FIG. 8 advantageously limits the number of stations in a conference to a suitable number of parties. For example, potentiometer 8VR1 may be adjusted so that if four stations are connected to the signal link the current in conductor 4WS raises the potential of the junction of resistors 801 and 803 to a value sufficient for breaking down normally nonconducting Zener diode 8Z1. Transistor 8Q1 is normally nonconducting, the emitter-base junction being reverse biased by negative source 804. However, when Zener diode 8Z1 breaks down the positive potential on conductor 4WS is extended through the Zener diode to the base of this transistor which turns on. Transistor 8Q4 is normally conducting. Positive potential source 805 is sufficient in magnitude to normally maintain Zener diode 8Z3 conducting in the reverse direction, and the base-emitter junction of transistor 8Q4 forward biased. However, when transistor 8Q1 turns on, the cathode of Zener diode 8Z3 is grounded through diode 806 and transistor 8Q1. Zener diode 8Z3 ceases to conduct, and transistor 8Q4 turns off. Normally conducting transistor 8Q4 supplies the ground potential through contacts 8B–6 to conductor 8BS for holding the station ringing relays, such as 6R, operated. The station ringing relay must operate before any called party may be rung. When the ground potential is removed from conductor 8BS no stations may be rung, and consequently no additional stations may be connected to the signal link. Transistor 8Q4 is turned off through transistor 8Q1 to prevent the ringing of any new stations only when the maximum of four stations are connected to the signal link. Thus if a fourth station is to be added to a three-party conference, the original three stations are first connected to the signal link and the fourth station number is dialed. As transistor 8Q4 is conducting and ground potential is applied to conductor 8BS the station ringing relay of the fourth party may be operated, and the fourth party may be connected to the signal link. All four parties are then transferred to a talking link. However, if four parties are already engaged in a conference, a fifth party may not be added. If the four parties notify the supervision circuit of a request to add a station to the conference, although the four parties will be transferred from their talking link to the signal link, the instant that they are so connected transistor 8Q1 turns on and transistor 8Q4 turns off. Thus a fifth station may not be brought in the conference as there is no ground potential on conductor 8BS for operating the station ringing relay of this station. Conferences are thus advantageously limited to a maximum number of four stations to insure that the stations in a conference will have adequate transmission capabilities.

Transistor 8Q4 may also be turned off in order to remove the ground potential from conductor 8BS and thereby retire ringing on a conference call. When a conference call is established all of the called station numbers are dialed before ringing is applied to the called stations. The ringing is applied to all stations simultaneously, and the ringing is automatically retired only when all of the called stations have answered by going off-hook. However, in the event that one or more stations do not answer it is necessary to provide alternate means for retiring the ringing. The ringing may be retired by removing the ground potential from conductor 8BS. With the ground potential removed the station ringing relays associated with unavailable called parties are released, just as they would have been had the called parties answered. With the release of all of the station ringing relays the system automatically retires ringing. To remove the ground potential from conductor 8BS ground potential is applied to conductor 4CS. Conductor 4CS is extended to all of the stations connected to the signal link by the conference conductors such as 5C. One of the parties already in the conference operates his nonlocking conference key which applies a ground potential to the respective C conductor. The ground potential is extended to conductor 4CS through the signal link, and has the same effect as the conduction of transistor 8Q1. Zener diode 8Z3 turns off and transistor 8Q4 ceases to conduct. The station ringing relays which are not released by the unavailable called parties going off-hook are now released with the removal of the ground holding potential on conductor 8BS. All of the station ringing relays are thus released, ringing is automatically retired, and the parties in the conference are transferred to a talking link.

The supervision circuit also controls the transmission of a "stop" signal to the allotter circuit of FIG. 7. The original party or parties on the signal link dial all of the called station numbers. After all of the called stations have answered, or one of the conferees has operated his conference key to retire the ringing from unavailable called stations, a signal is sent from the logic circuit to the allotter to select an idle talking link. The allotter scans all talking links from left to right, and when an idle link is found all of the parties connected to the signal link are transferred to the talking link. At this time the allotter is told to stop scanning the talking links as the parties are already connected to each other over a talking link. When all of the parties originally connected to the signal link are transferred to a talking link, the positive potential is no longer applied to conductor 4WS as there are no longer any stations connected to the signal link. At this time transistor 8Q2 turns off. While the stations were connected to the signal link transistor 8Q2 was conducting and ground potential was applied to conductor 8KK. However, when transistor 8Q2 goes off the positive potential of source 807 is extended to conductor 8KK. This potential notifies the allotter to cease scanning the talking links. In the event that the party or parties on the signal link hang up before they are transferred to the talking link, for example, if the calling station is calling only one called station which station does not answer, a "stop" signal is still sent to the allotter when transistor 8Q2 turns off. As the allotter has not begun to operate the stop signal has no effect.

Contacts 8P–2, 12F–1 and 12DR–2 control the lamp signals extended to each station. Alternating current supply 810 controls a continuous lamp signal when current flows to a station lamp. The L conductor of each station is connected through normally closed contacts on the respective S and R relays to conductor 8LB. When the system is busy and contacts 8P–2 are closed, the lamps of all stations which are on-hook and not being rung are connected to source 810, and the lamps light continuously. When a station is being rung however contacts 9 on the respective R relay are open and contacts 8 are closed, and the L conductor is connected to conductor 8LF rather than 8LB. Contacts 12F–1 open and close at the rate determined by the flash interrupter on FIG. 11, and a flashing signal is supplied to those stations being rung. In the event a conference call is being established ringing is delayed until the R relays of all called parties are operated. It is therefore desirable that the flashing lamp signal be delayed as well. Relay 12DR is operated while the called stations are being dialed in the course of establishing a conference. Contacts 12DR–2 on FIG. 8 are thus closed, and although contacts 12F–1 open and close continuously, conductor 8LF is shorted through contacts 12DR–2 to source 810. Thus, although an available station whose number is dialed in the course of establishing a conference has its R relay operated and its L conductor connected to conductor 8LF, the lamp at the station remains continuously operated and the subscriber remains alerted that the system is busy. It is only after relay 12DR releases, after all called numbers have been dialed, that contacts 12F–1 control the flashing of the lamps at the called stations.

The C cell on FIG. 8 and the S cells, one on each station card, serve to prevent a system tie-up by a permanently off-hook line. When the system is idle and a party goes off-hook the signal link is seized. While the system is busy no other service requests may be originated. If the station having seized the signal link remains off-hook without dialing, the signal link, and therefore the system, are tied up indefinitely. The C cell, together with the S cell of the station having seized the signal link, insure that the station remains connected to the signal link for no longer than 30 seconds. An identical S cell is provided on each station card, and for this reason only the S cell on station card 4 is shown in detail.

PNPN triode 640 is normally nonconducting. When station 4 is off-hook and connected to the signal link, transistor 6Q1 is conducting and a positive potential is applied to the anode of PNPN triode 640. The triode remains off however as negative source 641 is connected through resistor 642 to the control electrode. The positive potential of source 501 is extended through contacts 5L1–12 through 5LN–12 and 6S–3 to conductor 643. This potential would ordinarily be transmitted through resistor 644 and diode 645 to the control electrode to turn on the PNPN triode. However, diode 646 shorts the potential to common conductor 8S which is connected through resistor 840 in the C cell to ground. Diode 645 is thus reverse biased and the PNPN triode remains off.

Double base diode 841 is normally nonconducting. When the signal link is idle contacts 8B–10 are closed, and ground potential is extended through these contacts and resistor 842 to the emitter electrode of the double base diode. When the signal link is first seized relay B operates, and contacts 8B–10 open. Current flows from source 843 through resistor 844 and capacitor 845 to ground. The capacitor begins to charge, and after 30 seconds a sufficiently positive potential appears on the emitter electrode to fire the double base diode. A positive pulse appears on conductor 8S, and diode 646 is reverse biased. At this time the positive potential on conductor 643 is transmitted through resistor 644 and diode 645 to turn on PNPN triode 640. When the triode is turned on ground potential is extended from its cathode to its anode. The anode of the triode is connected to one end of the winding of relay 6S. Ground potential now appears at the junction of resistor 613 and the relay winding, and the relay releases. When the relay releases the signal link is freed just as it is when station 4 goes on-hook. The signal resistor 642 to the control electrode. The positive potential 4 remains off-hook relay 5TP is operated and contacts 5TP–1 remain closed. Transistor 6Q1 continues to conduct and PNPN triode 640 remains on. Relay 6S is thus held unoperated. Only when the party at station 4 goes on-hook does relay 5TP release, contacts 5TP–1 open, transistor 6Q1 turn off, and PNPN triode 640 cease to conduct. Until the party goes on-hook relay 6S cannot reoperate to seize the signal link.

Only one C cell is required in the system. The positive pulse on conductor 8S, after the 30 second time-out, fires the PNPN triodes in all S cells in the station cards connected to the signal link. Parties are given a maximum of 30 seconds to effect any system action.

The S cell in each station card serves in another capacity. The ground potential for controlling the operation of relay 6S is normally on conductor 8PQ. When the system is busy contacts 8P–1 are open, and a party may not control the operation of his S relay for originating a service request. However, as soon as the signal link becomes idle and contacts 8P–1 close, the S relay of an off-hook subscriber would normally operate. If two or more stations have ignored the system busy signal more than one S relay might operate and more than one party would be connected to the signal link. For this reason additional circuitry is provided to insure that the S relay of an off-hook station may operate only after the off-hook party goes on-hook, and then off-hook again.

Although the winding of relay 6S connected to contacts 6S–2 is not connected to ground over conductor 8PQ when the signal link is busy, it is connected to ground through resistor 647, diode 648 and resistor 649. Current can thus flow through transistor 6Q1 and the winding of relay 6S. The current is negligible however due to the magnitude of resistor 647, and relay 6S remains unoperated. But the positive potential developed across resistor 649 is sufficient to fire PNPN triode 640. Ground potential is now applied to the collector of transistor 6Q1 through the triode and resistor 613. Transistor 6Q1 remains conducting as does triode 640. The ground potential at the anode of the triode maintains relay 6S unoperated—even after the signal link becomes idle. Only if the party having ignored the system busy signal goes on-hook does transistor 6Q1 go off and triode 640 ceases to conduct. Thereafter, when the same party goes off-hook to seize the signal link the ground potential for enabling transistor 6Q1 to conduct is extended from conductor 8PQ through contacts 6S–2 and the relay winding. The current from transistor 6Q1 is sufficient to operate relay 6S as resistor 647 is no longer in the current path to limit the current.

(6) *Talking link control circuits and allotter.*—The principal parts of FIG. 7 are the individual talking link control circuits, each associated with one of the system's talking links, and the allotter. Clock pulser 700 continuously applies pulses to the input of gate 701. This gate is enabled only when flip-flop 702 is in the 1 state. The flip-flop is set in this state when the "start" signal is applied to conductor 9JK. At this time the clock pulses pass through gate 701 to the input of ring counter 703. The output conductor of each of the ring counterstages is ordinarily at a negative potential. When the first clock pulse is applied the output conductor of the first stage goes positive in potential. The next clock pulse causes this stage to go negative once again, and the output conductor of the next stage to go positive. This process continues until a "stop" signal is applied to conductor 8KK. At this time flip-flop 702 is reset. Gate 701 is no longer enabled, and the 0 output of the flip-flop resets ring counter 703 with the output conductors of all stages negative in potential.

When the first stage of ring conductor 703 is energized its output conductor goes positive in potential. If the first talking link is in use transistor 7Q2 is conducting. Ground potential is extended through this transistor and diode 704 to the base of transistor 7Q1. This latter transistor cannot turn on even though the output conductor of the first stage of the ring counter is positive in potential. No further system action takes place until the next clock pulse from pulser 700 de-energizes the first stage of the ring counter and energizes the second. However, if the first talking link is not in use transistor 7Q2 is off. The positive potential on the output conductor of the first stage is applied through resistors 727, 705 and 706 to the base of transistor 7Q1. This transistor turns on. Ground potential is extended through the transistor to conductor 7TL1ET. This ground potential is applied to the E1 conductor associated with the L1 relay on each station card. All of the L1 through LN relays of those stations connected to the signal link are as yet unoperated. The potential of source 501, for example, is thus extended through contacts 5L1–12 through 5LN–12, conductor 5SL, contacts 6S–3, resistor 618, conductor 5EL, and diodes 5KDN–5KD1 to contacts 5L1–2. All of the L1 relays whose stations are connected to the signal link operates at this time, the positive allotter potential at the base of transistor 7Q1 enabling this transistor to provide the ground for the L1 relay windings. When relay 5L1 operates contacts 5L1–5 and 5L1–7 close. Conductor 5R is connected through contacts 5L1–5 to conductor 7TL1RT. Conductor 5T is connected through the winding of relay 5TP and contacts 5L1–7 to conductor 7TL1TT. A path is thus provided from positive source 707 through the primary winding of transformer 7TL1TR, conductor 7TL1TT, contacts 5L1–7, the winding of relay 5TP, the tip conductor of station 4, ring conductor 5R, contacts 5L1–5, conductor 7TL1RT, and the secondary winding of transformer 7TL1TR to ground. Positive source 707 supplies power for station 4. In a similar manner the other stations connected to talking links have their respective tip and ring conductors connected to conductors 7TL1TT and 7TL1RT. The subscribers at these stations can thus carry on a conversation over the talking link. All of the station tip and ring conductors are connected in parallel to the windings of transformer 7TL1TR. This transformer provides a high impedance to alternating currents while at the same time providing positive talking battery.

It should be noted that the only stations transferred to the first available talking link are those connected to the signal link. The potential source, such as 501, on each station card which controls the operation of an L relay is connected through contacts 12 on all of the respective L relays, and through contacts 3 on the respective S relay to the winding of the L relay to operate. This potential source is unable to control the operation of an L relay of a station already connected to another talking link because another L relay is already operated and the respective contacts 12 are open. And stations not connected to other talking links do not have an L relay operated at this time because their respective S relays are unoperated and contacts 3 on these relays are open. Only those stations connected to the signal link have their respective L relays in the selected talking link operated.

The signal link is held as long as a positive potential appears on the SL conductor of one of the station cards. If station 4 is one of those connected to the signal link the potential of source 501 is originally extended through contacts 5L1–12 through 5LN–12, conductor 5SL, closed contacts 6S–3, diode 651, and resistor 631 to conductor 4WS. In a similar manner a positive potential is extended to conductor 4WS through the station card of each of the stations connected to the signal link. When all of the original stations connected to the signal link have their L relays operated, with the respective contacts 12 open, the positive potentials on all of the respective SL conductors are removed. A positive potential no longer appears on conductor 4WS and the supervision circuit is notified that all of the stations on the signal link have been transferred to the talking link.

All of the stations which are off-hook have their respective TP relays operated. The respective Q1 transistors, such as 6Q1, conduct and positive potentials are extended through the transistors to the respective HL conductors. The positive potential on conductor 5HL, for example, is extended through contacts 5L1–1, the winding of relay 5L1, contacts 5L1–3, and conductor 7TL1HT to the collector of transistor 7Q2. Contacts 5L1–11 are closed and the potential of positive source 501 is extended through these contacts to conductor 7TL1ST. Zener diode 7Z conducts in the reverse direction and applies a positive potential to the base of transistor 7Q2. This transistor thus turns on. The ground potential on conductor 7TL1HT insures that the first talking link will not be seized during a subsequent operation of the allotter. At the same time this ground potential provides a hold-up path through contacts 5L1–1 and 5L1–3 to conductor 5HL to maintain relay 5L1 operated. In a similar manner all other stations connected to the first talking link have their L1 relays held operated by the positive potentials on the respective HL conductors extended through the respective relay windings, and the first and third contacts on these relays to grounded conductor 7TL1HT. If the selected talking link is any one other than the first the operation is similar. The positive potentials on the HL conductors maintain the L relays operated. The transistor equivalent to 7Q2 in any other talking link control circuit is again held on by sources such as 501, the source being extended through contacts 12 on unoperated L relays to contacts 11 on the operated L relays of the station cards.

When any station connected to the first talking link hangs up the respective TP relay releases. The respective Q1 transistor, such as 6Q1, turns off and a positive potential is no longer applied to the respective HL conductor. The respective operated L relay releases. As long as one station connected to the first talking link remains off-hook transistor 7Q2 is maintained conducting from the positive potential extended through the respective HL conductor and the L1 relay. Only when all of the stations go on-hook does transistor 7Q2 turn off. At this time the first talking link is again available, and in a subsequent operation of the allotter will be seized when transistor 7Q1 turns on.

If all of the talking links are in use new calls may not be originated. Transistor 7Q3 conducts if at least one talking link is idle. Potential source 742 maintains the transistor conducting unless all of conductors 7TLB1–7TLBN are grounded. Each of these conductors is grounded when the respective talking link is being used. When all links are busy transistor 7Q3 turns off. Conductor 7WK is no longer grounded through the transistor, but is instead maintained at a positive potential by source 724. Transistor 8Q3 turns on and relay 8P operates. Contacts 8P–1 open and new calls may not be originated as the ground potential on conductor 8PQ is removed. Stations already on a talking link however may transfer to the signal link for the purpose of bringing other parties into the conference. These stations already have their S relays held operated by contacts 1 on these relays, and consequently the absence of the ground potential on conductor 8PQ does not prevent their seizing the signal link. When one of the talking links becomes idle, transistor 7Q3 turns on and transistor 8Q3 turns off once again. At this time a new station may seize the signal link to originate a call.

(7) *Logic circuits.*—FIGS. 9 and 10 are the logic circuits (I and II) which keep track of the status of dial tone, ringback tone and busy tone, remember whether or not a conference call is in progress, and send "start" signals to the allotter. Dial tone is ordinarily applied to conductor 11BL and through OR gate 1100 to conductor 11RS. If the party at a station has not ignored the system busy lamp signal, he will be provided with dial tone when he first goes off-hook; the ring conductor is connected to conductor 11RS rather than 11Q when the S relay operates. Dial tone flip-flop 9DT is normally held in the 1 state, the positive potential of source 802 being extended through contacts 8B–4 to the set terminal of the flip-flop. When the flip-flop is in the 1 state the 0 output is grounded. Inverter 9IDT applies a positive potential to conductor 9DM, connected to one of the inputs of AND gate 11B. When a subscriber originates a service request flip-flop 9DT remains in the set state even though the set input is grounded when relay 8B operates. The flip-flop is reset only when a pulse is applied to the reset terminal. Thus after a subscriber originates a service request conductor 9DM is maintained at a positive potential to enable AND gate 11B, and dial tone is provided on conductor 11RS to be extended to the subscriber.

After the subscriber at the originating station begins dialing the number of a called station a "dial tone reset" pulse is applied to conductor 15QD to reset flip-flop 9DT. Dial tone is no longer required, and with the flip-flop in the 0 state conductor 9DM is grounded to remove dial tone from conductor 11BL. To prevent the retiring of dial tone in case the originating party accidentally depresses his switchhook, with the resulting digit 1 being transmitted to the selector circuit of FIG. 15, a pulse is applied to conductor 14ZD. Although flip-flop 9DT is first reset by the pulse on conductor 15QD, the pulse appearing thereafter on conductor 14ZD sets the dial tone flip-flop once again so that the originating station is still provided with dial tone. (Because this safeguard against switchhook fumbling is provided no station in the system may be called by dialing the digit 1.)

The selector circuit of FIG. 15 applies a pulse on the dial tone reset conductor 15QD, followed by a pulse on the station dialed conductor 15GD. The first pulse resets flip-flop 9DT. Conductor 9DM is now grounded, and AND gate 11B no longer operates. Dial tone is removed from conductor 11BL as the calling station no longer requires it, having already dialed the called station number. The "station dialed" pulse on conductor 15GD then sets flip-flop 9BT. The next tone which may be required by the calling station is busy tone. After each of the called stations is dialed, if there are more than one, the originating station is immediately notified if the dialed station is busy. As busy tone is the next tone which may be required the busy tone flip-flop 9BT is set. The 0 output is grounded and inverter 9IBT applies a positive potential to conductor 9BM. This potential enables one of the three inputs of AND gate 11A. The other two inputs are connected respectively to the flash interrupter and the dial tone generator. The station busy tone is thus provided on conductor 11AL in the event it is required.

If the station dialed is not busy its respective R relay is operated by the selector circuit of FIG. 15 and the transfer circuit of FIG. 13. When the R relay operates a "busy tone reset" pulse is extended to conductor 4JS, and a "ringing supervision" signal is extended to conductor 4KS. The "busy tone reset" pulse causes transistor 10Q6 to turn on. This in turn triggers the monostable delay circuit comprising transistors 10Q7 and 10Q8. At the end of the unstable period of the monostable circuit operation a pulse is applied at the collector of transistor 10Q8 to reset busy tone flip-flop 9BT. (This flip-flop is also reset whenever the dial tone flip-flop 9DT is in the set state, the 1 output of flip-flop 9DT being connected to the reset terminal of flip-flop 9BT. Whenever dial tone is to be provided to the originating station busy tone is not required.) The busy tone flip-flop is reset and conductor 9BM is grounded. Station busy tone is no longer provided on conductor 11AL. Busy tone is not required unless another station is dialed. If another station is dialed the "station dialed" pulse on conductor 15GD sets flip-flop 9BT once again. The delay provided by transistors 10Q7 and 10Q8 is necessary because the "busy tone reset" pulse applied to conductor 4JS occurs before the "station dialed" pulse applied to conductor 15GD. It is the latter pulse which must first set flip-flop 9BT before it is reset by the former. The delay circuit on FIG. 10 insures that the busy tone flip-flop is first set by the "station dialed" pulse, and only then reset by the "busy tone reset" pulse.

After all of the called stations have been dialed the respective R relays of the available stations are operated. These relays release only when the respective subscribers go off-hook. As long as at least one of these relays remains operated a positive signal is applied through respective contacts 6 on the R relay to conductor 4KS. The positive "ringing supervision" signal on this conductor maintains transistor 9Q1 conducting. With the transistor conducting ground potential is extended to conductor 9JK. This ground potential is applied to the input of inverter 11IJK which in turn applies a positive potential to conductor 11JKI. This positive potential enables AND gate 11C for providing ringback tone to the calling party to notify him that the called stations are being rung. In a conference call, although this input is enabled when the first available called station has its R relay operated, AND gate 11C does not operate until all of the called stations are dialed. Only at this time does the time-out circuit on FIG. 10 operate and apply a ground potential at the collector of transistor 10Q12. At this time inverter 11ICM applies a positive potential to conductor 11CMI to enable the second input of AND gate 11C. The other three inputs of this AND gate are connected to the warble generator, the ring interrupter, and the flash interrupter, and thus after all of the stations have been dialed ringback tone is provided on conductor 11CL. Only when all of the operated R relays release is the positive potential on conductor 4KS removed. At this time transistor 9Q1 turns off. The positive potential of source 901 appears on conductor 9JK. Conductor 11JK1 is now at ground potential and AND gate 11C turns off. As all of the called stations have answered, ringback tone is no longer required. In addition, the positive potential on conductor 9JK results in a positive pulse being transmitted through capacitor 717 to the start input of flip-flop 702. As the calling station as well as all of the available called stations are now connected to the signal link a talking link is now selected for the call.

The remainder of the logic circuitry provides conference service. When a conference is desired by the calling station the respective conference key is operated at the station. A positive "conference key depressed" pulse appears on conductor 8CC to set the ring delay flip-flop 10RD. This flip-flop is normally reset, the potential of source 802 being extended through contacts 8B–4 when the signal link is idle. When the link is busy contacts 8B–4 are open, but the ring delay flip-flop remains reset until a positive pulse is applied to conductor 8CC. In addition to setting flip-flop 10RD in the 1 state, the pulse on conductor 8CC triggers the time-out circuit.

In the event a conference call is to be established ringing is not extended to the called parties, nor is ringback extended to the calling party, until after all of the called stations have been dialed. However, busy tone is extended to the calling party immediately after each station is dialed if it is busy. The setting of ring delay flip-flop 10RD controls the delay of ringing and ringback until all of the called numbers have been dialed. This procedure enables the conference originator to cancel the conference in the event a necessary called party is busy. It is necessary for the system to determine when the last called number has been dialed before the ringing and ring-back sequence begins. For this reason the time-out circuit on FIG. 10 is provided. When flip-flop 10RD is in the 1 state the time-out circuit controls the delay of the simultaneous ringing of all called parties until after five seconds have elapsed without another number having been dialed by the originator.

Transistor 10Q12 and Zener diode 10Z1 are ordinarily conducting, current flowing from source 1006 through resistor 1007, Zener diode 10Z1 in the reverse direction, and the base-emitter junction of transistor 10Q12. The breakdown potential of the Zener diode is approximately six volts, and thus the voltage across capacitor 1008 in the quiescent condition is approximately six volts. PNPN triode 10Q15 does not conduct however until a positive pulse is applied to its control terminal. When a positive pulse is applied to this terminal the triode breaks down and capacitor 1008 rapidly discharges through the triode. The voltage across the capacitor drops to approximately zero, and the current supplied by it is insufficient to maintain the triode conducting. The triode thus turns off. Zener diode 10Z1 turns off when the triode is first fired but does not turn on immediately as the triode turns off. Once capacitor 1008 has discharged the cathode of Zener diode 10Z1 is at approximately ground potential, and Zener diode 10Z1 and transistor 10Q12 are held off. Current from source 1006 now flows through resistor 1007 and capacitor 1008 to ground. When the capacitor voltage reaches approximately six volts Zener diode 10Z1 breaks down and transistor 10Q12 conducts once again. The time required for Zener diode 10Z1 and transistor 10Q12 to conduct once again after they first turn off is approximately five seconds. When flip-flop 10RD is in the normal reset state the time-out circuit is inhibited from operating. The time-out operation begins when a positive pulse appears on either conductor 8CC or conductor 15GD, a pulse on conductor 8CC being extended to the triode control terminal through resistor 1002 and capacitor 1003, and a pulse on conductor 15GD being extended to the triode control terminal through resistors 1009 and 1010. A pulse on conductor 15GD does not initiate the time-out cycle if flip-flop 10RD is in the 0 state. In this case diode 1001 shorts the pulse to the grounded 1 output of the flip-flop. It is only when the flip-flop is in the set state and its 1 output is in potential that diode 1001 is reverse biased and pulses on conductor 15GD initiate the time-out cycle.

The first pulse on conductor 8CC both sets flip-flop 10RD in the 1 state, and triggers the time-out circuit. Successive trigger pulses appear on conductor 15GD after each station number is dialed. As long as the dialed numbers are received within five seconds of each other transistor 10Q12 remains off, each pulse on conductor 15GD retriggering the time-out circuit. Transistor 10Q12 turns on once again only after five seconds have elapsed without another number having been dialed by the conference originator.

Transistor 10Q12 is normally on and ground potential appears at its collector. This ground potential, extended to conductor 10CM, maintains transistor 12Q6 off and relay 12DR unoperated. The same ground potential is inverted by inverter 11ICM, and applied to one input of AND gate 11C for enabling this gate when a positive potential appears on conductor 11JK1. When a positive pulse first appears on conductor 8CC the time-out cycle initiates. Transistor 10Q12 turns off and a positive potential appears on conductor 10CM. Transistor 12Q6 conducts and relay 12DR is operated. AND gate 11C is now inhibited from operating, the output of inverter 11ICM being at ground potential. The conference originator dials a first number which results in the operation of the R relay of the respective subscriber. Ordinarily, ringing generator 811 supplies the ringing signal to the called party when the respective R relay operates. However, contacts 12DR-1 in conductor 6RG are open when a conference is being established, and the called party is not signaled at this time. Similarly, ringback tone is not extended to the conference originator. Ordinarily when the R relay of a called party operates a positive pulse appears on conductor 11JK1 to operate AND gate 11C. However, when a conference call is being established the AND gate is inhibited from operating because of the ground potential on conductor 11CM1.

After the first number is dialed the selector circuit of FIG. 15 applies a positive pulse to conductor 15GD. This pulse sets busy tone flip-flop 9BT. AND gate 11A is enabled and if the called station is busy, busy tone is provided to the conference originator. If the called station is not busy the positive pulse on conductor 4JS, which pulse is derived from the operation of the R relay of the first called party, results in the resetting of flip-flop 9BT. Thus if the first called party is busy, busy tone is immediately provided to the conference originator, even though ringback tone is not extended until after all of the called stations have been dialed.

If the conference originator dials a second number within five seconds after the first, the R relay of the second called party is operated if the station is not busy, and another "station dialed" pulse appears on conductor 15GD. (If the first called party is busy the conference originator may cancel the call, or he may continue dialing other numbers if he desires to do so.) The second pulse on conductor 15GD triggers the time-out cycle once again, and ringing and ringback tone are not supplied for at least another five seconds. If the second called party is not busy flip-flop 9BT is reset after the respective R relay operates and a positive pulse appears on conductor 4JS. If the second called station is busy, flip-flop 9BT, which is set by the second "station dialed" pulse on conductor 15GD, controls the return of busy tone to the conference originator. (If the first called station was busy the busy tone flip-flop is not reset to begin with since no pulse appears on conductor 4JS because the first R relay did not operate. The second "station dialed" pulse merely insures that flip-flop 9BT is set in the 1 state.)

The conference originator continues to dial the numbers of the called stations. If at any time the conference originator does not dial a number within five seconds after the previously dialed number the time-out cycle terminates. At this time transistor 10Q12 turns on, relay 12DR releases, and AND gate 11C is enabled. The AND gate is enabled because at least one R relay is operated, and a positive potential appears on conductor 11JK1. When contacts 12DR-1 on FIG. 8 release ringing generator 811 provides ringing current to all of the called stations whose R relays are operated. At the same time ringback tone is extended to the conference originator on conductor 11RS.

As each of the called parties answers, his respective R relay releases. Until all of the parties have answered positive potentials appear on conductors 4KS and 11JK1, and ringback tone is extended to the conference originator, and for that matter, to all of the called parties who have already answered and whose ring conductors are connected to conductor 11RS. It is only when all of the called parties have answered that none of the previously operated R relays apply the "ringing supervision" signal on conductor 4KS through the respective contacts 6. Transistor 9Q1 turns off and the "start" signal on conductor 9JK is extended to the allotter.

In the event the last called party in a conference call is busy a pulse does not appear on conductor 4JS after the dialing of his number as the respective R relay does not operate. In such an event the monostable delay circuit on FIG. 10 is not triggered and a positive pulse does not appear at the collector of transistor 10Q8 to reset busy tone flip-flop 9BT. As with all others of the called parties this is desired in order that flip-flop 9BT remains set by the "station dialed" pulse on conductor 15GD to control the return of busy tone to the conference originator. However, after the time-out cycle is completed ringback tone is supplied to conductor 11RS through OR gate 1100, and it is necessary that station busy tone be removed from conductor 11AL. Were flip-flop 9BT not reset after the time-out, station busy tone would still be applied to conductor 11RS together with ringback tone. Transistor 9Q11 is provided to insure the resetting of flip-flop 9BT five seconds after the last dialed number. This transistor is normally on. In the quiescent condition, although ground potential is extended through transistor 10Q12 and resistor 1021 to the base of transistor 9Q11 the transistor conducts because of the positive potential of source 901 extended through resistors 902 and 920 to the base terminal. Resistor 920 and 1021 comprise an OR gate for maintaining transistor 9Q11 conducting if a positive potential is extended through either of these two resistors to the base terminal. While a conference is being established, transistor 9Q1 turns on when the first R relay operates, and source 902 no longer maintains transistor 9Q11 conducting. However, transistor 10Q12 is off, and source 1031 maintains transistor 9Q11 conducting. After the timeout, transistor 10Q12 turns on, and source 1031 is also prevented from holding transistor 9Q11 on. Thus five seconds after all numbers have been dialed in the course of establishing a conference call transistor 9Q11 turns off. At this time the positive pulse at its collector is applied to the reset terminal of flip-flop 9BT. In the event the last station is busy and flip-flop 9BT has not been reset, it is reset at this time. The reset pulse is derived from the collector of transistor 9Q11, rather than from the collector of transistor 10Q8. Flip-flop 9BT resets and AND gate 11A turns off. Only ringback tone is provided on conductor 11RS.

After all of the called numbers have been dialed ringback tone appears on conductor 11RS. As the parties answer one by one and have their ring conductors transferred to conductor 11RS by their S relays, they hear the ringback tone, this tone being supplied until all of the stations whose R relays are operated are released, resulting in the removal of the "ringing supervision" potential on conductor 4KS and the grounding of conductor 11JKI. Until all of the called parties go off-hook the "start" signal on conductor 9JK is not transmitted to the allotter, nor is ringback tone removed from conductor 11RS. If it becomes apparent that one or more of the called parties are unavailable the parties already connected to the signal link may control the removal of ringback tone, and their transfer to a talking link. One or more of the parties depresses his conference key and a ground potential is extended through the respective contacts, such as 5L1–10 through 5LN–10, to conductor 5CL, and through the respective contacts, such as 6S–5, to conductor 4CS. Transistor 8Q4 turns off and the ground potential is removed from conductor 8BS. The R relays of the unavailable called parties thus release, and the "ringing supervision" signal on conductor 4KS is terminated. Transistor 9Q1 turns off, and the stations on the signal link are transferred to the first available talking link.

One of the parties on the signal link in operating his conference key may thus control the transfer of all of the parties to a talking link when transistor 8Q4 turns off and ground potential is removed from conductor 8BS. The parties would otherwise remain on the signal link permanently because at least one R relay would not have released, and the "ringing supervision" signal on conductor 4KS would maintain transistor 9Q1 conducting. There is one situation which may arise however where the removal of ground from conductor 8BS will not result in the transfer of these stations to a talking link, namely, when no R relays have operated to begin with. As will be described below, parties on a talking link may bring other parties into the call by first seizing the signal link, and by one of the parties then dialing in the ordinary manner. Suppose that all of the stations whose numbers are dialed are busy. The respective R relays do not operate in the first place. It will be recalled that it is not the initial "ringing supervision" signal on conductor 4KS that controls the allotter operation. Rather, it is the removal of this signal after it first turns on transistor 9Q1. If no R relay initially operates, there is no signal on conductor 4KS which may be removed. Removing the ground potential on conductor 8BS will not result in the transfer of the stations from a signal link to a talking link inasmuch as there are no R relays operated which when released could remove a "ringing supervision" signal from conductor 4KS.

Of course, a similar situation arises when one party calls another, or begins to establish a conference call. In either case if all of the called parties are busy none of the R relays operate. But in this situation the calling party has no need to transfer to a talking link as he is not connected to any other station. He merely goes on-hook as his call cannot be completed. It is only when two or more parties seize the signal link, after already being connected over a talking link, that they must be transferred back to a talking link even if all of the newly called parties are busy.

The same conference key-controlled ground pulse on conductor 4CS is used to transfer the original parties on the signal link to a talking link in the event the R relays of all of the called stations have not operated. When transistor 8Q4 turns off the positive potential of source 830 is extended to conductor 8CC. A positive pulse on conductor 8CC initiates a conference call. This pulse, when intiating a conference call, has no effect on normally nonconducting transistor 9Q2. When a conference call is initiated, busy tone flip-flop 9BT is in the 0 state, and the 1 output is at ground potential. Although the positive pulse on conductor 8CC sets flip-flop 10RD and triggers the time-out circuit, the pulse does not turn on transistor 9Q2 because it is shorted through diode 909 to the 1 output of flip-flop 9BT. However, when one the stations on the signal link operates his conference key for the purpose of transferring all stations on the signal link to a talking link, flip-flop 9BT is in the set, or the 1 state. As none of the R relays of the called stations have operated, not only has there been no "ringing supervision" signal on conductor 4KS but there has also been no "busy tone reset" pulse on conductor 4JS. Consequently, flip-flop 9BT is not reset, and the 1 output remains at a positive potential. Diode 909 is reverse biased, and the positive pulse on conductor 8CC is no longer shorted through the diode, but instead is transmitted through resistors 910 and 911 to the base of transistor 9Q2. The transistor turns on momentarily. The turning on of this transistor, followed by its turning off at the termination of the pulse, has the same effect as the turning on of transistor 9Q1, followed by its turning off. When transistor 9Q2 first turns on, conductor 9JK is shorted through the transistor to ground. This has no effect on the allotter circuit, just as the turning on of transistor 9Q1 by the "ringing supervision" signal has no effect on the allotter. However, when the pulse on conductor 8CC terminates transistor 9Q2 turns off, and conductor 9JK goes positive in potential, just as it does when a "ringing supervision" signal is removed from conductor 4KS and transistor 9Q1 turns off. The positive "start" signal to the allotter results in the selection of a talking link and the transfer of the stations on the signal link to the talking link.

The purpose of transistor 9Q3 is to reset dial tone flip-flop 9DT. Transistor 9Q3 is normally held conducting by positive potential source 901. The ground potential at its collector prevents source 904 from resetting flip-flop 9DT. The flip-flop is reset by the "dial tone reset" pulse on conductor 15QD when the calling party begins dialing. However, as will be described below, certain calls may be set up directly without requiring the dialing of any digits. In this situation dial tone flip-flop 9DT will not be reset. Transistor 9Q3 is provided in order that dial tone not be continuously provided to the calling party. Even on calls which are established directly the R relays of the called parties are operated. When the "ringing supervision" signal first appears on conductor 4KS transistor 9Q1 turns off, and the ground potential at its emitter turns off transistor 9Q3. Potential source 904 is no longer shorted through the transistor and instead is applied through the transistor to the reset terminal of flip-flop 9DT. The flip-flop is thus reset even though no "dial tone reset" pulse appears on conductor 15QD. Of course, if the station or stations to which calls are placed directly are busy and their R relays do not operate, transistor 9Q1 does not turn on and transistor 9Q3 does not turn off. In this situation dial tone flip-flop 9DT is not reset. However, as will be explained below, when a call is placed directly the calling station does not receive busy tone if the called stations are busy. Instead, dial tone is continuously heard by the calling party. Thus in this situation, where all of the directly called stations are busy, it is desirable that the dial tone flip-flop not be reset.

(8) *Selector, counter and transfer circuits.*—The main purpose of the circuitry on FIGS. 13–15 is to apply a momentary ground to one of the twenty 13SS conductors for controlling the connection of a called station to the signal link. Dial pulses from any calling station are received over the 15DSS conductors. The selector, counter and transfer circuits together count the dial pulses received and apply a momentary ground to one of the 13SS conductors. The same circuitry also controls the application of "station dialed," "dial tone reset" and "digit 1 dialed" pulses to respective conductors 15GD, 15QD and 14ZD.

The selector, counter and transfer circuits are designed to work with a maximum of twenty stations. There are thus twenty 15DSS conductors and twenty 13SS conductors. If fewer than twenty stations are provided not all of the 15DSS and 13SS conductors are used, that is, some of these conductors have no connections to station cards. In addition, as will be described below, a station position may be used to enable an outside line to be connected through the intercom system. An outside line station card requires only a 13SS conductor connection. No 15DSS conductor connection is required as dial pulses from an outside line do not control any system operation. For this reason if outside lines are connected to the intercom system more of the 13SS conductors will be used than will the 15DSS conductors.

The twenty valid station codes are the following: 4–9, 20, 22–29, 32, and 34–37. When any one of these twenty number is dialed, the dial pulses arriving over one of the 15DSS leads, the associated 13SS conductor is momentarily grounded. The digit 1 is an invalid code, and is assumed to arise only from switchhook fumbling. The "digit 1 dialed" pulse on conductor 14ZD sets flip-flop 9DT after it is reset, in the event a single dial pulse is received over one of the 15DSS conductors. Flip-flop 9DT is reset by a "dial tone reset" pulse which appears on conductor 15QD when dialing begins. The "station dialed" pulse on conductor 15GD appears after a valid station code has been dialed, that is, after one of the digits 4–9 has been dialed, or after the second digit of a two digit code has been dialed. No stations have the code numbers 2 and 3, these numbers being reserved as the first digits of the two digit codes.

The twenty 15DSS conductors, 15DSS4–15DSS37, are multiplied in groups of four to the base electrodes of transistors 15Q1–15Q5. The collector electrodes of these transistors are in turn multiplied to the base electrode of transistor 15Q6. Transistors 15Q1–15Q5 serve as intermediate OR gates, transistor 15Q6 following dial pulses appearing on any one of the twenty conductors 15DSS4–15DSS37. Transistors 15Q1–15Q5 are normally non-conducting due to the negative potential sources coupled to their base electrodes. When any station is first connected to the signal link a ground potential appears on the respective 15DSS conductor, and the selector circuit is unaffected. For example, when station 4 is connected to the signal link the potential of source 501 is extended through contacts 5L1–12 through 5LN–12 and 6S–3, and resistor 609 to the junction of diode 625 and resistor 608. A positive potential would ordinarily appear on conductor 15DSS4 to turn on transistor 15Q1. However, relay 5TP is operated and contacts 5TP-1 are closed. Ground potential is thus extended through diode 625 and resistor 608 to conductor 15DSS4 to maintain transistor 15Q1 nonconducting. It is only during the break of a dial pulse, when relay 5TP is released, that the positive potential through resistor 609 is extended through resistor 608 and conductor 15DSS4 to turn on transistor 15Q1. Similar remarks apply to the other station cards. The common collector electrodes of transistors 15Q1–15Q5 are at ground potential only during the break of a dial pulse. Transistor 15Q6 is normally conducting, positive potential source 1520 forward biasing the base-emitter junction. Relay 15A is thus normally operated. Transistor 15Q6 is off and relay 15A is de-energized only during the break of any dial pulse when the ground potential at the common collector electrodes of transistors 15Q1–15Q5 reverse biases the base-emitter junction of transistor 15Q6.

Transistor 15Q7 is normally off, the base of this transistor being connected through resistor 1521 and diode 1522 to the normally grounded collector of transistor 15Q6. As no current flows through transistor 15Q7 transistor 15Q9 is also off, the base-emitter junction being reverse biased. Transistor 15Q8, on the other hand, is forward biased by potential source 1523. Thus, in the quiescent state conductor 15WN is electrically open circuited, and conductor 15YN is connected through transistor 15Q8 to ground. Relay 15A follows the dial pulses. When the first dial pulse is received and transistor 15Q6 turns off, capacitor 1501 charges from source 1524. The capacitor charges rapidly and relay 15A releases. Although relay 15A follows the dial pulses capacitor 1501 maintains transistor 15Q7 conducting during the entire dialing interval. Although the potential of source 1524 is not extended to the base of transistor 15Q7 in the interval between dial pulses, during this interval the positive charge on capacitor 1501 maintains transistor 15Q7 conducting. Transistor 15Q7 turns off only at the end of the dialing interval when capacitor 1501 has discharged through resistors 1521 and 1525, and is not recharged with a subsequent turning off of transistor 15Q6. Thus, although relay 15A follows the dial pulses, transistor 15Q7 remains on during the entire dialing period. The conduction of transistor 15Q7 maintains transistor 15Q9 on and conductor 15WN at ground potential during the dialing period. At the same time transistor 15Q8 is held off because current from source 1523 is shorted through transistors 15Q7 and 15Q9. With transistor 15Q8 off, conductor 15YN is open circuited, rather than grounded, during the dialing interval.

Contacts 8B–8 are provided to insure that transistor 15Q6 remains conducting and relay 15A remains energized when the signal link is not in use. This prevents transient pulses from operating the selector circuit. The potential of source 1526 is extended through these contacts and resistor 1527 to the base of transistor 15Q6 to forward bias the base-emitter junction of this transistor. When the signal link is in use however and a digit is being dialed, contacts 8B–8 are open, and instead contacts 8B–9 are closed. Ground potential is now extended through resistor 1527 to the base of transistor 15Q6, and the transistor may be turned off when one of transistors 15Q1–15Q5 conducts during the break of a dial pulse.

The counter circuit of FIG. 14 follows the pulsing of relay A, and at the end of a digit applies a ground potential pulse to one of conductors 13A2–13A10. Any one of many well-known counter circuits may be utilized. The particular circuit shown operates as follows. Before dialing begins only relay 14Y3 of relays 14Y1–14Y6 is operated, current flowing from source 1410 through the winding of relay 14Y3, and contacts 14Y2–9 and 14Y1–3 to ground. Before dialing begins conductor 15WN is open circuited. However, during dialing ground potential is applied to this conductor. When relay 15A first releases, contacts 15A–2 close and relay 14Y2 energizes, current flowing through the winding of the relay, and contacts 15A–2 and 14Y1–2 to grounded conductor 15WN. When relay 15A again energizes after the dial pulse and contacts 15A–2 open, relay 14Y2 is held operated through now closed contacts 14Y2–2. With contacts 14Y2–9 open relay 14Y3 is now released. The sequential operation of the six relays 14Y1–14Y6 may be followed with reference to the following table in which a 0 represents an unoperated relay state and a 1 represents an operated relay state.

| Number of times relay A has pulsed | 14Y1 | 14Y2 | 14Y3 | 14Y4 | 14Y5 | 14Y6 |
|---|---|---|---|---|---|---|
| 0 | 0 | 0 | 1 | 0 | 0 | 0 |
| 1 | 0 | 1 | 0 | 0 | 0 | 0 |
| 2 | 1 | 0 | 0 | 1 | 0 | 0 |
| 3 | 0 | 0 | 1 | 1 | 0 | 0 |
| 4 | 0 | 1 | 0 | 1 | 1 | 0 |
| 5 | 1 | 0 | 0 | 1 | 1 | 0 |
| 6 | 0 | 0 | 1 | 1 | 1 | 1 |
| 7 | 0 | 1 | 0 | 1 | 1 | 1 |
| 8 | 1 | 0 | 0 | 0 | 1 | 1 |
| 9 | 0 | 0 | 1 | 0 | 1 | 1 |
| 10 | 0 | 1 | 0 | 0 | 1 | 1 |

The relays operate in sequence according to the above table as long as relay 15A continues to pulse. Although the contacts in the leftmost network on FIG. 14 open and close, none of conductors 13A2–13A10 has a ground potential applied to it. The ground potential which is eventually extended to one of these conductors originates on conductor 15YN, but ground potential is not applied to this conductor during the dialing interval. It is only after a digit has been dialed and capacitor 1501 has discharged that transistor 15Q8 turns on and applies ground potential to conductor 15YN. At this time the ground potential is extended to one of conductors 13A2–13A10 depending upon the state of relays 14Y1–14Y6.

The operated ones of relays 14Y1–14Y6 are held by the ground potential on conductor 15WN. In order that the operated ones of relays 14Y1–14Y6 remain operated to allow the ground potential on conductor 15YN to be extended to one of conductors 13A2–13A10, it is necessary to hold the ground potential on conductor 15WN until slightly after the ground potential appears on conductor 15YN. The turning off of transistor 15Q7 controls both the removal of the ground potential from conductor 15WN, and the shorting of conductor 15YN to ground through transistor 15Q8. Transistor 15Q8 turns on before transistor 15Q9 turns off due to the different base connections of these transistors to transistor 15Q7. Transistor 15Q8 turns on approximately 50 milliseconds before transistor 15Q9 turns off. Thus the ground potential applied to conductor 15YN is extended to one of the conductors 13A2–13A10 for 50 milliseconds before the operated ones of relays 14Y1–14Y6 release. Thus 50 milliseconds after the end of a digit the counter circuit is in its quiescent state. However, a 50 millisecond ground potential pulse has been applied to one of conductors 13A2–13A10.

In the event the digit 1 is dialed relay 14Y2 is operated when the ground potential appears on conductor 15YN. Positive source 1411 is shorted through resistor 1412 and contacts 14Y4–4, 14Y6–10 and 14Y2–8 to ground. A negative spike appears on conductor 14ZD which has no effect on the circuit. After 50 milliseconds however relay 14Y2 releases, and a positive pulse is transmitted through capacitor 1413 to conductor 14ZD. This "digit 1 dialed" pulse sets flip-flop 9DT. Even though the "dial tone reset" pulse on conductor 15QD has reset this flip-flop, the flip-flop is set once again to enable dial tone to be supplied to the calling party. The dialing of a digit 1 does not cause a ground potential to be applied to one of conductors 13A2–13A10.

If the first digit dialed is one of the digits 4–9 the ground potential pulse on one of conductors 13A4–13A9 is extended through various normally closed contacts on the transfer circuit of FIG. 13 to the respective one of conductors 13SS4–13SS9. The pulse enables the respective R relay to operate if the called station is not busy. On the other hand, if one of the digits 2 or 3 is dialed the pulse on conductor 13A2 or 13A3 is not extended to one of the 13SS conductors. Instead, the pulse controls the operation of the relays on the transfer circuit, and prepares a path for the next pulse from the counter circuit to be transmitted to one of the 13SS conductors having a two digit code.

The "dial tone reset" pulse on conductor 15QD appears when dialing begins. Conductor 15HM is connected to conductor 15YN in the quiescent condition through contacts 14Y6–5, 14Y4–9, 14Y3–8 and 14Y2–7. Conductor 15YN is at ground potential in the quiescent condition, and thus before dialing begins ground potential appears on conductor 15M. During dialing the ground potential on conductor 15YN is removed, and conductor 15HM is held at the positive potential of source 1502. When conductor 15HM first goes positive in potential a positive pulse is transmitted through capacitor 1503 to conductor 15QD. This "dial tone reset" pulse resets filp-flop 9DT. The pulse is applied to conductor 15QD when the ground potential is first removed from conductor 15YN, that is, when the first dial pulse is received.

A change in the potential of conductor 15HM also controls the application of the "station dialed" pulse to conductor 15GD. This pulse must appear only after a complete station code has been dialed, that is, after one of the digits 4–9 has been dialed, or after both digits of a two digit code have been dialed. After one of the digits 4–9 has been dialed and a 50 millisecond ground potential pulse is applied to one of conductors 13A2–13A10, the counter circuit returns to its quiescent condition. The ground potential now on conductor 15YN is extended to conductor 15HM. A negative pulse is thus transmitted through capacitor 1505, diode 1506 and resistor 1531 to the base of transistor 15Q13. This transistor is normally conducting, positive potential source 1508 forward biasing the base-emitter junction. The negative pulse transmitted to the base electrode turns off transistor 15Q13. The collector goes positive in potential and results in the "station dialed" pulse on conductor 15GD. The pulse terminates after capacitor 1505 has discharged. In the event the first digit dialed is a 2 or 3 the "station dialed" pulse must be inhibited. As will be seen shortly the dialing of either a 2 or 3 results in the turning on of transistor 15Q12, and the shorting of the negative pulse transmitted through capacitor 1505 through the transistor. Diode 1506 is reverse biased and transistor 15Q13 does not turn off. Transistor 15Q12 has turned off by the time the second digit in a two digit code is dialed, and at this time the negative pulse transmitted through capacitor 1505 is transmitted through diode 1506 to turn off transistor 15Q13 for supplying the "station dialed" pulse.

If the first digit dialed is a 3 the ground potential pulse on conductor 13A3 is extended through contacts 13TR3–2 and 13TR2–2 to the winding of relay 13TR2. Relay 13TR2 operates and contacts 13TR2–1 close. The base-emitter junction of transistor 15Q11 is forward biased by positive potential source 1532. The ground potential extended through the transistor to conductor 15UN thus holds relay 13TR2 operated. On the other hand, if the digit 2 is dialed the ground potential pulse is extended through contacts 13TR2–12, 13TR3–5 and 13TR1–2 to the winding of relay 13TR1. Relay 13TR1 operates and contacts 13TR1–1 close. The relay winding is thus connected to conductor 15VN. Positive potential source 1504 maintains transistor 15Q10 conducting and a ground potential on conductor 15VN. Relay 13TR1 is thus held operated. When contacts 13TR1–11 close relay 13TR3 operates.

The dialing of a digit 3 thus controls the operation of relay 13TR2, and the dialing of a digit 2 controls the operations of relays 13TR1 and 13TR3. The contacts on these relays control the connections of conductors 13A2–13A10 to the 13SS conductors having the two digit codes. The next ground potential pulse on one of conductors 13A2–13A9 is transmitted directly to a two digit coded 13SS conductor. For example, if the first digit dialed was a 3 and relay 13TR2 is operated, and if the second digit dialed is a 5, the ground potential pulse on conductor 13A5 is transmitted through contacts 13TR2–7 directly to conductor 13SS35.

Transistor 15Q12 is normally nonconducting, positive potential source 1535 reverse biasing the emitter-base junction. Zener diode 15Z13 is normally nonconducting. When the first digit dialed is a 3 the ground potential on conductor 13A3 is applied through contacts 13TR3–2 to conductor 13QN. If the first digit dialed is a 2 the ground potential on conductor 13A2 is applied through contacts 13TR2–12 and 13TR3–5 to conductor 13PN. The ground potential on either of these conductors is applied to the anode of Zener diode 15Z13 which breaks down in the reverse direction. The emitter-base junction of transistor 15Q12 is now forward biased and the transistor conducts. Capacitor 1509 maintains transistor 15Q12 conducting for a short interval even after the ground potential on either of conductors 13QN or 13PN is removed. The negative pulse on conductor 15HM which appears after the 50 millisecond ground potential pulse is applied to either conductor 13A2 or 13A3 would ordinarily turn off transistor 15Q13 and provide a "station dialed" pulse on conductor 15GD. However, capacitor 1509 maintains transistor 15Q12 conducting for a short interval after the termination of the 50 millisecond pulse. Consequently, when the negative pulse is transmitted through capacitor 1505 it is shorted through transistor 15Q12 and transistor 15Q13 does not turn off.

The second number dialed is one of the numbers 2–10. The resulting 50 millisecond pulse is transmitted to one of the two digit coded 13SS conductors. Transistor 15Q12 does not turn on at this time as the ground potential pulse appears on neither of conductors 13QN and 13PN. After the 50 millisecond pulse is transmitted to one of the R relays ground potential appears on conductor 15HM. A negative pulse is now transmitted through diode 1506 to turn off transistor 15Q13. A "station dialed" pulse is thus applied on conductor 15GD. The same negative pulse also reverse biases both of diodes 1533 and 1534. The conducting one of transistors 15Q10 and 15Q11 turns off, and the operated one or ones of relays 13TR1–13TR3 release. The circuit is thus restored to normal for use by subsequent calling parties.

After the first digit of a two digit code is dialed one of transistors 15Q10 and 15Q11 is conducting for holding either relay 13TR1 or 13TR2 operated. In the event the calling party goes on-hook at this time without dialing a second digit, it is necessary that the operated one or ones of relays 13TR1–13TR3 be released in order that the transfer circuit of FIG. 13 be placed in its normal condition for use by another calling party. The resetting of the transfer circuit is automatic. When the calling party goes on-hook a digit 1 is automatically transmitted to the selector circuit over the respective 15DSS conductor. The TP relay in the station card releases before the S relay. The release of TP relay prior to the release of the S relay has the same effect as the dialing of a digit 1. A positive potential is transmitted to the selector circuit over one of the 15DSS conductors. Relay 15A releases but reoperates when the S relay releases. A negative pulse thus appears on conductor 15HM and is transmitted through diode 1506 to turn off the conducting one of transistors 15Q10 and 15Q11.

Transistor 15Q14 is provided for a special purpose. One of the two digit codes is the number 22. When the first digit 2 is dialed relays 13TR1 and 13TR3 operate. Contacts 13TR3–4 close, and the second digit 2 which is dialed is transmitted through these contacts to conductor 13SS22. But if contacts 13TR3–4 close before the first ground potential pulse on conductor 13A2 terminates, the first pulse on conductor 13A2 will be transmitted through contacts 13TR3–4 to conductor 13SS22. It is necessary to insure that the pulse on conductor 13A2 terminates before contacts 13TR3–4 close in order that station 22 not be rung whenever the first digit 2 is dialed in one of the two digit codes. The first pulse applied on conductor 13A2 controls the turning on of transistor 15Q12. A positive potential appears at the collector of the transistor, and a positive pulse is transmitted to the base of transistor 15Q14. This latter transistor turns on and capacitor 1501 discharges rapidly through the transistor. It is charge on capacitor 1501 which maintains transistor 15Q7 and 15Q9 conducting. The rapid discharge of capacitor 1501 causes transistors 15Q7 and 15Q9 to turn off quickly. The ground potential is removed from conductor 15WN, and the operated relays 14Y1 and 14Y4, which are held by the ground potential on conductor 15WN, release. The ground potential on conductor 13A2 is thus removed rapidly, before contacts 13TR3–4 have closed. In this manner the first pulse on conductor 13A2 is not transmitted to conductor 13SS22. Only if the second digit dialed is also a 2 does a ground potential pulse appear on conductor 13SS22.

(B) *Illustrative call sequences*

(1) *Establishment of two-party call.*—Suppose the subscriber at station 4 goes off-hook to originate a call to station 20. Station 4 is not connected to any of the talking links in the system, and thus all of relays 5L1–5LN are unoperated. Conductor 5R is connected through all of contacts 5L1–6 through 5LN–6, conductor 5RL, contacts 6S–9, conductor 11Q and resistor 1113 to ground. (Zener diodes 11Z1 and 11Z2 are provided for protective purposes.) Conductor 5T is connected through the winding of relay 5TP, all of contacts 5L1–8 through 5LN–8, conductor 5TL, and contacts 6S–7 and 6R–5 to positive source 603. When conductors 5R (ring) and 5T (tip) are bridged at the station, current flows from source 603 through the tip and ring conductors, and relay 5TP operates. Contacts 5TP–1 in FIG. 6 close. Transistor 6Q1 is normally nonconducting. However, when contacts 5TP–1 close the potential of source 606 is extended through the emitter-base junction of transistor 6Q1, Zener diode 6Z1 in the reverse direction, resistors 605 and 604, and contacts 5TP–1 to ground. Collector current from transistor 6Q1 flows through the winding of relay 6S, contacts 6S–2, diode 607, conductor 8PQ, and normally closed contacts 8P–1 to ground. Relay 6S operates and contacts 6S–1 close before contacts 6S–2 open. The ground potential for holding relay 6S operated is now provided through contacts 6S–1 rather than contacts 6S–2. Relay 6S operates only if contacts 8P–1 are closed. If the signal link is busy these contacts are open and the respective S relay of any new station going off-hook cannot operate. This insures privacy for the subscriber or subscribers originally connected to the signal link. When relay 6S operates positive potential source 501 is connected through contacts 5L1–12 through 5LN–12, conductor 5SL, contacts 6S–3, diode 651 and resistor 631 to conductor 4WS. The positive potential on conductor 4WS turns on transistor 8Q2 and results in the operation of relay 8B. Contacts 8B–3 close and relay 8P operates. Contacts 8P–1 open and no new station may connect to conductors 11RS and 11TS of the signal link because its respective S relay may not operate. A new station going off-hook may have its TP relay operated but because the respective S relay may not operate the station ring conductor remains connected to conductor 11Q, and the party, ignoring the system busy lamp, receives system busy tone.

When relay 8B operates and contacts 8B–4 on FIG. 8 open, the positive potential on conductor 8BC is removed and flip-flops 9DT and 10RD may be respectively reset and set as required. The operation of relay 8P and the closing of contacts 8P–2 on FIG. 8 furnishes a continuous busy lamp signal from source 801 to all on-hook stations. All on-hook stations have both their respective R and S relays unoperated. Lamp supply 810 is connected through contacts 8P–2, conductor 8LB, contacts 9 on the R relays and contacts 11 of the S relays of on-hook stations to the respective L conductors. The L conductors are extended to the stations and when the busy lamp on each station lights the respective subscriber is notified that the system is busy, and that if he goes off-hook he will get busy tone and not be provided service.

Flip-flop 9DT is originally in the set state, and inverter 9IDT applies a positive potential to conductor 9DM. This positive potential is applied to one input of AND gate 11B. The other input of this AND gate is connected to the dial tone generator, and dial tone appears on conductor 11BL. This tone is extended through OR gate 1100 to conductor 11RS. Positive potential source 1115 is connected through one winding of transformer 1116 to conductor 11TS. When station 4 first went off-hook positive source 603 was connected through contacts 6S–7 to conductor 5TL. When relay 6S operates however these contacts open and contacts 6S–6 close. Conductor 5TL is now connected to conductor 11TS and source 1115 rather than to source 603. Conductor 5RL was initially connected through contacts 6S–9 to conductor 11Q and through resistor 1113 to ground. When relay 6S operates however these contacts open and contacts 6S–8 close. Conductor 5RL is now connected through contacts 6S–8 to conductor 11RS. Ground potential for conductor 5RL now comes through the second winding of transformer 1116 connected to conductor 11RS. With the connection of conductor 5RL to conductor 11RS the dial tone supplied at the output of OR gate 1100 is transmitted to station 4 over the tip and ring conductors. The subscriber at station 4 is notified that he may begin dialing. It should be noted that flip-flop 9DT which controls the application of dial tone to the signal link over conductor 11RS is ordinarily set. When the signal link is idle it is assumed that the next action taken will be the origination of a call at a new station. Consequently, relay 9DT is is maintained set and controls the application of dial tone to conductor 11RS. In this manner when a new station goes off-hook to originate a call and a respective S relay operates there is no need to set flip-flop 9DT as dial tone already appears on conductor 11RS.

The originating station 4 now starts dialing. Each operation of the dial results in the release of relay 5TP and the opening of contacts 5TP–1 on FIG. 6. When these contacts open however transistor 6Q1 does not cease conducting and therefore relay 6S does not release. Capacitor 611 is charged whenever contacts 5TP–1 are closed. The capacitor discharges when the contacts are open, the discharge maintaining transistor 6Q1 conducting. Contacts 5TP–1 close again before capacitor 611 discharges completely, and thus transistor 6Q1 is held on and relay 6S remains operated during the dialing sequence.

Each time contacts 5TP–1 open a pulse is delivered to the selector circuit of FIG. 15. When relay 6S first operates the positive potential extended from source 501 through contacts 6S–3 and resistor 609 forward biases diode 625. As contacts 5TP–1 are closed ground potential appears on conductor 15DSS4. This ground maintains normally nonconducting transistors 15Q1–15Q5 off. With each dial pulse contacts 5TP–1 open and the positive potential extended through contacts 6S–3 now appears on conductor 15DSS4 to turn on transistor 15Q1 for the duration of the dial pulse. After the called number is dialed the selector applies a momentary ground to the 13SS conductor of the called station. If the subscriber at station 4 has dialed the number 20 a momentary ground is applied to conductor 13SS20. If station 20 is available all of relays 3L1–3LN are unoperated. Ground is extended through contacts 4R–3, the winding of relay 4R, contacts 4S–4, conductor 3SL, and all of contacts 3LN–12 through 3L1–12 to positive source 301. Relay 4R operates and locks through contacts 4R–2 to the ground potential on conductor 8BS. A ground is applied to this conductor through transistor 8Q4 and contacts 8B–6, relay 8B having operated when station 4 went off-hook. Relay 4R operates only if station 20 is available. If the called station is already connected to a talking link one of relays 3L1–3LN is operated, and one pair of contacts 3L1–12 through 3LN–12 is open to prevent relay 4R from operating.

When relay 4R operates conductor 3TL is connected through contacts 4S–7 and 4R–5 to conductor 6RG. Conductor 6RG is connected through closed contacts 12DR–1 to both diode 817, and through contacts 12I–1 and capacitor 818 to ringing generator 811. Relay 12I is caused to pulse when relay 8B operates, and contacts 8B–2 on FIG. 12 close. The relay pulses at the rate determined by the ring interrupter astable multivibrator on FIG. 11. When the relay is operatd and contacts 12I–1 are closed ringing current is applied by generator 811 to conductor 6RG, and through contacts of relays 4R and 4S to conductor 3TL. Conductor 3RL is connected through contacts 4S–9 to conductor 11Q and through resistor 113 to ground. The ringing signal on conductor 3TL operates the ringer at station 20. The system busy tone on conductors 11Q and 3RL has no effect as station 20 is still on-hook. In addition to a ringing signal, the positive potential of source 819 is applied through diode 817 and contacts 12DR–1 to conductor 3TL. When the called party goes off-hook relay 3TP operates as direct current flows through the tip and ring conductors. Relay 3TP on the called party's station card operates in the same manner as did relay 5TP on the calling party's station card. The only difference is that when the calling party first went off-hook the positive potential of source 603 was applied through contacts 63–5 and 6S–7 to conductor 5TL. The positive potential for powering the suspect of the called party however is supplied from source 819 connected through conductor 6RG and contacts 4R–4 and 4S–7 to conductor 3TL. When relay 3TP operates contacts 3TP–1 on FIG. 4 close, and the emitter-base junction of transistor 4Q1 is forward biased. Relay 6S on the calling party's station card had operated from the ground on conductor 8PQ supplied through diode 607 and contacts 6S–2. However, ground potential is no longer supplied on conductor 8PQ, contacts 8P–1 being open. Consequently, relay 4S on the called party's station card may not operate through diode 407 and conductor 8PQ. Contacts 8P–1 open when the call is first originated to insure that a new station going off-hook will not infringe upon the privacy of the station already connected to the signal link. The only station which is to be connected to the signal link is the one which is being called. For this reason an alternate ground path is provided for operating relay 4S. The R relay of only the called party is operated and this relay provides the alternate ground path. Station 20 is being called, relay 4R is operated, and contacts 4R–1 are closed. Ground potential is extended through these contacts and contacts 4S–2 to the winding of relay 4S, the relay thus operating when transistor 4Q1 turns on. Relay 4S locks over the ground supplied by its own contacts 4S–1.

When relay 4S operates contacts 4S–9 open and contacts 4S–8 close. The ring conductor of the called station is thus transferred from conductor 11Q to conductor 11RS. Contacts 4S–7 open and contacts 4S–6 close transferring the tip conductor from conductor 6RG to conductor 11TS. The called station no longer hears the ring because the tip conductor is no longer connected to the ringing generator through contacts 4S–7 and 4R–4, and conductor 6RG. Instead, the called station's tip and ring conductors are now connected in parallel with the tip and ring conductors of the calling station. Called party battery is no longer provided by source 819 and is instead provided by source 1115 through a winding of transformer 1116 and conductor 11TS; this same source 1115 powering the subset of the calling party. Both parties are connected in parallel to the windings of transformer 1116, the transformer providing a low impedance to the talking battery while providing a high impedance to the speech signals.

The operation of relay 4S when the called party answers also controls the release of relay 4R. The operate path of relay 4R includes contacts 4S–4 connected to conductor 3SL. When relay 4S operates these contacts open and contacts 4S–3 close. The closing of these latter contacts transfers the positive potential on conductor 3SL, supplied by source 301 through all of contacts 3L1–12 through 3LN–12, to conductor 4WS. A positive potential already appears on conductor 4WS, the potential being supplied by source 501 on the station card of the calling party, and the additional connection to conductor 4WS has no effect on the system operation. The opening of contacts 4S–4 however has an effect on the system as relay 4R releases. When relay 4R was first operated positive potential source 430 was connected through contacts 4R–6 to conductor 4KS to turn on transistor 9Q1. A negative step appeared at the emitter of transistor 9Q1. This negative step on conductor 9JK had no effect on the allotter of FIG. 7. However, when contacts 4R–6 open and transistor 9Q1 turns off a positive step is applied by source 901 to conductor 9JK. A positive step sets flip-flop 702 which starts the allotter action. During this action the two parties connected to the signal link may talk. Once an idle talking link is selected the transfer of the two stations from the signal link to the talking link is instantaneous, the two parties being completely unaware of its occurrence.

While the called party is being rung, ringback is provided to the calling party. After the called number is dialed and a momentary ground is applied to conductor 13SS20 the selector circuit of FIG. 15 applies a "dial tone reset" pulse to conductor 15QD. Dial tone is no longer required by the calling party and dial tone flip-flop 9DT is reset. A ground potential now appears on conductor 9DM and AND gate 11B is inhibited from operating. Dial tone is thus no longer applied to conductor 11RS, connected to the ring conductor of the calling party. The selector circuit also applies a "station dialed pulse" to conductor 15GD to set busy tone flip-flop 9BT. In the event the called station is busy this flip-flop controls the application of busy tone to conductor 11RS. However, if the called station is not busy ringback tone is required rather than busy tone. If the called station is available the R relay operates. When contacts 4R–7 close a positive pulse is supplied through these contacts, resistor 420 and capacitor 431 to conductor 4JS. This "busy tone reset" pulse causes transistor 10Q6 to conduct momentarily. The negative pulse at the collector of transistor 10Q6 triggers the monostable multivibrator on FIG. 10. At the end of the unstable period of the multivibrator operation the positive pulse at the collector of transistor 10Q8 resets busy tone flip-flop 9BT. As the called station is available busy tone is not required, and the flip-flop is reset before busy tone is extended to the calling party over conductor 11RS. The delay of the monostable multivibrator is required because the "busy tone reset" pulse on conductor 4JS, which pulse results in the resetting of flip-flop 9BT, is applied before the "station dialed pulse" on conductor 15GD, which pulse sets the flip-flop. The transfer circuit applies a momentary ground to conductor 13SS20 to operate relay 4R before the selector circuit applies the "station dialed" pulse to conductor 15GD. Consequently, the monostable multivibrator is provided to delay the resetting of the busy tone flip-flop until after it is set.

At the same time that the "busy tone reset" pulse is applied to conductor 4JS a "ringing supervision" signal is applied to conductor 4KS. If station 20 is available relay 4R operates, and when contacts 4R–6 close positive potential source 430 is connected through resistor 432 to conductor 4KS. This positive potential, as described above, turns on transistor 9Q1 which in turn provides a ground potential on conductor 9JK. This ground potential has no effect on flip-flop 702. However, inverter 11IJK inverts the signal and applies a positive potential to conductor 11JKI. This conductor is connected to one input of AND gate 11C. Another input of this AND gate is connected to conductor 11CMI which is ordinarily positive. Transistor 10Q12 is normally conducting and the ground potential on its collector is inverted by inverter 11ICM to apply a positive potential on conductor 11CMI. The other three inputs of AND gate 11C are connected to the warble generator, the ring interrupter, and the dial tone generator, these three astable multivibrators together providing ringback tone. The ringback tone is thus extended through OR gate 1100 to conductor 11RS, which conductor is connected to the ring conductor of the calling party. The calling party is provided with ringback tone only if conductor 11JKI is positive in potential, i.e., a positive potential appears on conductor 4KS. A positive potential appears on conductor 4KS only if relay 4R operates. Thus ringback tone is provided to the calling party only if the called party is available. If the called party is busy station busy tone is provided instead, because busy tone flip-flop 9BT is not reset, no "busy tone reset" pulse appearing on conductor 4JS. If the called station is available, however, ringback tone is provided to the calling party until the called party answers. At this time relay 4R releases and transistor 9Q1 turns off. The positive potential on conductor 9JK results in the grounding of conductor 11JKI and ringback tone is retired. At the same time the positive potential on conductor 9JK controls the setting of flip-flop 702 to start the allotter circuit.

Positive pulses are sequentially applied at the output conductors of ring counter 703. If the first talking link is busy transistor 7Q2 is on, and the positive pulse at the output of the first stage of the ring counter is shorted through diode 704 and transistor 7Q2 to ground. This pulse is thus unable to turn on transistor 7Q1. However, if the first talking link is idle, transistor 7Q2 is off and the output pulse of the first stage of the ring counter is not shorted through the transistor to ground. Instead, the pulse turns on transistor 7Q1. The turning on of this transistor applies ground potential to conductor 7TL1ET which enables the respective L1 relays of the stations connected to the signal link to operate. Both stations connected to the signal link have positive potentials on their respective EL conductors, and current flows through contacts 2 and 4 of the L1 relays, and the L1 relay windings to grounded conductor 7TL1ET. When contacts 5 close and contacts 6 open on each L1 relay, the respective ring conductor is transferred from the RL conductor to conductor 7TL1RT. Ground potential is supplied to the ring conductors of the stations through one winding of transformer 7TL1TR rather than from the ground connected to one of the windings of transformer 1116. When contacts 7 close and contacts 8 open on each L1 relay, the respective tip conductor is transferred from the TL conductor to conductor 7TL1TT. A positive potential is now supplied from source 707 through the other winding of transformer 7TL1TR to the tip conductors of the stations, rather than from source 1115 through the second winding of transformer 1116.

Relay 5L1 first operates from the positive potential on conductor 5EL. Thereafter, it is held operated by current flowing from source 606 through transistor 6Q1, conductor 5HL, now closed contacts 5L1–1 and 5L1–3, and transistor 7Q2 to ground. Transistor 7Q2 turns on when contacts 5L1–11 close. The potential of source 501 is extended through these contacts to conductor 7TL1ST. Zener diode 7Z breaks down and the base-emitter junction of transistor 7Q2 is forward biased. Similarly, if relay 3L1 operates before relay 5L1 the positive potential of source 301 is extended through contacts 3L1–11 to conductor 7TL1ST to turn on transistor 7Q2. The ground potential on conductor 7TL1HT serves both to hold all of the previously operated L1 relays on, and to short diode 704 to ground so that in a subsequent operation the first talking link will not be seized.

The positive potential at the output of the first stage of ring counter 703 maintains transistor 7Q1 conducting until transistor 7Q2 turns on. At this time the positive output potential is shorted through diode 704. Transistor 7Q1 however does not turn off immediately. It is possible that one of the L1 relays will operate before the other. Although the ground potential on conductor 7TL1HT holds the L1 relays operated, it is ground potential on conductor 7TL1ET that controls the initial operation of each of the L1 relays. Were transistor 7Q1 turned off after the first L1 relay operated, the second would be unable to energize. For this reason transistor 7Q1 is maintained operated by the discharge of capacitor 708 through resistor 706 and the base-emitter junction of the transistor even after transistor 7Q2 turns on. Transistor 7Q1 is maintained operated for a time interval sufficient to allow even the slower one of the L1 relays to initially operate from the ground potential extended through transistor 7Q1 to conductor 7TL1ET.

After the two stations are transferred to the talking link, supervision of the call is provided by the control circuit of the first talking link. As long as either station is off-hook its TP, L1, and S relays remain operated, and the talking link remains busy. If, for example, the subscriber at station 4 goes on-hook, relay 5TP releases. When contacts 5TP–1 on FIG. 6 open, transistor 6Q1 turns off and relay 6S releases. With the transistor off the potential of source 606 is no longer extended to conductor 5HL and relay 5L1 releases. Transistor 7Q2 however is maintained conducting until the subscriber at station 20 also goes on-hook. It is only when both of relays 3L1 and 5L1 release, and neither of positive potential sources 301 and 501 is extended through respective contacts 3L1–11 and 5L1–11 to conductor 7TL1ST that Zener diode 7Z and transistor 7Q2 turn off. Only at this time is the ground potential on conductor 7TL1HT removed, and the talking link made available for the next operation of ring counter 703.

During the course of establishing the call, the lamps of all on-hook stations not being rung are operated continuously from the potential of lamp supply 810 extended through contacts 8P–2, conductor 8LB, and contacts 9 on the R relays and contacts 11 on the S relays. A subscriber ignoring the system busy lamp signal and going off-hook will receive a system busy tone signal to indicate the system busy condition. System busy tone is continuously applied to conductor 11Q to which all stations are first connected through their respective RL conductors when they first go off-hook. If the signal link is idle contacts 8P–1 on FIG. 8 are closed and the S relay of the station going off-hook is immediately operated to transfer the RL conductor of the respective subscriber from conductor 11Q to conductor 11RS. However, if the system is busy contacts 8P–1 are opened, the S relay of a subscriber ignoring the system busy lamp signal is unable to operate, and the subscriber continuously hears the system busy tone signal over conductor 11Q. It is only when the signal link becomes available that contacts 8P–1 close. At this time the S relay of a subscriber requesting service operates from the ground extended to conductor 8PQ, and the respective RL conductor is transferred from conductor 11Q to conductor 11RS. At this time the dial tone on conductor 11RS is heard, rather than the system busy tone on conductor 11Q.

(2) *Establishment of conference call.*—A conference call may be established when a subscriber goes off-hook to dial three or four other parties. A conference may also be established when two or three parties are already engaged in conversation and wish to bring in other parties. The system operation is basically the same for both a conference call established by a subscriber having just gone off-hook, and for a conference call established by two or more parties already engaged in conversation. The latter sequence will be understood after consideration of the former.

(a) SINGLE-PARTY CONFERENCE ORIGINATION

When the subscriber at station 4 goes off-hook to originate a conference he is connected to the signal link and receives dial tone in the ordinary manner. To notify the system of the conference requirement he operates the nonlocking conference key 5PBCONF which applies a momentary ground potential to conductor 5C. This ground potential is extended through contacts 5L1–10 through 5LN–10 and 6S–5 to common conductor 4CS. Transistor 8Q4 and Zener diode 8Z3 are ordinarily conducting. Transistor 8Q4 turns off under two conditions. One of these is that arising when four parties are connected together in conference on the signal link, transistor 8Q1 turning on at this time to turn off transistor 8Q4. The turning off of transistor 8Q4 removes the ground on conductor 8BS which prevents a fifth station from being added to the signal link. A ground potential on conductor 4CS also turns off transistor 8Q4. Although the ground potential is applied only for the duration of the operation of the conference key at station 4, the momentary turning off of transistor 8Q4, with the resulting positive pulse on conductor 8CC, notifies the system that a conference is to be established.

When station 4 is first connected to the signal link dial tone is returned to the conference originator. The first part of the system operation is exactly the same as that pertaining to a regular two-party call. After the first called station is dialed a "dial tone reset" pulse appears on conductor 15QD to retire dial tone. A "station dialed" pulse appears on conductor 15GD to set flip-flop 9BT in order that busy tone be returned to station 4 in the event the first called station is busy. If the called station is busy the respective R relay does not operate and the "busy tone reset" pulse does not appear on conductor 4JS to retire the busy tone. If the first called station is available the R relay operates and the "busy tone reset" pulse resets flip-flop 9BT. Also, the "ringing supervision" signal on conductor 4KS turns on transistor 9Q1, but as in a two-party call the turning on of this transistor has no effect on the system.

If the first called station is busy the originator may cancel the call by hanging up. His S relay releases and the signal link is freed for use by other stations. If, on the other hand, the first station is available, or the originator wishes to establish a conference even though the first station is busy, he dials another station number. After the second number is dialed flip-flop 9BT is set and the originator is provided busy tone if the second called station is busy. If the station is available the "busy tone reset" pulse on conductor 4JS resets flip-flop 9BT.

Ordinarily, the "ringing supervision" signal on conductor 4KS results in a positive potential on conductor 11JK1 when the R relay of a called station is operated. In a two-party call ringback tone and ringing are provided immediately after the R relay of the called station operates. In a conference call however the time-out circuit maintains conductor 10CM at a positive potential. Relay 12DR is operated and ringing cannot be supplied to the called stations. Conductor 11CMI is at ground potential and the operation of ringback tone gate 11C is inhibited. After the time-out, i.e., when no station number has been dialed for five seconds, the potential of conductor 10CM goes to ground. At this time relay 12DR releases and AND gate 11C operates. Ringback tone is extended to station 4, and ringing current is extended to the called stations. As each called station goes off-hook the respective S relay operates, the ring conductor is transferred to conductor 11RS, and the tip conductor is transferred to conductor 11TS. The calling station and all of the called stations which have answered are connected in parallel and may begin talking. Until the last called station answers all stations connected to conductors 11RS and 11TS hear the ringback tone. If it becomes apparent that one or more of the called stations is unavailable ringing and ringback are retired manually by one or more of the parties already connected to the signal link. When one of the parties operates his conference key, transistor 8Q4 turns off. Ground potential is no longer supplied to conductor 8BS and the R relays of the unavailable parties release. The "ringing supervision" signal on conductor 4KS is thus removed and a "start" signal is sent to the allotter over conductor 9JK. All of the stations on the signal link are now transferred to the first available talking link just as are the two parties in a regular call. Supervision of the conference call is then under control of the talking link control circuit selected for the call. The talking link is released only when all of the stations on the conference go off-hook.

(b) MULTIPLE-PARTY CONFERENCE ORIGINATION

Two parties already connected to each other on a talking link may bring a maximum of two additional parties into the conference. Three parties already connected on a talking link may bring a maximum of one more party into the conference. When it is decided to establish or expand the conference, one of the parties operates his nonlocking conference key. If, for example, the first talking link is the one to which the parties are connected, all of the C conductors are connected through respective contacts 9 on the L1 relays to conductor 7TL1CI. Transistor 7Q2 is on and provides the ground on conductor 7TL1HT for holding all of the respective L1 relays operated. Transistor 7Q2 is held on by the positive potential sources such as 501 and 301 extended through respective contacts 11 on the L1 relays to conductor 7TL1ST. Zener diode 7Z is conducting in the reverse direction for maintaining transistor 7Q2 on. When one of the parties operates his conference key and conductor 7TL1CI is momentarily grounded, Zener diode 7Z turns off and transistor 7Q2 ceases to conduct. All of the operated L1 relays release and all of the respective contacts 11 open. Thus even when the conference key is released, transistor 7Q2 remains off.

When the L1 relays of the parties release they are all transferred to the signal link. Contacts 5 and 7 on the L1 relays open and contacts 6 and 8 close to transfer the tip and ring conductors of all stations previously connected to the talking link to conductors 11RS and 11TS. Although ordinarily the connection of a first station to the signal link results in the operation of relay 8P and the removal of the ground potential on conductor 8PQ to prevent other stations from seizing the signal link, all of the stations previously connected to the talking link are transferred to the signal link. The S relays of all of these stations are already operated and do not need the ground on conductor 8PQ to stay operated. Thus all of the stations originally converted to the talking link are transferred to the signal link, and are supplied dial tone.

The L1 relay of the party having operated his conference key releases prior to the release of the conference key. As a result, when contacts 10 on the respective L1 relay close the ground potential on the C conductor of the station is transmitted to conductor 4CS as it is when a single party originates a conference call. The resulting pulse on conductor 8CC initiates the conference sequence. Any one of the original parties may dial the numbers of the parties to be called into the conference. The operation of the system from this point is essentially the same as that when the conference is originated by a single party. The only difference is that more than one party is initially connected to the signal link.

It should be noted that a conference may not be expanded if contacts 8B-7 or 12DR-3 in the control circuit of the first talking link, or similar contacts in the control circuits of the other talking links, are open. If the signal link has been seized by another party, to insure his privacy it is necessary to prevent any other parties from being connected to the signal link. By providing contacts 8B-7 the parties on a conference may not transfer from their talking link to the signal link if the signal link is busy. (A party already having his S relay operated has his lamp connected over contacts 10 on the S relay to conductor 8LS. The continuous lamp signal which is provided when an intercom station is off-hook is the same as the "system busy" signal, and the conferees are thus unable to verify if the system is busy.) Contacts 8B-7 are open if the signal link is in use, and the operation of a conference key at any station does not result in the ground potential applied to conductor 7TL1CI being extended to the cathode of Zener diode 7Z for turning this diode off.

The purpose of contacts 12DR-3 is the following. In the course of establishing any conference if one or more of the called parties are unavailable ringback tone is retired when one of the parties already connected to the signal link operates his conference key. As described above this operation results in the transfer of all parties from the signal link to the first available talking link. This transfer to a talking link is a fast operation and it is possible that the conference key operated to retire the ringback is still operated. The moment the L1 relay of the party having operated the conference key energizes to connect the party to the talking link, the ground potential still on the C conductor would be extended through contacts 9 on the respective L1 relay to conductor 7TL1CI. This would result in the turning off transistor 7Q2, and the hold-up path for the conference on the talking link would not be established. Contacts 12DR-3 are included to prevent the ground potential on conductor 7TL1CI from turning off transistor 7Q2 when the parties are transferred to the talking link if a conference key is still operated. When the conference key is first operated the pulse on conductor 8CC triggers the time-out circuit and relay 12DR operates. Relay 12DR remains operated for five seconds, until the end of the time-out period. When the pulse first appears on conductor 8CC the stations are transferred to a talking link. Contacts 12DR-3 are held open for five seconds to insure that a hold-up path may be established. By the time these contacts close after five seconds the previously operated conference key has released.

(C) *Optional services*

(1) *Direct station selection and signaling.*—It is sometimes desirable that a party at a station be able to rapidly establish a regular or conference call to predetermined parties without the dialing of any station numbers. It is also sometimes desirable that the party be able to signal other stations, without subsequently being connected to the other stations over the intercom, e.g., an executive may desire to signal his secretary without speaking to her. These services may be provided in the invention for any or all stations requiring them.

Figure 16:
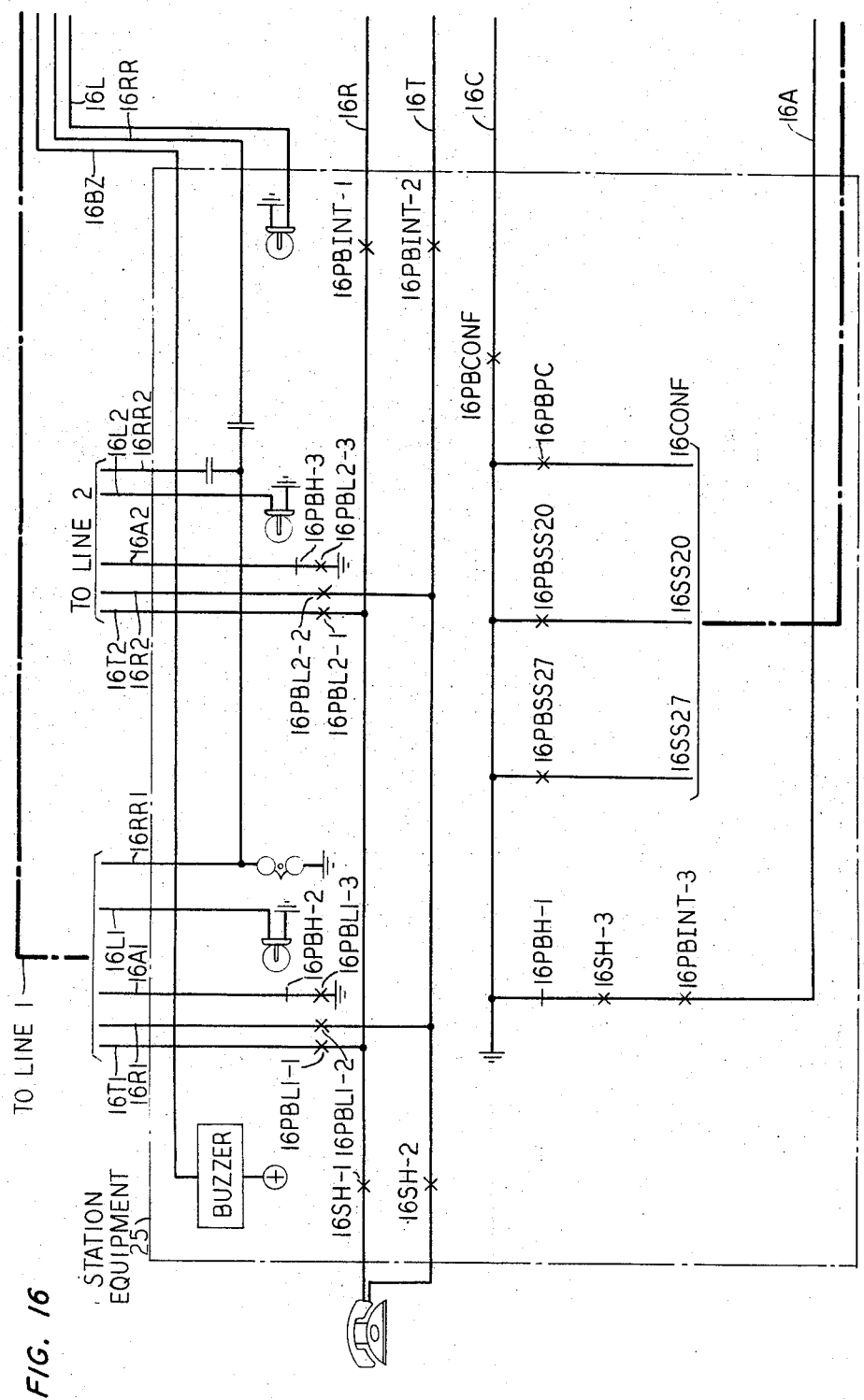

The station equipment of FIG. 16 is equipped with three nonlocking keys for enabling direct selection of stations. When key 16PBSS20 is operated station 20 is rung. When key 16PBSS27 is operated station 27 is rung. When the preset conference key 16PBPC is operated both stations 9 and 20 are rung and a conference call is set up.

When the party at station 25 goes off-hook he is connected to the signal link in the ordinary manner and receives dial tone. (This assumes the intercom key on his keyset is operated, and contacts 16PBINT-1 through 16PBINT-3 are closed.) He may dial one station number, or operate his conference key and dial a series of numbers. But the party also has the option of establishing a direct connection without the dialing of any numbers. Station card 25 is equipped with an additional relay 18DSS. The winding of this relay is connected through contacts 18S-3 to conductor 17SL, and the positive potential on this conductor controls the operation of relay 18DSS when the party goes off-hook. Although relay 18DSS is operated whenever the party at station 25 first goes off-hook the operation has no effect on the system unless further action is taken.

Suppose, for example, that a direct connection to station 20 is desired. The calling party, after first going off-hook, operates nonlocking key 16PBSS20. A ground potential is extended through these contacts, conductor 16SS20, and contacts 18DSS-2 to conductor 13SS20. The ground on conductor 13SS20 is applied through contacts 4R-3 to the winding of relay 4R, and if station 20 is not busy relay 4R operates. Ordinarily, a station is selected when the transfer circuit of FIG. 13 applies a momentary ground to one of conductors 13SS after the respective station number has been dialed. A direct connection is established by controlling the direct application of a ground potential to the preselected one of conductors 13SS.

The calling party hears dial tone even after he operates key 16PBSS20. The application of dial tone to conductor 11RS, connected to the ring conductor of the calling party, is controlled by flip-flop 9DT. This flip-flop is reset when a "dial tone reset" pulse appears on conductor 15QD. As no number has been dialed this pulse is not provided to reset the flip-flop. Similarly, busy tone flip-flop 9BT is not set by a "station dialed" pulse on conductor 15GD. Consequently, if station 20 is busy and relay 4R does not operate the calling party just hears dial tone. The continuation of dial tone notifies him that station 20 is busy. On the other hand, if station 20 is available and relay 4R operates the "ringing supervision" signal appears on conductor 4KS. The resulting positive potential on conductor 11JKI enables the operation of ringback tone AND gate 11C. Dial tone flip-flop 9DT is reset at this time when transistor 9Q1 turns on and transistor 9Q3 turns off. The operation of relay 4R and the closing of contacts 4R-4 controls the ringing of station 20. From this point the operation is the same as that in a regular two-party call. When station 20 answers the ringing, the "ringing supervision" signal on conductor 4KS is removed, and a "start" signal is sent to the allotter to control the transfer of stations 25 and 20 to a talking link.

In a similar manner the operation of key 16PBSS27 controls the direct selection and ringing of station 27. Conductor 16SS27 is connected through contacts 18DSS-4 to conductor 13SS27, which in turn is connected to the winding of the R relay on station card 27.

If the preset conference is to be established the preset conference key 16PBPC is operated at station 25. In this case the ground potential on conductor 16CONF is applied through isolation diodes to both of conductors 13SS9 and 13SS20. If at least one of the two respective R relays operates, the "ringing supervision" signal on conductor 4KS controls the return of ringback tone to station 25, and the termination of dial tone. Ringing current is extended to the available called stations through contacts 4 on the respective R relays. If one of the called parties does not answer, ringing and ringback are retired as in the conference call sequence. One of the parties already connected to the signal link operates his conference key which controls the turning off of transistor 8Q4 and the release of the operated R relays. When the "ringing supervision" signal is removed from conductor 4KS the allotter begins functioning.

It should be noted that when the preset conference is established relay 12DR and the time-out circuit do not operate, and ringing and ringback are not delayed. In the course of establishing a regular conference, conductors 13SS are sequentially grounded by the transfer circuit after the originating party successively dials the called station numbers. Moreover, when the preset conference is established the 13SS conductors are grounded simultaneously. There is thus no reason to delay ringing and ringback.

Relay 18DSS should operate only when station 25 is connected to the signal link. This is necessary to prevent the party at station 25 from interfering with another party originating a call on the signal link. Relay 18DSS is operated by the positive potential on conductor 17SL. This relay cannot operate when station 25 is connected to a talking link, or is on-hook. In the latter case relay 18S is unoperated and contacts 18S-3 are open. In the former, a positive potential does not appear on conductor 17SL as one of relays 17L1-17LN is operated, and the respective contacts 12 are open.

The party at station 25 may signal station 20 directly by operating key 16PBSS20 without first going off-hook. If station 25 remains on-hook contacts 18DSS-3 remain closed. Ground potential is extended through key 16PBSS20, conductor 16SS20, contacts 18DSS-3 and conductor 3BZ to the buzzer in station 20. The buzzer thus operates. Similarly, if key 16PBSS27 is operated ground potential is extended through the key, conductor 16SS27 and contacts 18DSS-5 to station card 27, and from the station card to the buzzer in station 27. The party at station 25 has the option of signaling or selecting either of stations 20 and 27. If one or both of keys 16PBSS20 and 16PBSS27 are operated while station 25 remains on-hook, stations 20 and 27 are signaled. On the other hand, if one or both are operated when the station is off-hook a talking connection is established to one or both of stations 20 and 27.

Station 25 is also equipped with a buzzer and a conductor 16BZ extended to station card 25. If station 25 is to be signaled from another station, a strap connection between conductor 16BZ and normally closed contacts on the DSS relay of another station card is made. Similarly, the buzzer in station 20 and conductor 3BZ are not required if station 20 is not to be signaled from another station. Although the connections required for the direct station selection and signaling depend upon the particular requirements of the station provided the service, i.e., the connections depend upon the number of and the particular stations to be signaled or selected, the station cards may be manufactured as standard units, and the strap connections to the various 13SS and BZ conductors made on an individual basis.

(2) *Hold feature.*—The station equipment, such as that at the extension location for station 25, has already been described as including direct station selection and signaling circuitry. If the only optional feature provided the station is the direct station selection and signaling, the additional equipment to be described in this section is not included in the station equipment. Station equipment 25 is shown as including the maximum number of features in order that the number of figures in the drawing be kept to a minimum.

The station is provided with a key set which includes a variety of pushbuttons. When key 16PBINT is operated contacts 16PBINT-1 through 16PBINT-3 are closed, and the station is connected to the intercom over conductors 16R, 16T and 16A. On the other hand, if key 16PBL1 is operated the station is connected over contacts 16PBL1-1 through 16PBL1-3 to line 1, and if key 16PBL2 is operated the station is connected over contacts 16PBL2-1 through 16PBL2-3 to line 2. The three lamps connected to conductors 16L, 16L1 and 16L2 are each underneath the respective key, the state of the lamps indicating which of the two lines, or the intercom, is connected to the station. The subscriber at station 25 has access to three different lines, only one of them going to the intercom equipment.

A hold key 16PBH is also provided. The purpose of the hold key is to enable the party at station 25 to hold either the outside line, or the intercom line, while transferring to and talking over another line. The keyset is of the conventional type wherein the operation of the hold button closes or opens the nonlocking hold contacts 16PBH-1 through 16PBH-3, the release of the hold button returning the contacts to their normal condition, and in addition pulling up that one of keys 16PBINT, 16PBL1 or 16PBL2 which was previously operated. The hold sequence for lines 1 and 2 will be described below. The hold sequence for the intercom requires only contacts 16PBH-1.

When the hold key is operated contacts 16PBH-1 open. Initially, the station is connected to the intercom with key 16PBINT operated, and when the station is off-hook and switchhook contacts 16SH-3 are closed ground potential is extended over conductor 16A to FIG. 18. To hold the intercom connection while the station is transfered to another line, the hold key is first operated and the ground is removed from conductor 16A. When the hold button is released it pulls up with it the previously operated key 16PBINT. The station is thus no longer connected to the intercom. The intercom connection is held however because when the ground is first removed from conductor 16A (the hold button being pushed down), contacts 16PBINT-1 and 16PBINT-2 are still closed and relay 17TP remains operated. The removal of ground potential from conductor 16A, while relay 17TP is operated, controls the continued energization of this relay even when contacts 16PBINT-1 and 16PBINT-2 open. One of keys 16PBL1 and 16PBL2 is then operated to enable the station to be connected to one of the two outside lines. After the outside call is completed the party may reconnect his station to the intercom by operating key 16PBINT. The ground on conductor 16A deenergizes the hold circuit, and relay 17TP is now held operated because contacts 16PBINT-1 and 16PBINT-2 are closed.

Relay 18H is normally unoperated. The ground potential on conductor 16A holds off Zener diode 18Z2. Contacts 17TP-1 are closed when the station is connected to the intercom, and current from transistor 18Q2 flows to ground over conductor 16A. When the hold button is first operated the ground potential is removed from conductor 16A. Current from transistor 18Q2 flows through Zener diode 18Z2 in the reverse direction. A forward bias is applied to transistor 18Q3 which turns on, and relay 18H operates. When the hold button is released, because key 16PBINT is pulled up contacts 16PBINT-3 are open, and there is no ground on conductor 16A to hold Zener diode 18Z2 off. Thus during the interval that the subscriber at station 25 is connected to an outside line, relay 18H remains energized, contacts 18H-1 on FIG. 17 remain closed, and resistor 1700 is bridged across conductors 16R and 16T. This resistor simulates a subset termination, line current flows, and relay 17TP remains operated. After the outside call is completed and the intercom pushbutton 16PBINT is operated, ground potential appears once again on conductor 16A, and relay 18H releases. Contacts 16PBINT-1 and 16PBINT-2 are now closed and current flows through conductors 16T and 16R. Contacts 18H-1 open and resistor 1700 no longer bridges conductors 16T and 16R.

Relay 18H also provides a "wink" signal to the station for indicating that the intercom connection is being held. The L conductor of each of the other stations is connected through normally closed contacts on the respective S and R relays to conductor 8LB which provides a continuous lamp signal when the system is busy. Each L conductor is connected through the same S contacts and normally open contacts on the R relay to conductor 8LF when the station is being rung. A similar connection is provided for conductor 16L when relay 18H is unoperated. Contacts 18H-2 are normally closed, and conductor 16L is connected to contacts 18S-11 just as the other L conductors are connected to contacts 11 on the respective S relays. When relay 18H is operated however contacts 18H-2 are open, and instead contacts 18H-3 are closed. Conductor 16L is now connected to common conductor 8W. All stations provided with a hold feature have connections through contacts 3 on the respective H relays to conductor 8W. This conductor is connected to wink source 820, and the wink signal on the station intercom lamp reminds the subscriber that the intercom connection is being held.

The only other difference on station card 25 from the other station cards is in the ringing connection. The tip conductors of the other stations are connected through contacts 4 on the respective R relays to conductor 6RG, over which the ringing signal is applied. Station 25 however has a ringing signal applied over an additional conductor 16RR, rather than over conductor 16T, due to the common audible connection in the station equipment. For this reason, in station card 25 contacts 18R-4 control the connection of conductor 16RR to conductor 6RG, rather than the connection of conductor 17TL to conductor 6RG. Common audible ringing is provided at the station (over three RR conductors rather than three tip conductors) because the station may be rung from any one of three lines, and the three tip conductors should not be connected in parallel across the ringer. Conductor 17TL may now be connected directly to a positive potential source through contacts on relay 18S, rather than through contacts on the R relay as well as in the other station cards.

Figure 19:
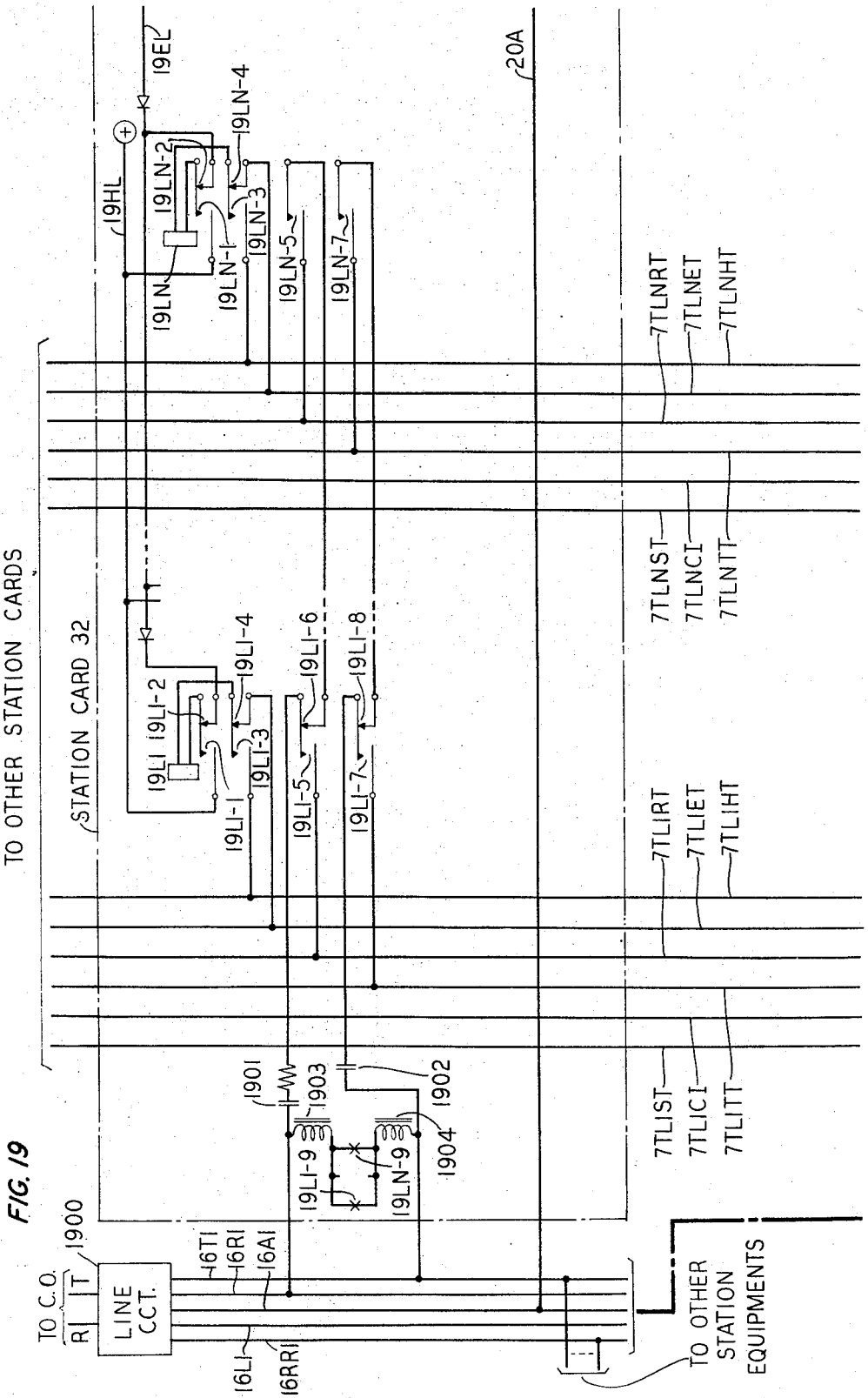

(3) *Outside line add-on.*—The outside line add-on feature enables a line extended to a central office, private branch exchange, etc., to be brought into the intercom system. The line may terminate at the subset of one or more of the subscribers having intercom extensions. For example, the central office line in FIG. 19 is extended through line circuit 1900 to station equipment 25 on FIG. 16. The T1, R1, A1, L1 and RR1 conductors may also be extended to other station equipments, each of the extensions having access to the outside line through a respective key, such as 16PBL1. The keys for station 25 include one for controlling the connection of the subset to the intercom, another for controlling the connection of the subset to a first outside line L1, and a third for controlling the connection of the subset to a second outside line L2 (not shown in the drawing). When the first of these keys is operated contacts 16PBINT-1 through 16PBINT-3 are closed. When the second is operated, contacts 16PBL-1 through 16PBL1-3 are closed, and when the third is operated contacts 16PBL1-1 through 16PBL1-3 are closed. Only one of these keys may be operated at any one time. When the key for line 1 is operated station 25 is connected through line circuit 1900 to the central office.

The stations in the system may not dial outgoing calls. However, incoming calls may be answered directly at any station having access to line 1 by the operation of the key for line 1. An incoming call results in line circuit 1900, of known variety, applying a ringing potential to conductor 16RR1 which controls the ringing at station 25. The line circuit also applies a potential on conductor 16L1 to light the respective lamp at station 25. This notifies the subscriber where the ringing has originated. The key for line 1 is operated, and contacts 16PBL1-1 through 16PBL1-3 close. When the subscriber goes off-hook he is connected directly through line circuit 1900 to the central office. The ground potential on conductor 16A1 controls the operation of a relay in the line circuit which, among other things, maintains conductor 16L1 energized for lighting the lamp associated with line 1 at each of the stations connected to the line.

The purpose of providing the outside line add-on feature is to enable the party at station 25, for example, to call in another party, or even more than one party. Suppose the calling party wishes to talk to the subscriber at station 9, and perhaps the subscriber at station 24 as well, neither of which may have direct connections to the outside line. The party at station 25 controls the connection of both his own station, stations 9 and 24, and the outside line over a talking link. (When station 25 is connected to the outside line over a talking link, it is no longer connected through contacts 16PBL1-1 through 16PBL1-3 directly to the outside line, key 16PBSNT rather than key 16PBL1 being operated.) The party at station 25 having answered the incoming call may transfer it to other stations through the intercom system, and then even go on-hook if he is not required in the call.

Outside line add-on is accomplished by providing a station card for each outside line which is to be connected through the intercom system. The outside line station cards, one of which is shown on FIGS. 19 and 20 plug into the frame equipment in the ordinary manner. They are not connected however to the signal link. The outside lines are connected through the intercom only on talking links. In addition, there is no 15DSS lead as no dialing originates from the outside line. There is however a 13SS lead for each outside line, the 13SS lead being used for controlling the connection of the line to a talking link. Any one of the stations may control the connection of the outside line to a talking link by dialing the "station" number associated with the outside line. In the illustrative embodiment of the invention there are 20 permissible station numbers. If one outside line is to be connected through the intercom system there is a maximum of only 19 extensions. The 20th extension is replaced by the outside line. In the illustrative embodiment of the invention station number 32 is used for controlling the connection of the outside line through the intercom.

Figure 20:
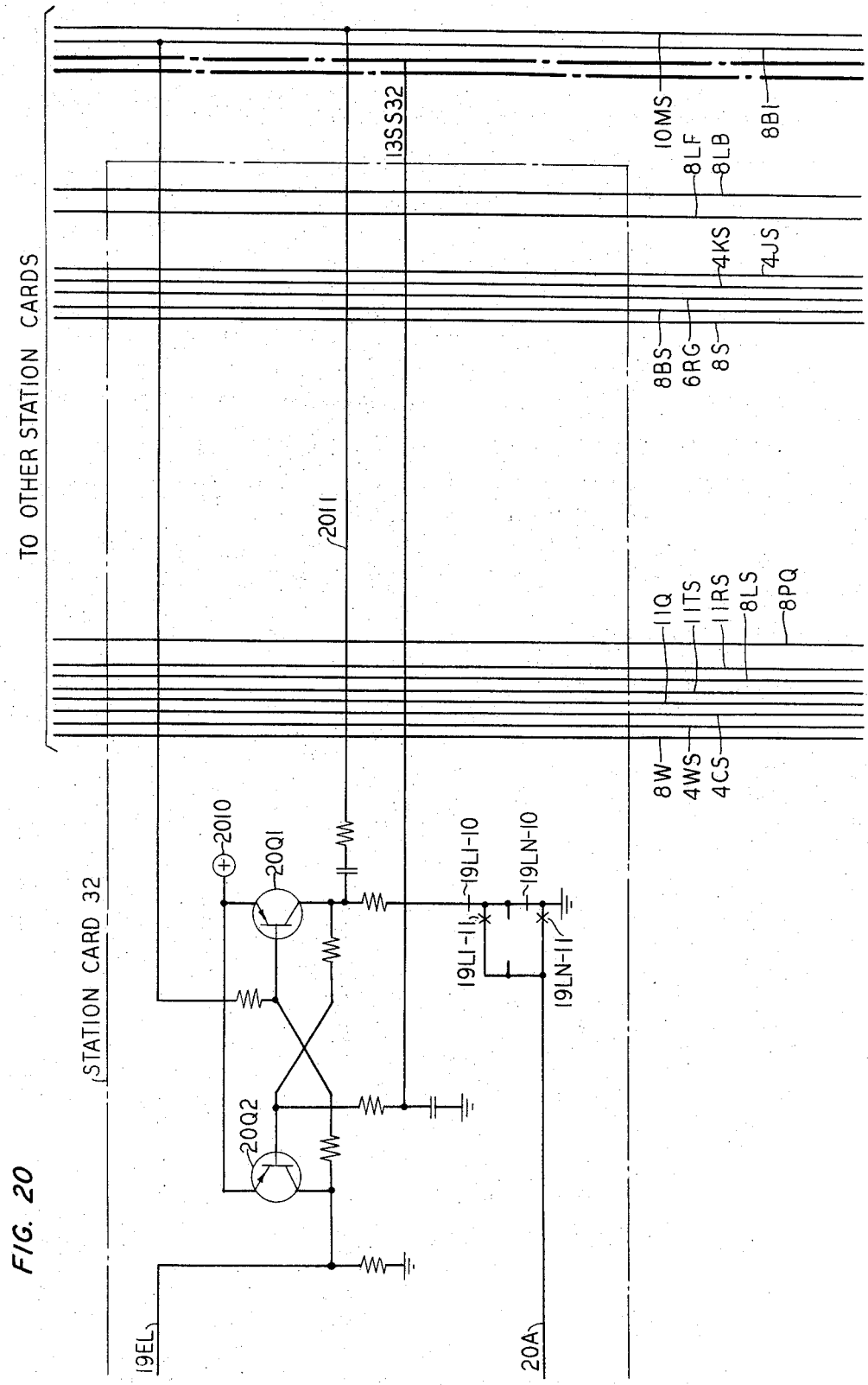

Referring to FIG. 20 it is seen that numerous ones of the common conductors are extended without being connected to station card 32. The conductors are shown only for the purpose of illustrating that they are extended along the frame equipment to be connected to other station cards above station card 32. Similarly, there are two common conductors 8B1 and 10MS which are extended along the frame equipment but are not connected to most of the station cards. These common conductors are connected only to outside line station cards such as 32. The talking links are connectable to the outside line tip and ring conductors in the same manner as are the tip and ring conductors of any station.

The operation of the outside line add-on circuit is best understood by tracing an illustrative call. Suppose an incoming call is received on outside line 1, and is answered at station 25. Suppose the calling party wishes to speak with the parties at extensions 9 and 24. The party at station 25 controls the connection. He first operates his hold button. Contacts 16PBH-2 in conductor 16A1 open when the pushbutton is depressed. The removal of the ground from conductor 16A1 notifies line circuit 1900 that the outside line is to be held. Accordingly, the line circuit controls the placing of a bridge across conductors 16T1 and 16R1. When the hold button is released, key 16PBL1, which controls the connection of station 25 to the outside line through contacts 16PBL1-1 through 16PBL1-3, pulls up. Station 25 is no longer connected to line circuit 1900, but the outside line is held by the line circuit. The line circuit also applies a wink signal to conductor 16L1 and the L conductors extended to the other stations having direct access to the outside line. The wink signal is a reminder that the outside line is being held. The line circuit holds the outside line until ground is once again applied on conductor 16A1.

The key at station 25 controlling the connection to the intercom system is then operated and contacts 16PBINT-1 and 16PBINT-2 close. (Contacts 16PBINT-3 also close but are only required for the intercom hold sequence.) The party at station 25 thus controls the operation of relays 17TP and 18S, and dial tone is returned in the ordinary manner. Station number 32 is first dialed. The selector circuit applies a momentary ground to conductor 13SS32. Transistors 20Q1 and 20Q2 comprise a flip-flop with transistor 20Q1 normally conducting and transistor 20Q2 being normally off. The momentary ground on conductor 13SS32 turns transistor 20Q2 on, and turns transistor 20Q1 off. When transistor 20Q2 turns on, the positive potential of source 2010 is extended through the transistor to conductor 19EL. The positive potential on this conductor serves the same purpose as a positive potential on conductors 17EL, 3EL or 5EL—it controls the subsequent operation of one of the talking link relays, 19L1–19LN, after the allotter has selected an idle talking link.

Immediately after station number 32 is dialed the party at station 25 dials the number or numbers of the stations to be connected to the outside line. If only one station is to be so connected that station number is dialed. If more than one station is to be connected, the conference key is first operated at station 25 and all of the called station numbers are then dialed, in this case station numbers 9 and 24. As usual, busy tone is returned to station 25 after each number is dialed if the respective station is busy. Ringing is delayed until after all of the called station numbers have been dialed.

It should be noted that when station number 32 is dialed there is no R relay which operates. Ringing need not be extended to the outside line, and an R relay is therefore not required. There are none of the ordinary connections of station card 32 to the supervision and logic circuits. However, it is to be recalled that the busy tone flip-flop 9BT is set after each station number is dialed, and unless the R relay of the called station is operated busy tone is returned to the originator. When station number 32 is dialed there is no R relay which may operate and apply a positive "busy tone reset" pulse on conductor 4JS to reset the busy tone flip-flop. For this reason other circuitry is provided to control the resetting of the busy tone flip-flop in order that busy tone not be returned to station 25. When transistor 20Q1 turns off a negative pulse is applied to conductor 2011. This negative pulse appears on common conductor 10MS, and is extended to FIG. 10. The "busy tone reset" pulse on conductor 4JS normally turns on transistor 10Q6 which results in a negative pulse being applied to the base of transistor 10Q7. The negative pulse on conductor 10MS has the same effect. The monostable delay circuit is triggered and the busy tone flip-flop is reset.

If any one station number is being dialed by the party at station 25 and the called station is busy, or if more than one are being dialed and they are all busy, the party at station 25 merely operates the key connecting his station to line circuit 1900. When contacts 16PBL1-3 close and the ground potential is once again applied to conductor 16A1, line circuit 1900 is notified that the bridge across conductors 16T1 and 16R1 is to be removed, and that these conductors are to be connected through the line circuit directly to the outside line. The party at station 25 may thus notify the calling party that the parties to whom he wishes to speak are busy. Similar remarks apply if the called parties are unavailable and do not answer the ringing. In either event when the key connecting station 25 to the outside line is operated, the key connecting station 25 to the intercom is released, and the intercom becomes available for use by another station.

If, on the other hand, the called station or stations are available and answer the ringing, the allotter starts functioning in the ordinary manner. The stations on the signal link, including station 25, are transferred to the first available talking link. Not only are these stations transferred to the talking link, but so is the outside line. The positive potential on conductor 19EL controls the operation of one of relays 19L1–19LN. When one of the L relays on an ordinary station card operates from the potential on the respective EL conductor, the relay is held operated by the potential on the HL conductor. That one of relays 19L1–19LN which is operated remains operated by the positive potential on conductor 19HL.

It is necessary to notify line circuit 1900 to remove the bridge across conductors 16T1 and 16R1. Referring to FIG. 20 it is seen that when one of the relays 19L1–19LN operates, and one set of contacts 19L1-9 through 19LN-9 close, a ground potential is extended along conductor 20A to conductor 16A1. This ground potential notifies line circuit 1900 to remove the bridge from across conductors 16T1 and 16R1.

There is no DC connection from the outside line to the tip and ring conductors extended through station card 32 to the talking link due to the inclusion of capacitors 1901 and 1902. Only a voice path is provided. It is necessary to simulate a DC termination of the central office line in order that the central office be aware that the connection should be maintained. For this reason inductors 1903 and 1904 are provided. These inductors, and that one set of contacts 19L1–9 through 19LN–9 which are closed, provide a DC path between conductors 16T1 and 16R1 which simulates a DC line termination. The inductors provide a high impedance to alternating currents so that the voice signals are not shorted.

It should be noted that two of the conductors in each talking line, the ST and CI conductors, are not connected to the outside line station cards. The CI conductor is used for controlling the transfer of all stations on a talking link to the signal link when it is desired to expand a call. A connection between the CI conductor and the outside line is not required because the outside line cannot control the transfer of the stations on the talking link to the signal link, the outside line having no conference key. The ST conductor on each talking link is used for maintaining a transistor such as 7Q2 conducting, the transistor supplying the ground potential on the HT conductor which holds the L relays of the off-hook stations operated. As long as one of the stations originally on the talking link remains off-hook the talking link is held by the positive potential on the ST conductor. In order that the outside line be unable to hold the talking link even after all of the intercom stations on the talking link have gone on-hook, no connections are made to the ST conductors in the outside line station cards.

When one of relays 19L1–19LN operates and the respective contacts 10 open, ground potential is no longer supplied to the collector of transistor 20Q1 and the base of transistor 20Q2. Transistor 20Q2 is unable to conduct even if another station originating a call dials station number 32. This insures that another station is unable to interfere with the previously established outside line connection. A second one of relays 19L1–19LN may not be operated because the operating potential on conductor 19EL may not be provided. Furthermore, if another party dials station number 32 transistor 20Q1 does not switch to the off state as it is already nonconducting, and a pulse does not appear on conductors 2011 and 10MS. The busy tone flip-flop 9BT is thus not reset and the party having dialed station number 32 is notified that the outside line is busy.

Common conductor 8B1 and contacts 8B–11 on FIG. 8 are provided to reset the flip-flop comprising transistors 20Q1 and 20Q2. Conductor 8B1 is connected to the station cards of all outside lines. When the call is terminated and all of contacts 19L1–10 through 19LN–10 are closed, the ground potential on conductor 8B1, applied to the base of transistor 20Q1, turns this transistor on.

It is to be understood that the above-described embodiment is only illustrative of the principles of the invention. Numerous other arrangements may be devised by those skilled in the art without departing from the spirit and scope of the invention.

What is claimed is:

1. An intercom system comprising a plurality of stations, a plurality of talking links, a signal link, means responsive to one of said stations going off-hook for connecting said one station to said signal link, means responsive to a single called station number received from said one station for connecting to said signal link the respective called station, means responsive to a predetermined signal followed by a series of called station numbers received from said one station for connecting all of the respective called stations to said signal link, means responsive to the connection of all called stations to said signal link for transferring all stations connected to said signal link to an idle one of said talking links, means for extending to said one station a busy tone signal immediately after a called station number is received if the respective called station is busy, means for ringing all called stations, and means for delaying the ringing of all called stations whose respective station numbers are received following said predetermined signal until after all of the called station numbers in said series are received from said one station.

2. An intercom system comprising a plurality of stations, a plurality of talking links, a signal link, means responsive to one of said stations going off-hook for connecting said one station to said signal link, means responsive to a single called station number received from said one station for connecting to said signal link the respective called station, means responsive to a predetermined signal followed by a series of called station numbers received from said one station for connecting all of the respective called stations to said signal link, means responsive to the connection of all called stations to said signal link for transferring all stations connected to said signal link to an idle one of said talking links, additional transferring means connected to each of said talking links each responsive to the receipt of said predetermined signal from one of the stations connected to the respective talking link for transferring all of the stations connected to said talking link back to said signal link to enable the connection of additional stations to said signal link, said first-mentioned transferring means thereafter transferring all stations connected to said signal link from said signal link to an idle one of said talking links.

3. An intercom system in accordance with claim 2 further including a preference circuit for controlling the transfer of all stations connected to said signal link to the first idle one of said talking links, whereby the stations first transferred from a talking link to said signal link and thereafter transferred back to a talking link are not necessarily transferred back to the same talking link from which they were first transferred.

4. An intercom system in accordance with claim 2 further including means for inhibiting said additional transferring means from transferring all stations on a talking link to said signal link if said predetermined signal is received when another of said plurality of stations is connected to said signal link.

5. A telephone switching system comprising a plurality of telephone stations, a plurality of talking links for connecting together said telephone stations for communication therebetween, a signal link seizable by any one of said stations to establish a communication connection between specific ones of said stations, a station card for each of said stations, said station card including first relays for connecting said stations to said talking links, a second relay for connecting said station to said signal link, and a control cell individual to said station, a timing cell common to all said control cells, means responsive to energization of a particular second relay for partially enabling said control cell individual to the station of said second relay, means responsive to energization of any second relay for enabling said timing cell, means responsive to time out of said timing cell for partially enabling all of said control cells, and means responsive to the complete enablement of one particular control cell for releasing said second relay individual thereto.

6. An intercom system comprising a plurality of stations, a plurality of talking links, a signal link, means for connecting any station going off-hook to originate a service request to said signal link, means for inhibiting said connecting means when one of said stations is already connected to said signal link, means responsive to information received from any station connected to said signal link for ringing all stations called by said any station, means for overcoming said inhibiting means to control the connection to said signal link of all of said called stations going off-hook, and means for transferring all stations connected to said signal link to an idle one of said talking links.

7. A telephone switching system comprising a plurality of telephone stations, each of said stations having a conference circuit key, a plurality of conference bus circuits for linking together different groups of said stations, a signaling bus circuit seizable by any calling one of said stations to establish a temporary conference connection between said calling station and each station successively called by said calling station, means responsive to the extension of said temporary conference connection to the last called one of said stations for transferring said stations in said temporary conference connection to an idle one of said plurality of conference bus circuits, and means responsive to the operation of said conference circuit key at any of said stations connected to said one of said conference bus circuits for reconnecting each of said stations to said signaling bus circuit, said transferring and said reconnecting means including a station circuit card for each of said stations having an appearance at each of said plurality of conference bus circuits and at said signaling bus circuits, connecting means at each of said appearances, and circuit means for normally extending control of said connecting means to said signaling bus circuit during said establishment of said temporary conference connection and for thereafter extending said control to said one of said conference bus circuits.

8. A station circuit card for use in a telephone switching array comprising means for supervising the condition of a telephone station associated with said circuit card, a plurality of multipath connecting means, said plurality of connecting means being selectively energizable to extend a conference circuit connection from said associated telephone station to any of said multiplicity of paths, first and second signal path connecting means, said first signal path connecting means being controlled by said supervising means responsive to the calling condition of said associated station, said second signal path connecting means being controlled by said multipath connecting means responsive to said station circuit card being called by any other station of said telephone switching array, means responsive to the operation of said supervising means following the operation of said second signal path connecting means for operating said first signal path connecting means to extend a conference connection to said associated telephone station, means controlled by the operation of said first signal path connecting means for releasing said second signal path connecting means and for operating one of said multipath connecting means, and means controlled by said associated telephone station for releasing said one of said multipath connecting means and reoperating said first signal path connecting means.

9. A telephone switching system for connecting a plurality of called stations with a calling station comprising a plurality of station card circuits and a plurality of talking path circuits arranged in an array, said station card circuits each having a plurality of connecting means, each of said connecting means being associated with a respective one of said talking path circuits, a signal link appearing in said array, said signal link having a plurality of circuit paths, means for connecting a calling one of said stations to transmit a sequence of called station numbers through a first path in said link, means responsive to said sequence of called station numbers for marking called ones of said station card circuits, means at said marked station card circuits for connecting said station card circuits to a second path in said link to ring said stations, means at each of said last-mentioned station card circuits responsive to the off-hook condition of its associated station following said ringing for preparing a common operating path for said plurality of connecting means, further means at said last-mentioned station card circuits responsive to said off-hook condition for connecting said station card circuits to a third path in said link to connect said off-hook stations in temporary conference connection, and means associated with said signal link and responsive to the connection of the last called one of said stations to said third path in said link for selecting an idle one of said plurality of talking path circuits, said talking path connecting means at said station cards being operative responsive to said selecting of said one of said talking path circuits and said preparing of said common operating path.

10. A telephone switching system comprising a plurality of telephone stations, each of said stations having a conference circuit key, a plurality of talking links for connecting together said telephone stations for communication therebetween, a signal link seizable by any one of said stations to establish a communication connection between specific ones of said telephone stations, means for transferring said connection from said signal link to one of said talking links, means responsive to operation of one of said conference circuit keys for transferring said connection back to said signal link, means for applying ringing signals to an additional telephone station to be added to said connection on said signal link, and means responsive to a second operation of said conference circuit key for removing said ringing signals.

11. A telephone switching system comprising a plurality of telephone stations, each of said stations having a conference circuit key, a plurality of talking links for connecting together said telephone stations for communication therebetween, a signal link seizable by any one of said stations to establish a communication connection between specific ones of said telephone stations, means for transferring said connection thus established from said signal link to an available one of said talking links, means responsive to a first operation of one of said conference circuit keys for transferring said connection back to said signal link, means responsive to calling signals from one of said stations on said connection for attempting to signal an additional station, and means responsive to a second operation of one of said conference circuit keys for transferring said connection back to a then available one of said talking links and for ceasing said attempts to signal said additional station.

12. A telephone switching system comprising a plurality of telephone stations, a plurality of talking links for connecting together said telephone stations for communication therebetween, a signal link seizable by any one of said stations to establish a communication connection between specific ones of said stations, means for transferring said connection thus established from said signal link to an available one of said talking links, means connected to each of said talking links for supervising connections between said stations over said talking links, means for preventing a station not on a talking link from seizing said signal link when all said talking links are busy, and means responsive to one of said stations on one of said talking links for transferring a connection from said one talking link back to said signal link independent of all said talking links being busy.

13. An intercom system comprising a plurality of stations, a plurality of talking links, a signal link, a plurality of station cards each for selectively connecting a respective one of said stations to any of said talking links and to said signal link, each of said station cards having a first relay for connecting the respective station when off-hook and not connected to one of said talking links to said signal link, a control circuit, each of said station cards having a second relay responsive to said control circuit for extending a ringing signal to the respective station, means including said first relay in each of said station cards for controlling the release of said respective second relay responsive to the respective station going off-hook to answer said ringing signal, means in said control circuit responsive to the release of all operated ones of said second relays for transferring all stations connected to said signal link to an idle one of said talking links, signaling means at each of said stations, means connected to said signal link responsive to the operation of the signaling means at any one of said stations connected to said signal link for releasing all operated ones of said second relays, and means connected to each of said talking links responsive to the operation of said signaling means at any station connected to said talking link for disconnecting all stations connected to said talking link to control the operation of the respective ones of said first relays.

14. A telephone switching system comprising a plurality of stations, a plurality of talking links, a signal link, means for connecting any of said stations going off-hook to said signal link, a selector circuit connected to said signal link for registering dial pulses received from one of said stations connected to said signal link, means responsive to said selector circuit for signaling called stations and controlling the connections of said called stations to said signal link, means for transferring all stations connected to said signal link to an idle one of said talking links, a time-out circuit operative when one of said stations is first connected to said signal link, means responsive to the time out of said time-out circuit for disconnecting all of the stations connected to said signal link from said signal link, and means for thereafter preventing the connection to said signal link of any station disconnected from said signal link until said station first goes on-hook and then off-hook.

15. An intercom system comprising a plurality of stations, a plurality of talking links, a signal link, means for connecting any station going off-hook to originate a service request to said signal link, a source of dial tone, means responsive to the connection of a first station to said signal link for connecting said source of dial tone to said signal link, a selector circuit connected to said signal link for registering the identity of a called station, a source of busy tone, means responsive to the registering of said called station in said selector circuit for disconnecting said source of dial tone from said signal link and for connecting said source of busy tone to said signal link, a source of ringback tone, means for determining the availability of said called station and for removing said source of busy tone from said signal link and connecting said source of ringback tone to said signal link only if said called station is available, means for ringing said called station if available and for connecting said called station to said signal link when said called station goes off-hook, and means responsive to the connection of said called station to said signal link for transferring said calling and called stations to the first available one of said talking links.

16. A conference circuit comprising a plurality of stations; a plurality of talking links; a signal link; means for connecting to said signal link a calling station going off-hook to originate a service request; signaling means at each of said stations; a time-out circuit connected to said signal link and operative responsive to the operation of said signaling means at said calling station; a selector circuit connected to said signal link for registering called station numbers dialed by said calling station; a source of ringing signals; a relay associated with each of said stations and responsive to said selector circuit for extending ringing signals from said ringing signal source to said called stations; means responsive to the operation of said time-out circuit for inhibiting the operation of said ringing signal source; a source of dial tone; means for connecting said dial tone source to said signal link when said calling station is first connected to said signal link; a source of busy tone; means responsive to the registering by said selector circuit of a first called station number for disconnecting said dial tone source from said signal link; means responsive to the registering of each called station number by said selector circuit for connecting said busy tone source to said signal link; means for operating said respective relay of each called station and for disconnecting said source of busy tone from said signal link if said station is available; means responsive to the registering of each called station number for reinitiating the operation of said time-out circuit; means responsive to the time out of said time-out circuit when no called station number has been dialed for a predetermined time interval for releasing said inhibiting means; means responsive to each called station going off-hook for releasing the respective relay; and means responsive to the release of all of said operated relays for transferring all stations connected to said signal link to an idle one of said talking links.

17. A conference circuit in accordance with claim 16 further including means responsive to the reoperation of said signaling means at said calling station and the operation of said signaling means at one of said called stations for releasing all operated ones of said relays in the event one or more of said called stations remains on-hook.

18. An intercom system comprising a plurality of stations; a plurality of talking links; a signal link; a plurality of station cards each for selectively connecting a respective station to all of said talking links and to said signal link; each of said station cards including a plurality of relays each for connecting the respective station to a respective one of said talking links; each of said station cards including a first relay for connecting the respective station when off-hook and when none of the respective plurality of relays is operated to said signal link; a selector circuit connected to said signal link for registering called station numbers; a second relay in each of said station cards responsive to said selector circuit for signaling a called station, and together with said first relay for controlling the connection to said signal link of said called station going off-hook in response to said signaling; means in each of said station cards responsive to the operation of the respective first relay for preparing an operating path for one of said respective plurality of relays; means responsive to the connection of called stations to said signal link for completing said operating path for one of said plurality of relays in each of said station cards whose first relay is operated for connecting the respective stations connected to said signal link to a selected one of said talking links; an outside line circuit; a station card including a plurality of relays each for connecting said outside line circuit to a respective one of said talking links; means in said outside line station card responsive to said selector circuit for preparing an operating path to all of said plurality of relays in said outside line station card; and means responsive to said completing means for operating one of said plurality of relays in said outside line station card for connecting said outside line circuit to said selected talking link.

19. In a telephone switching system having a plurality of stations and a plurality of communication links, an arrangement for selectively establishing conference calls among said stations comprising means for connecting any station orginating a service request to a predetermined one of said communication links, means for registering the identities of called stations whose respective station numbers are received from said service request originating station, means for interrogating each of said called stations to determine its availability after the respective station number is received, means for extending a busy tone signal to said originating station after each interrogation of a called station if the called station is unavailable, means for ringing each of the available of said called stations and for connecting each of the available of said called stations to said predetermined communication link after the last one of said called stations has been interrogated, and means for transferring all stations connected to said predetermined communication link to one of the others of said communication links.

20. In a telephone switching system having a plurality of stations and a plurality of communication links, an arrangement for selectively establishing conference calls among said stations comprising means for connecting a station originating a service request to one of said communication links, means for registering the identity of each called station whose respective station number is received from said service request originating station, means for interrogating each of said called stations to determine its availability after the respective station number is received from said originating station, means for extending a busy tone signal to said service request originating station after each interrogation if said interrogated station is unavailable, and means for ringing all available called stations and connecting all available called stations to said one communication link only after no more called station numbers are received from said originating station.

References Cited

UNITED STATES PATENTS

| | | | |
|---|---|---|---|
| 2,534,850 | 12/1950 | Bowne | 179—37 X |
| 2,543,986 | 3/1951 | Prahm | 179—18.01 |
| 2,883,457 | 4/1959 | Carter et al. | 179—1 |
| 3,144,517 | 8/1964 | Albrecht | 179—18.01 |
| 3,215,781 | 11/1965 | Yong | 179—39 X |
| 3,274,342 | 9/1966 | Brightman | 179—18.01 |
| 3,278,690 | 10/1966 | Van Horn | 179—37 |

FOREIGN PATENTS 1,074,665    2/1960    Germany.

KATHLEEN H. CLAFFY, *Primary Examiner.*

L. A. WRIGHT, *Assistant Examiner.*